US006748116B1

(12) United States Patent
Yue

(10) Patent No.: US 6,748,116 B1
(45) Date of Patent: Jun. 8, 2004

(54) APPARATUS AND METHOD FOR COMPRESSING AND DECOMPRESSING IMAGE FILES

(75) Inventor: Chengbo Yue, San Jose, CA (US)

(73) Assignee: AirZip, Inc., Cupertino, CA (US)

( * ) Notice: Subject to any disclaimer, the term of this patent is extended or adjusted under 35 U.S.C. 154(b) by 647 days.

(21) Appl. No.: 09/644,292

(22) Filed: Aug. 22, 2000

(51) Int. Cl.[7] ................................................ G06K 9/36
(52) U.S. Cl. ...................................................... 382/238
(58) Field of Search ................................. 382/232, 233, 382/236, 238, 240, 242, 248, 250; 348/384.1, 394.1, 395.1, 400.1–404.1, 407.1–416.1, 420.1–421.1, 425.2, 430.1, 431.1; 375/240.02–240.03, 240.11–240.16, 240.18–240.2, 240.22–240.25; 341/51, 63, 65, 67, 79, 107; 708/203, 300, 307–308, 313, 316, 317, 400–405

(56) References Cited

U.S. PATENT DOCUMENTS

| 4,222,076 A | 9/1980 | Knowlton ..................... 358/263 |
| 4,654,484 A | 3/1987 | Reiffel et al. .................. 379/53 |
| 5,128,791 A | * 7/1992 | LeGall et al. ............... 348/469 |

(List continued on next page.)

FOREIGN PATENT DOCUMENTS

| EP | 0 535 571 A3 | 4/1993 | ............ H04N/1/41 |
| EP | 0 535 571 A2 | 4/1993 | ............ H04N/1/41 |
| EP | 1 005 231 A1 | 5/2000 | ............ H04N/7/26 |
| WO | 00/03347 | 1/2000 | ............ G06K/9/36 |

OTHER PUBLICATIONS

"Progressive Transmission of Grey–Scale and Binary Pictures by Simple, Efficient, and Lossless Encoding Schemes", Ken Knowlton, Proceedings of the IEEE, vol. 68, No. 7, Jul. 1980, pp. 885–896.

"Reversible Intraframe Compression of Medical Images", P. Roos, M.A. Viergever, M.C.A. Van Duke, and J. H. Peters, IEEE Transactions on Medical Imaging vol. 7, No. 4, Dec. 1988, pp. 328–336.

"Digital Image Processing", Rafael C. Gonzalez & Richard E. Woods. 1992 Chapter 6 (pp. 307–407).

(List continued on next page.)

*Primary Examiner*—Jose L. Couso
(74) *Attorney, Agent, or Firm*—Thelen Reid & Priest, LLP; David B. Ritchie

(57) ABSTRACT

An apparatus and method for compressing and decompressing digital image files is described. At the image encoder/compressor, an input image file, which may be of bilevel, grayscale, or color file type, is subdivided into one or more sub-images. Each sub-image may be separately compressed. In the case of grayscale or color input images, the input image may be pre-processed using a threshold parameter to quantize the intensity and/or color vectors into a compressed palette of intensities and/or color vectors. A forward transform is performed on each pre-processed sub-image, based on a binary quincunx image pyramid and a set of pixel value prediction equations. The output of the forward transform comprises a set of prediction error signals and a coarse low-band signal. Each of the prediction error signals and the coarse low-band signal are run length and/or tree encoded, and all of the outputs of the run length and/or tree encoders are combined into a single array, which is encoded using a Huffman coding algorithm or arithmetic algorithm. The output of the Huffman encoder or its equivalent is written to a compressed output file in a format conducive to image reconstruction at the image decompressor. The compressed output file is stored and/or transmitted to an image decoder/decompressor. At the image decoder/decompressor, the encoding/compression process is reversed to generate a decompressed image file, which may be stored and/or displayed as appropriate. Embodiments of the system may implement either lossless compression or lossy compression, where lossiness may be due to transmission of fewer pixels than those present in the original image and/or by quantization of the pixel intensities and/or color vectors into fewer intensity/color levels than those present in the original image.

80 Claims, 43 Drawing Sheets

U.S. PATENT DOCUMENTS

| | | | | |
|---|---|---|---|---|
| 5,280,343 A | * | 1/1994 | Sullivan | 348/488 |
| 5,339,368 A | | 8/1994 | Higgins-Luthman et al. | 382/56 |
| 5,798,795 A | | 8/1998 | Glenn et al. | 348/398 |
| 5,930,390 A | | 7/1999 | Coelho | 382/168 |
| 5,978,517 A | | 11/1999 | Henry et al. | 382/253 |
| 6,125,201 A | * | 9/2000 | Zador | 382/166 |
| 6,233,358 B1 | | 5/2001 | Acharya | 382/248 |

OTHER PUBLICATIONS

"Embedded Image Coding Using Zerotrees of Wavelet Coefficients", Jerome M. Shapiro, IEEE Transactions on signal processing, vol. 41, No. 12, Dec. 1993 pp. 3445–3462.

"Pyramidal Lattice Vector Quantization for Multiscale Image Coding", Michel Barlaud, Member, IEEE, Patrick Sole, Thierry Gaidon, Marc Antonini, and Pierre Mathieu. IEEE Transactions on Image Processing, vol. 3 No. 4, Jul. 1994, pp. 367–381.

"Efficient Genral–Purpose Image Compression with Binary Tree Predictive Coding", John A. Robinson, IEEE Transactions on Image Processing. Vol. 6 No. 4 Apr. 1997 pp. 601–608.

"Highly Scalable Image Coding for Multimedia Applications", Jie Liang, ACM Multimedia 97– Electronic Proceedings Nov. 8–14, 1997 pp. 1–30.

"Fast progressive lossless image compression", Paul B. Howard & Jeffrey Scott Vitter, (12 pgs.).

"Quantizer Design", pp. 1–3.

"Coder Design", pp. 1–2.

"Shape–based prediction for BTPC", pp. 1–5.

"Headers, Environments, and Macros" pbm—portable bitmap file format pp. 1–3.

"Headers, Environments, and Macros", ppm—portable pixmap file format pp. 1–3.

Andrews et al., "Separable and Quincunx Wavelet Image Coding", Nov. 1998, Proc. Of $6^{th}$ IEEE Workshop on ISPACS, Melbourne, 5 pages.

Cosman et al., "Vector Quantization of Image Subbands: A Survey", Feb. 1996, IEEE Transactions on Image Processing, vol. 5, No. 2, pp. 202–225.

Rao et al., "Techniques and Standards for Image, Video, and Audio Coding", 1996, Prentice Hall PTR, New Jersey, 13 pages.

Shapiro, Jerome M., "An Embedded Wavelet Hierarchical Image Coder", 1992, IEEE, pp. IV–657–IV–660.

Robinson, John A., "Efficient General–Purpose Compression with Binary Tree Predictive Coding", IEEE Transactions on Image Processing, vol. 6, No. 4, 1997, pp. 601–608.

Shu, Y., "Robust Motion Picture Residue Coding for Noisy Channels", Image Processing and its Applications, Conference Publication IEE, No. 465, 1999, pp. 153–156.

* cited by examiner

|   |   |   |   |
|---|---|---|---|
| 0 | 1 | 0 | 0 |
| 0 | 1 | 0 | 0 |
| 0 | 1 | 0 | 0 |
| 0 | 1 | 1 | 1 |

316A

|   |   |   |   |
|---|---|---|---|
| 23 | 253 | 23 | 24 |
| 24 | 254 | 24 | 24 |
| 23 | 254 | 25 | 25 |
| 25 | 253 | 255 | 255 |

316B

|   |   |   |   |
|---|---|---|---|
| 23,0,0 | 0,253,0 | 23,0,0 | 24,0,0 |
| 24,0,0 | 0,254,0 | 24,0,0 | 24,0,0 |
| 23,0,0 | 0,254,0 | 25,0,0 | 25,0,0 |
| 25,0,0 | 0,253,0 | 0,255,0 | 0,255,0 |

| L1 | H1 | L1 | H1 | L1 |
|----|----|----|----|----|
| H1 | L1 | H1 | L1 | H1 |
| L1 | H1 | L1 | H1 | L1 |
| H1 | L1 | H1 | L1 | H1 |
| L1 | H1 | L1 | H1 | L1 |

1310

1320

| L2 |    | L2 |    | L2 |
|----|----|----|----|----|
|    | H2 |    | H2 |    |
| L2 |    | L2 |    | L2 |
|    | H2 |    | H2 |    |
| L2 |    | L2 |    | L2 |

FIG. 13

LEVEL 1
1480

LEVEL 2
1481

LEVEL 3
1482

LEVEL 1
1483

LEVEL 2
1484

LEVEL 3
1485

APPARATUS AND METHOD FOR COMPRESSING AND DECOMPRESSING IMAGE FILES

BACKGROUND OF THE INVENTION

1. Field of the Invention

The present invention relates generally to the field of signal processing. More specifically, the present invention relates to an apparatus and method for compressing and decompressing digital image files.

2. The Background Art

Various image compression/decompression systems are well known to those of ordinary skill in the art. FIG. 1 is a top-level block diagram depicting an exemplary image compression/decompression system 100 in the context of the present invention. As shown in FIG. 1, exemplary image compression/decompression system 100 comprises an encoder 110, a decoder 120, and a channel 130. Exemplary hardware architecture for an image compression computer system suitable for implementing an encoder 110 as shown in FIG. 1 will be described later in this document with reference to FIG. 2A. From a functional standpoint, encoder 110 comprises an input file 112, which is processed by an image compressor 115. Further details regarding various aspects of image compressor 115 will be provided throughout this document.

Still referring to FIG. 1, image compressor 115 produces a compressed file 135 that is transmitted via a channel 130 to an image decompressor 125 at a decoder 120. The channel 130 may comprise a switched backbone such as the network commonly referred to as the Internet, any local or wide area network, or may simply comprise storage of the compressed file 135 into any suitable medium such as a hard drive, flash memory, CD-ROM disk, and/or floppy disk. From a functional standpoint, image decompressor 125 attempts to recreate the original input file 112 and produces an output image file 127 which may be stored on any suitable medium and/or displayed (e.g., on a screen, printer, etc.). Exemplary hardware architecture for an image decompression computer system suitable for implementing a decoder 120 as shown in FIG. 1 will be described later in this document with reference to FIG. 2B. Further details regarding various aspects of image decompressor 125 will be provided throughout this document.

As will be recognized by those of ordinary skill in the art, when the output file generated by image decompressor 125 is identical (or essentially identical, within the tolerances of each particular implementation) to the original input file 112, the image compression system 100 is said to be "lossless." On the other hand, when the output file generated by image decompressor 125 is different from (e.g., contains less information or detail than) the original input file 112, the image compression system 100 is said to be "lossy." As will also be recognized by those of ordinary skill in the art, without limitation, lossiness may be due to transmission of fewer pixels than the number of pixels present in the original image, to transmission of less spatial frequency information than is present in the original image, to quantization of intensity and/or color levels to fewer intensities and/or colors than are present in the original image, or to various combinations of the above factors. As will be described in more detail later in this document, embodiments of the present invention may implement either lossless or lossy image compression.

Currently, various types of wireless communication devices such as Personal Digital Assistants ("PDAs") and cellular telephone handsets are beginning to support the transmission and reception of graphic images via data communication networks (such as the Internet). Data communication networks used to transmit such graphic images typically have significant bandwidth limitations, and such wireless communication devices typically exhibit significant limitations in terms of available processing power and memory. Moreover, current "standard" image compression/decompression systems known to those of ordinary skill in the art (e.g., JPEG, GIF, PNG) either exhibit a relatively low compression ratio or require relatively high processing power and/or memory at the image compressor and/or decompressor. Similarly, current "non-standard" image compression/decompression systems known to those of ordinary skill in the art (e.g., Binary Tree Predictive Coding, or "BTPC") require high processing power and/or memory at the image compressor while its compression ratio is typically comparable to JPEG for natural Images and typically worse than GIF or PNG for graphics. Finally, image compression/decompression systems known to those of ordinary skill in the art typically exhibit good performance for a particular general class of image files (e.g., bilevel, grayscale, or color files), but exhibit relatively poor performance for one or more of the other general classes of image files.

Thus, there exists a need for an image compression/decompression apparatus and method which exhibits a high compression ratio while conserving transmission bandwidth, as well as conserving processing power and memory at the image compressor and/or decompressor, and which exhibits good performance across a broad spectrum of general image file classes. The present invention addresses this need. These and other features and advantages of the present invention will be presented in more detail in the following specification of the invention and in the associated figures.

SUMMARY OF THE INVENTION

An apparatus and method for compressing and decompressing digital image files is described. At the image encoder/compressor, an input image file, which may be of bilevel, grayscale, or color file type, is subdivided into one or more sub-images. Each sub-image may be separately compressed. In the case of grayscale or color input images, the input image may be pre-processed using a threshold parameter to quantize the intensity and/or color vectors into a compressed palette of intensities and/or color vectors. A forward transform is performed on each pre-processed sub-image, based on a binary quincunx image pyramid and a set of pixel value prediction equations. The output of the forward transform comprises a set of prediction error signals and a coarse low-band signal. Each of the prediction error signals and the coarse low-band signal are run length and/or tree encoded, and all of the outputs of the run length and/or tree encoders are combined into a single array, which is encoded using a Huffman coding algorithm or arithmetic coding algorithm. The output of the Huffman encoder or arithmetic encoder is written to a compressed output file in a format conducive to image reconstruction at the image decompressor. The compressed output file is stored and/or transmitted to an image decoder/decompressor. At the image decoder/decompressor, the encoding/compression process is reversed to generate a decompressed image file, which may be stored and/or displayed as appropriate. Embodiments of the system may implement either lossless compression or lossy compression, where lossiness may be due to transmission of fewer pixels than those present in the original image and/or by quantization of the pixel intensities and/or color vectors into fewer intensity/color levels than those present in the original image.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings:

FIG. 4 is a block diagram depicting an exemplary portion of an image, illustrating the bilevel, grayscale, and color image types.

FIG. 13 is a block diagram depicting exemplary portions of images being processed by an exemplary forward transform in accordance with aspects of the present invention.

DETAILED DESCRIPTION

Figure 1:
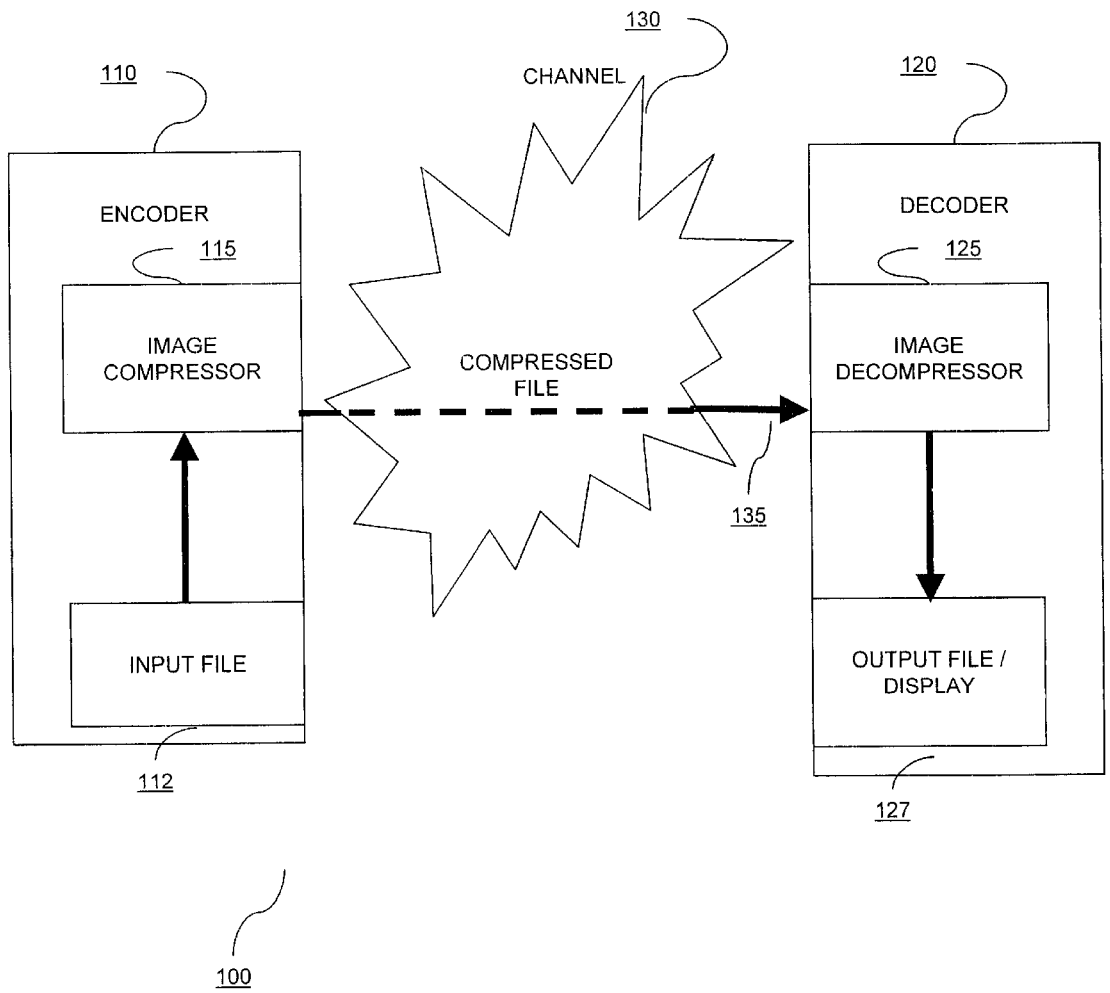
FIG. 1 is a top-level block diagram depicting an image compression/decompression system in the context of the present invention.

One embodiment of the present invention is described herein in the context of an apparatus and method for compressing and decompressing digital image files. Those of ordinary skill in the art will realize that the following description of the present invention is illustrative only and not in any way limiting. Other embodiments of the invention will readily suggest themselves to such skilled persons having the benefit of this disclosure. For example, any number of computer programming languages, such as the Java™ language, C, C++, Perl, Pascal, Smalltalk, FORTRAN, assembly language, etc., may be used to implement various aspects of the present invention. Further, various programming approaches such as procedural, object oriented or artificial intelligence techniques may be employed, depending on the requirements of each particular implementation.

Reference will now be made in detail to an implementation of the present invention as illustrated in the accompanying drawings. The same reference numbers will be used throughout the drawings and the following description to refer to the same or like parts.

Certain figures in this specification are flow charts illustrating methods and systems according to aspects of the present invention. It will be understood that each block of these flow charts, and combinations of blocks in these flow charts, can be implemented by computer program instructions. These computer program instructions may be loaded onto a computer or other programmable apparatus to produce a machine, such that the instructions which execute on the computer or other programmable apparatus create means for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction means which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks.

Accordingly, blocks of the flow charts support combinations of means for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

In the interest of clarity, not all the routine features of the implementations described herein are described. It will of course be appreciated that in the development of any such actual implementation, numerous implementation-specific decisions must be made to achieve the developers' specific goals, such as compliance with system- and business-related constraints, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

Figure 2A:
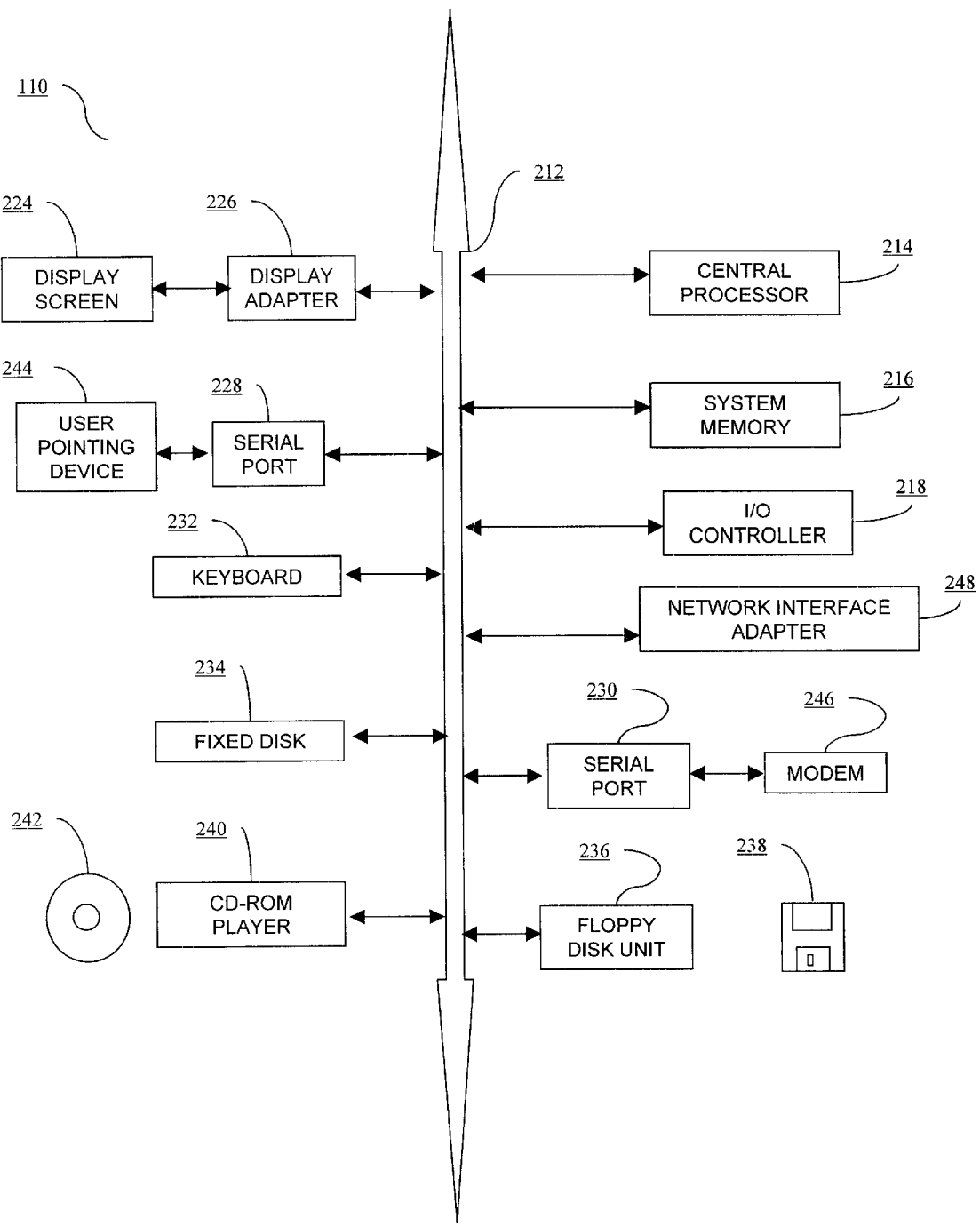
FIG. 2A is a block diagram depicting an exemplary hardware architecture for an image compression computer system according to one embodiment of the present invention.

FIG. 2A is a block diagram depicting an exemplary hardware architecture for an image compression computer system 110 according to one embodiment of the present invention. In one embodiment, computer system 110 comprises a common personal computer system. As shown in FIG. 2A, image compression computer system 110 comprises a bus 212 which interconnects major subsystems such as a central processor 214, a system memory 216 (typically RAM), an input/output (I/O) controller 218, an external device such as a display screen 224 via display adapter 226, serial ports 228 and 230, a keyboard 232, a fixed disk drive 234, a floppy disk drive 236 operative to receive a floppy disk 238, and a CD-ROM player 240 operative to receive a CD-ROM 242. Many other devices can be connected, such as a user pointing device 244 (e.g., a mouse) connected via serial port 228, and a modem 246 connected via serial port 230. Modem 246 may provide a direct connection to a remote server via a telephone link or to a network such as the Internet via a PoP (point of presence). Alternatively, a network interface adapter 248 may be used to interface to a local or wide area network using any network interface system known to those of ordinary skill in the art (e.g., Ethernet, DSL, AppleTalk™).

Many other devices or subsystems (not shown) may be connected in a similar manner. Also, it is not necessary for all of the devices shown in FIG. 2A to be present to practice the present invention. Furthermore, the devices and subsystems may be interconnected in different ways from that shown in FIG. 2A. The design and operation of a computer system such as that shown in FIG. 2A is readily known in the art and is not discussed in detail in this application, so as not to over complicate the present discussion. Code to implement the present invention may be operably disposed in system memory 216 or stored on storage media such as fixed disk 234 or floppy disk 238.

In the context of the present invention, the term "terminal" refers to any suitable input/output device such as an appropriately programmed computer with a keyboard and display, a personal digital assistant ("PDA") with a touch screen, a telephone with a keypad and a receiver, a mobile or cellular telephone, a pager, a television connected to a data communication network and having a remote control, and the like. Such terminals are well known in the art, and consequently are not further described here. A terminal may be a dedicated device with programming permanently "burned into" a read-only memory ("ROM"), a personal computer running a World Wide Web browser capable of executing software "applets" (e.g. Java™ applets from Sun Microsystems™) downloaded on demand, or a general-purpose computing device with suitable game programming that is conventionally loaded from a hard disk, CD-ROM, network server, or other mass storage device when the game is to be played.

In the context of the present invention, the term "network" includes local area networks, wide area networks, the Internet, cable television systems, telephone systems, wireless telecommunications systems, fiber optic networks, ATM networks, frame relay networks, satellite communications systems, and the like. Such networks are well known in the art and consequently are not further described here.

Figure 2B:
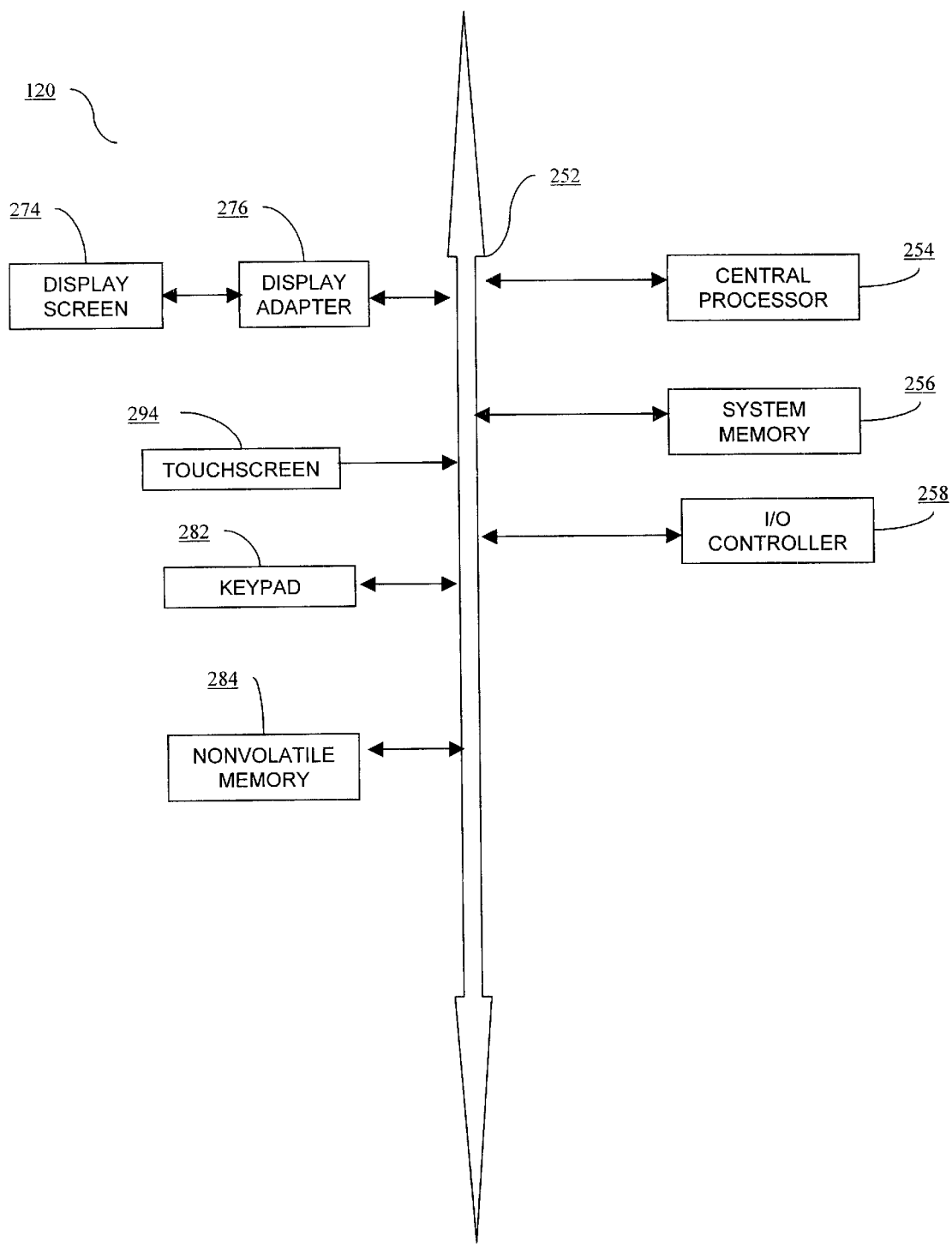
FIG. 2B is a block diagram depicting an exemplary hardware architecture for an image decompression computer system according to one embodiment of the present invention.

FIG. 2B is a block diagram depicting an exemplary hardware architecture for an image decompression computer system 120 according to one embodiment of the present invention. In one embodiment, computer system 120 comprises a personal digital assistant ("PDA"). Nothing precludes the use of other types of computer systems (e.g., computer system 110 shown in FIG. 2A may also be used to implement image decoder 120 shown in FIG. 1). As shown in FIG. 2B, image decompression computer system 120 comprises a bus 252 which interconnects major subsystems such as a central processor 254, a system memory 256 (typically RAM), an input/output ("I/O") controller 258 for interfacing with various I/O devices, an external device such as a touchscreen display screen 274 via display adapter 276, a touchscreen input interface 294, a keypad 282, and non-volatile memory 284. Many other devices (not shown) may also be connected. A modem (not shown) or similar communication interface may provide a direct connection to a remote server via a telephone link or to a network such as the Internet via a PoP. Alternatively, a network interface adapter (not shown) may be used to interface to a local or wide area network using any network interface system known to those of ordinary skill in the art (e.g., Ethernet, DSL, AppleTalk™).

Figure 3:
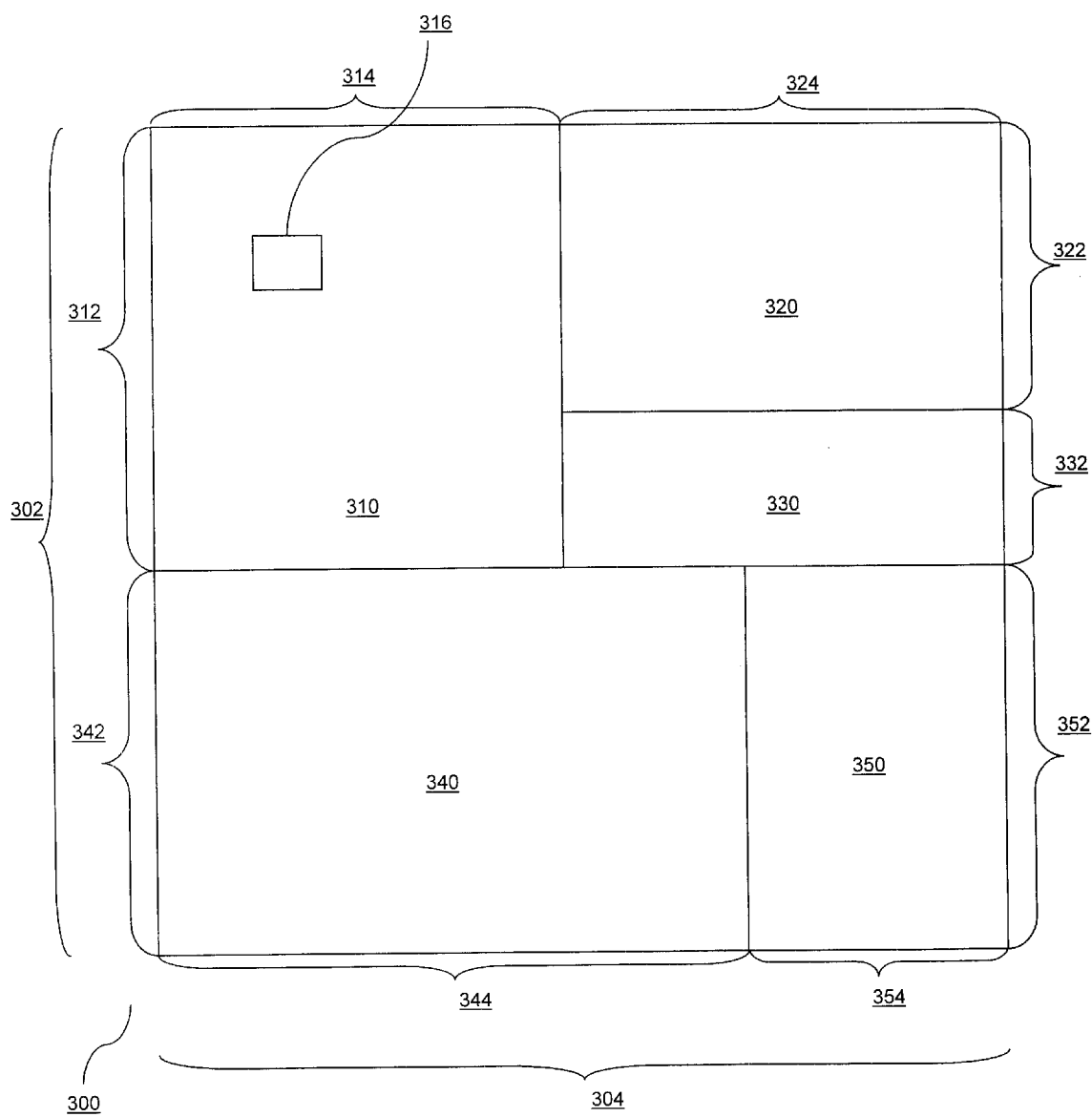
FIG. 3 is a block diagram depicting an exemplary input image subdivided into a plurality of sub images in accordance with aspects of the present invention.

FIG. 3 is a block diagram depicting an exemplary input image 300 subdivided into a plurality of sub images in accordance with aspects of the present invention. Exemplary input image 300 shown in FIG. 3 is one example of an input file 112 shown in FIG. 1. As shown in FIG. 3, exemplary input image 300 comprises a two-dimensional array of pixel values. As those of ordinary skill in the art will recognize, from a storage standpoint, input image 300 comprises an array of data, with each pixel in the input image 300 represented by a set of data values. From a display standpoint, each pixel in the input image 300 produces a particular intensity, dot pattern, or color on a display device such as a monitor, display screen and/or printer. In the context of the present invention, there are three types of image files: bilevel image files, grayscale image files, and color image files.

The pixels in a "bilevel" image file may contain one of two values, typically 0 or 1. The pixels in a "grayscale" image file are typically represented by a number that corresponds to a particular intensity of a single color. For example, in one implementation, a totally dark (e.g., black) pixel may be represented by the value "0," and a totally bright (e.g., white) pixel may be represented by the value "255," with the intervening values representing increasingly bright shades of gray. Each pixel in a "color" image file is typically represented by a set of numbers, with each number in the set representing one component of the pixel color. For example, it is common for the red, green, and blue (e.g. "RGB") components of a pixel color to be represented by separate numbers, where each of the three numbers may range in value from 0 to 255 in an exemplary implementation. Thus, a totally red pixel may be represented by the color "vector" 255,0,0 while a totally blue pixel may be represented by the color vector 0,0,255 and a purple vector of medium intensity may be represented by the color vector 128,0,128 (a mixture of red and blue, with each of the red and blue components set at medium intensity). Nothing precludes the use of other color pixel representation systems.

Still referring to FIG. 3, exemplary image file 300 has a total height in pixels labeled 302 and a total width in pixels labeled 304. For example, a particular image 300 may have a total image height 302 of 480 pixels and a total image width of 640 pixels. Nothing precludes using any other suitable height and/or width dimensions. However, as will be described in more detail later, in one embodiment, the height and width values should be divisible by 16. As is well known to those of ordinary skill in the art, images may be "padded" as required with suitable values (e.g., zeros) in one or both dimensions.

In the context of the present invention, an image may be subdivided into one or more sub-images. Sub-images may also be referred to as "bands." Naturally, when there is only one sub-image in a particular image, then the sub-image and the image are identical. The exemplary image 300 shown in FIG. 3 is subdivided into five sub-images 310, 320, 330, 340, and 350. Each sub-image has its own sub-image height and sub-image width. Exemplary sub-image 310 has height 312 and width 314. An exemplary portion of sub-image 310 is shown as rectangular box 316. Exemplary sub-image 320 has height 322 and width 324. Exemplary sub-image 330 has height 332 and width 324. Exemplary sub-image 340 has height 342 and width 344. Exemplary sub-image 350 has height 352 (which is equal to height 342) and width 354. Of course, the actual values of each of these sub-image heights and widths may vary depending on each particular image, so long as the entire image is "covered." As will be described in more detail later in this document, better performance in terms of compression ratio and/or compression speed may sometimes be achieved by subdividing an input image into a plurality of sub-images and processing each sub-image as if it were a separate image.

FIG. 4 is a block diagram depicting an exemplary portion of an image, illustrating the bilevel, grayscale, and color image types. Each of the diagrams 316-A, 316-B, and 316-C of the represents an exemplary portion of an image (such as the rectangular box labeled 316 in FIG. 3) as it would be represented in each of the bilevel, grayscale, and color image types, respectively. In all three cases, a portion of an image displaying the capital letter "L" is represented. In bilevel diagram 316-A, the pixels comprising the letter "L" are assigned the value "1," while the background pixels are assigned the value "0." Thus, for example, this image portion may be displayed in a particular implementation as a white letter "L" on a black background. In grayscale diagram 316-B, the pixels comprising the letter "L" are assigned values ranging from 253 to 255, while the background pixels are assigned values ranging from 23 to 25. Thus for example, this image portion may be displayed in a particular implementation as a white letter "L" on a dark gray background. However, the pixel intensity variations (e.g., 23 to 25 and 253 to 255) illustrate the noise and/or shading variations that are typically present in a grayscale image.

Finally, in color diagram 316-C, the pixels comprising the letter "L" are assigned RGB color vector values ranging from 0,253,0 to 0,255,0, while the background pixels are assigned RGB color vector values ranging from 23,0,0 to 25,0,0. For example, this image portion may be displayed in a particular implementation as a bright green letter "L" on a dark red background. As with the grayscale image 316-B, the color vector intensity variations in exemplary color image portion 316-C illustrate the noise and/or shading variations are typically present in color and grayscale images.

Figure 5A:
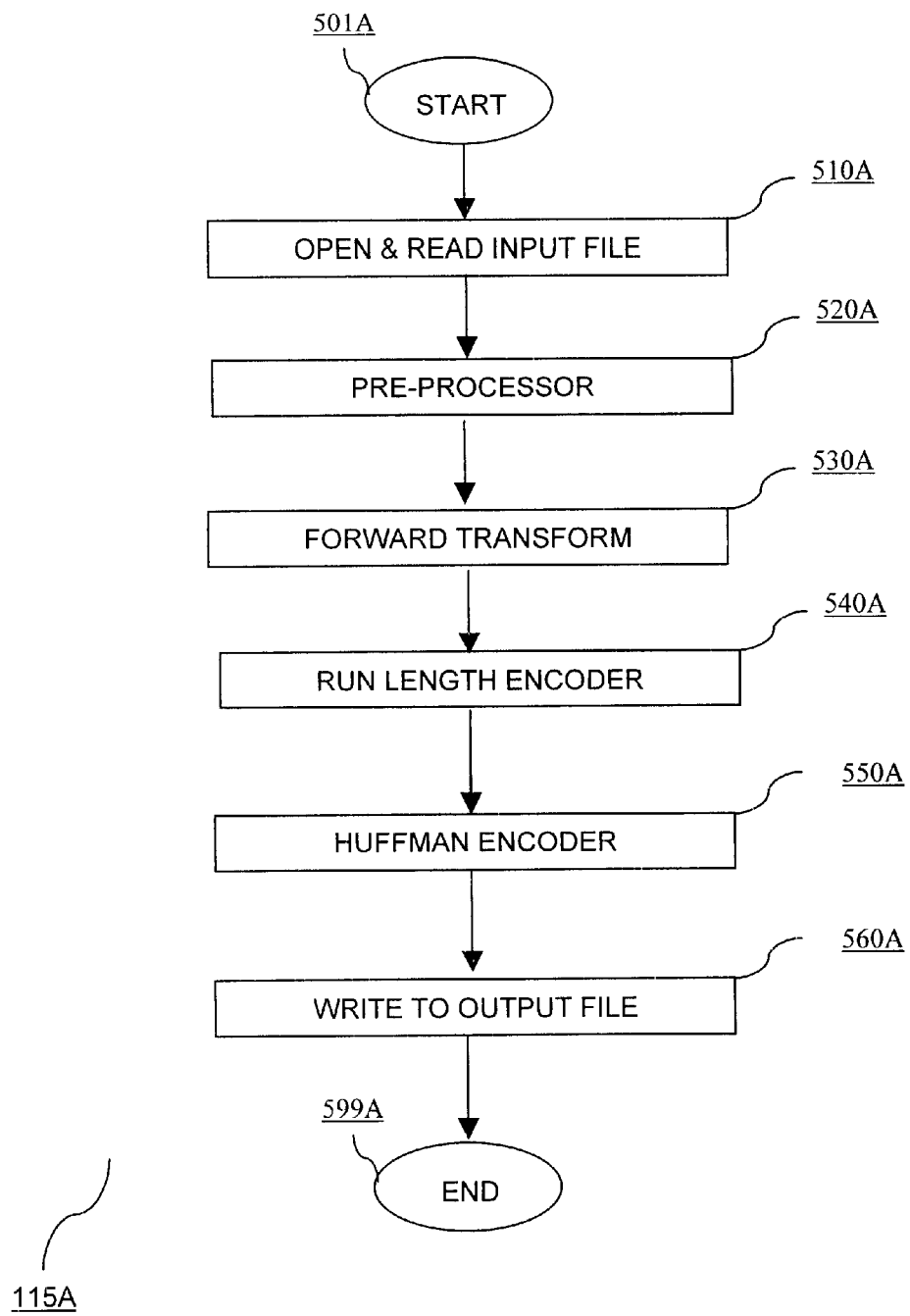
FIG. 5A is a top-level flow chart depicting an exemplary image compression method in accordance with aspects of the present invention.

Having described and defined the types and composition of images suitable for use with embodiments of the present invention, various aspects of the image compression and decompression systems of the present invention will now be described in more detail. FIG. 5A is a top-level flow chart depicting an exemplary image compression method 115 in accordance with aspects of the present invention. As shown in FIG. 5A, image compression method 115A starts at step 501A, and then at step 510A, an input image file is opened for reading. At step 520A, a pre-processing algorithm is executed on the input image file. At step 530A, a forward transform algorithm is executed on the output of the pr-eprocessing algorithm. At step 540A, a run length coding algorithm is executed on the output of the forward transform algorithm. At step 550A, a Huffman coding algorithm is executed on the output of the run length coding algorithm 540A. At step 560A, the output of the Huffman coding algorithm is written to an output file having a predetermined file format. Finally, the image compression method 115A ends at step 599A. Each of the above steps will be described in more detail later in this document with reference to FIGS. 7 through 20.

Figure 6A:
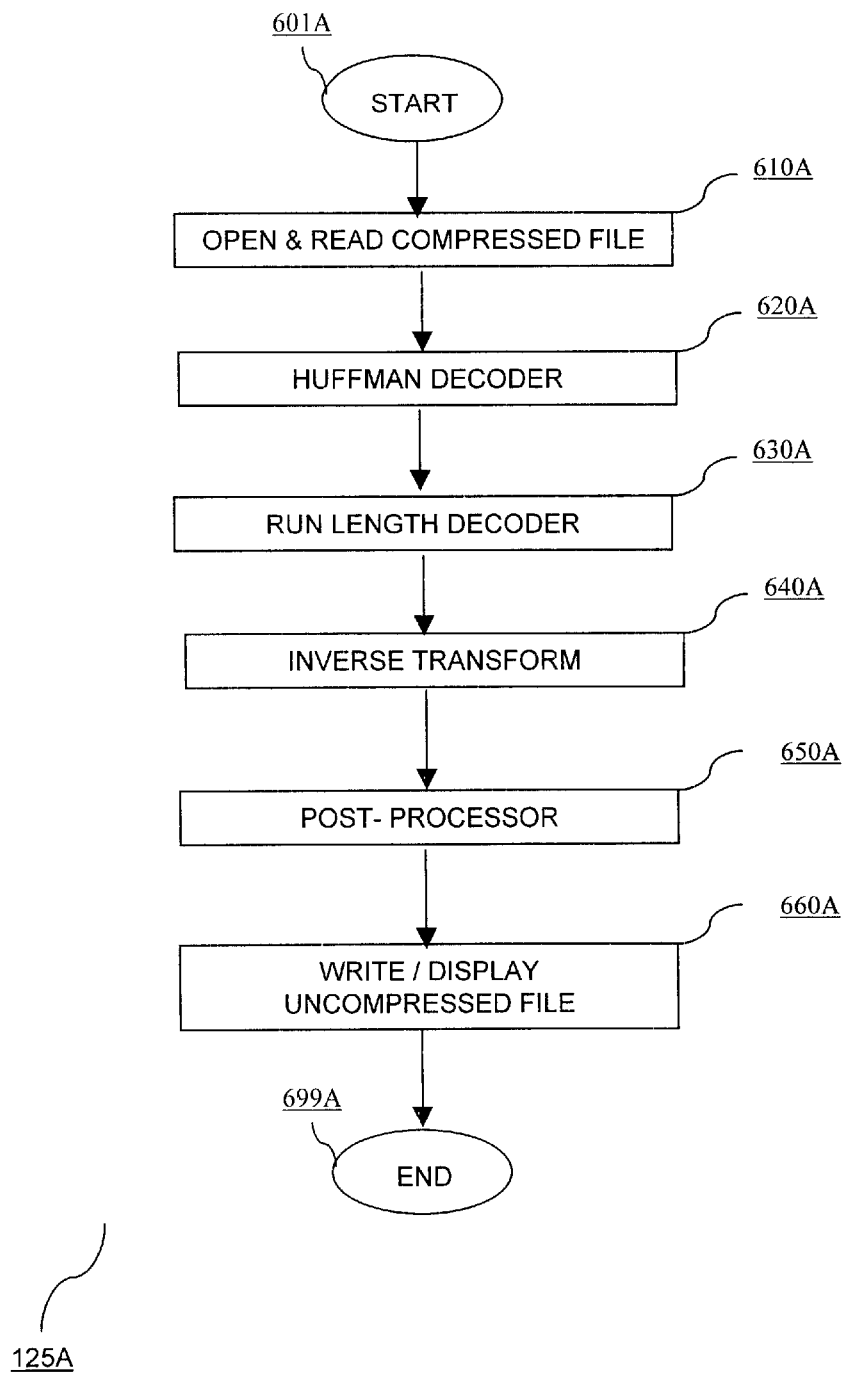
FIG. 6A is a top-level flow chart depicting an exemplary image decompression method in accordance with aspects of the present invention.

FIG. 6A is a top-level flow chart depicting an exemplary image decompression method 125A in accordance with aspects of the present invention. In general, image decompression method 125A shown in FIG. 6A reverses the image compression method 115A of FIG. 5A. As shown in FIG. 6A, image decompression method 125A starts at step 601A, and at step 610A, the compressed file received via channel 130 (see FIG. 1) is opened for reading. At step 620A, a Huffman decoder algorithm is executed on the compressed file. At step 630A, a run length decoding algorithm is executed on the output of the Huffman decoding algorithm. At step 640A, an inverse transform algorithm is executed on the output of the run length decoding algorithm. At step 650A, a post-processing algorithm is executed on the output of the inverse transform algorithm. At step 660A, the uncompressed output of the post-processing algorithm is stored and/or displayed on decoder 120 (see FIG. 1) as appropriate for each particular implementation. Finally, the image decompression method 125A ends at step 699A. Each of the above steps will be described in more detail later in this document with reference to FIGS. 21A through 24.

Figure 5B:
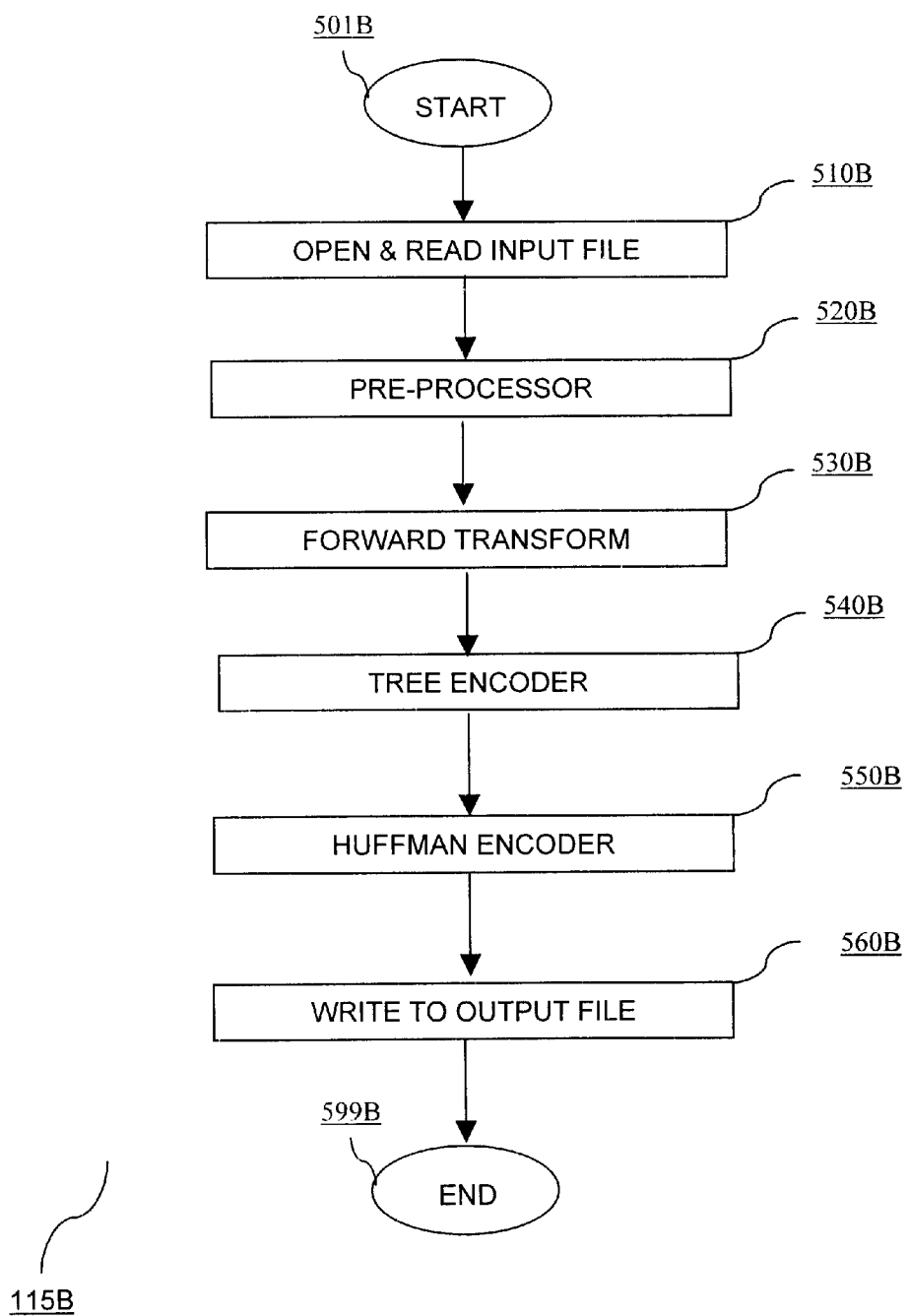
FIG. 5B is a top-level flow chart depicting another exemplary image compression method in accordance with aspects of the present invention.

FIG. 5B is a top-level flow chart depicting another exemplary image compression method 115B in accordance with aspects of the present invention. As shown in FIG. 5B, image compression method 115B starts at step 501B, and then at step 510B, an input image file is opened for reading. At step 520B, a pre-processing algorithm is executed on the input image file. At step 530B, a forward transform algorithm is executed on the output of the pre-processing algorithm. At step 540B, a tree coding algorithm is executed on the output of the forward transform algorithm. At step 550B, a Huffman or arithmetic coding algorithm is executed on the output of the tree coding algorithm 540B. At step 560B, the output of the Huffman or arithmetic coding algorithm is written to an output file having a predetermined file format. Finally, the image compression method 115B ends at step 599B. Each of the above steps will be described in more detail later in this document with reference to FIGS. 7 through 20.

Figure 6B:
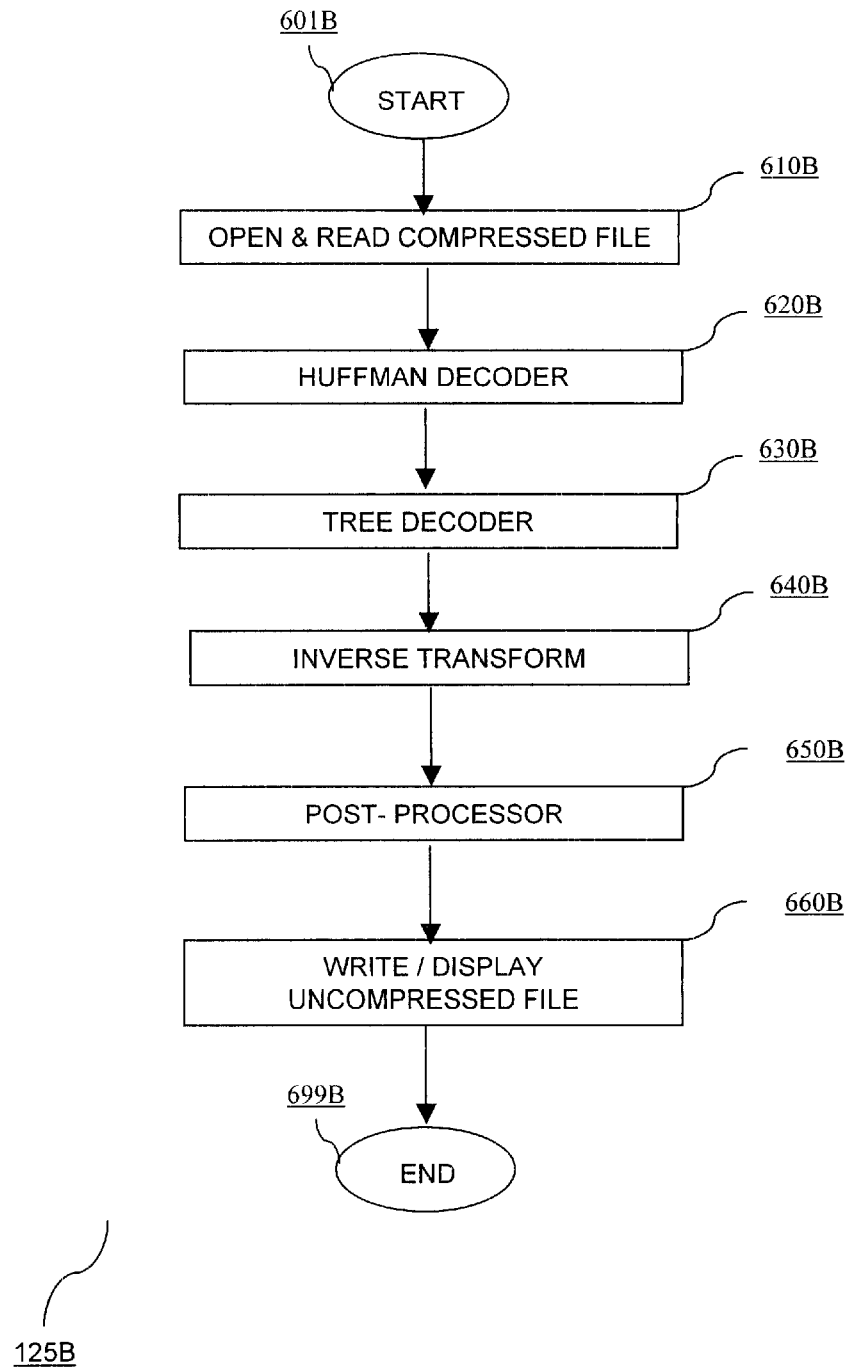
FIG. 6B is a top-level flow chart depicting another exemplary image decompression method in accordance with aspects of the present invention.

FIG. 6B is a top-level flow chart depicting an exemplary image decompression method 125B in accordance with aspects of the present invention. In general, image decompression method 125B shown in FIG. 6B reverses the image compression method 115B of FIG. 5B. As shown in FIG. 6B, image decompression method 125B starts at step 601B, and at step 610B, the compressed file received via channel 130 (see FIG. 1) is opened for reading. At step 620B, a Huffman or arithmetic decoder algorithm is executed on the compressed file. At step 630B, a tree decoding algorithm is executed on the output of the Huffman or arithmetic decoding algorithm. At step 640B, an inverse transform algorithm is executed on the output of the tree decoding algorithm. At step 650B, a post-processing algorithm is executed on the output of the inverse transform algorithm. At step 660B, the uncompressed output of the post-processing algorithm is stored and/or displayed on decoder 120 (see FIG. 1) as appropriate for each particular implementation. Finally, the image decompression method 125B ends at step 699B. Each of the above steps will be described in more detail later in this document with reference to FIGS. 21A through 24.

Figure 7:
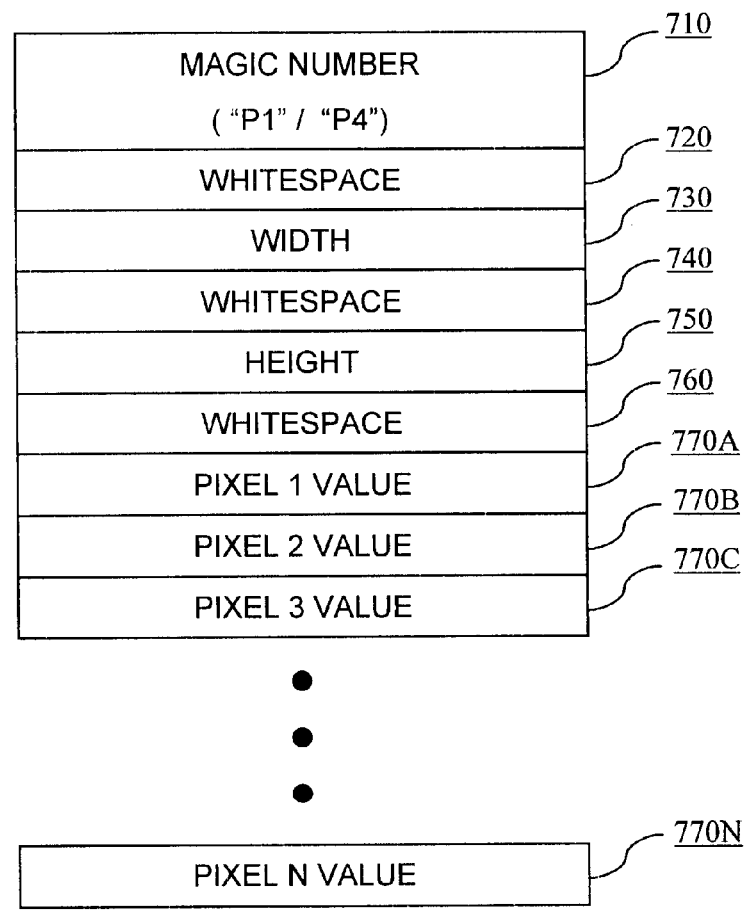
FIG. 7 is a block diagram illustrating the file format of an exemplary bilevel input image file suitable for use with embodiments of the present invention.

FIG. 7 is a block diagram illustrating the file format of an exemplary bilevel input image file 700 suitable for use with embodiments of the present invention. The exemplary bilevel input image file format 700 shown in FIG. 7 is that of a Portable BitMap ("PBM") file, which is well known to those of ordinary skill in the art. Nothing precludes the use of other bilevel input image file formats as appropriate for each particular implementation. As shown in FIG. 7, bilevel input image file 700 starts with a "magic number" 710, which is typically equal to the ASCII values of either "D1" (ASCII) or "P4" ("rawbits"). The magic number 710 is followed by white space 720 (e.g., blanks, spaces, tabs, carriage returns, line feeds, etc.). Next, the width 730 of the image is specified in pixels, followed by more white space 740. Next, the height 750 of the image is specified in pixels, followed by more white space 760. In total, each image will comprise "N" pixels, where "N" is equal to the height times the width of the image. The values of each of these pixels are then stored sequentially in fields 770A to 770N of the input image file, where each such field contains either the value "0" or "1." Depending on the particular type of PBM file involved, the pixel values are stored as either ASCII values or "raw bits." Because the PBM file format is well known to those of ordinary skill in the art, additional details are not provided herein so as not to overcomplicate the present discussion.

Figure 8:
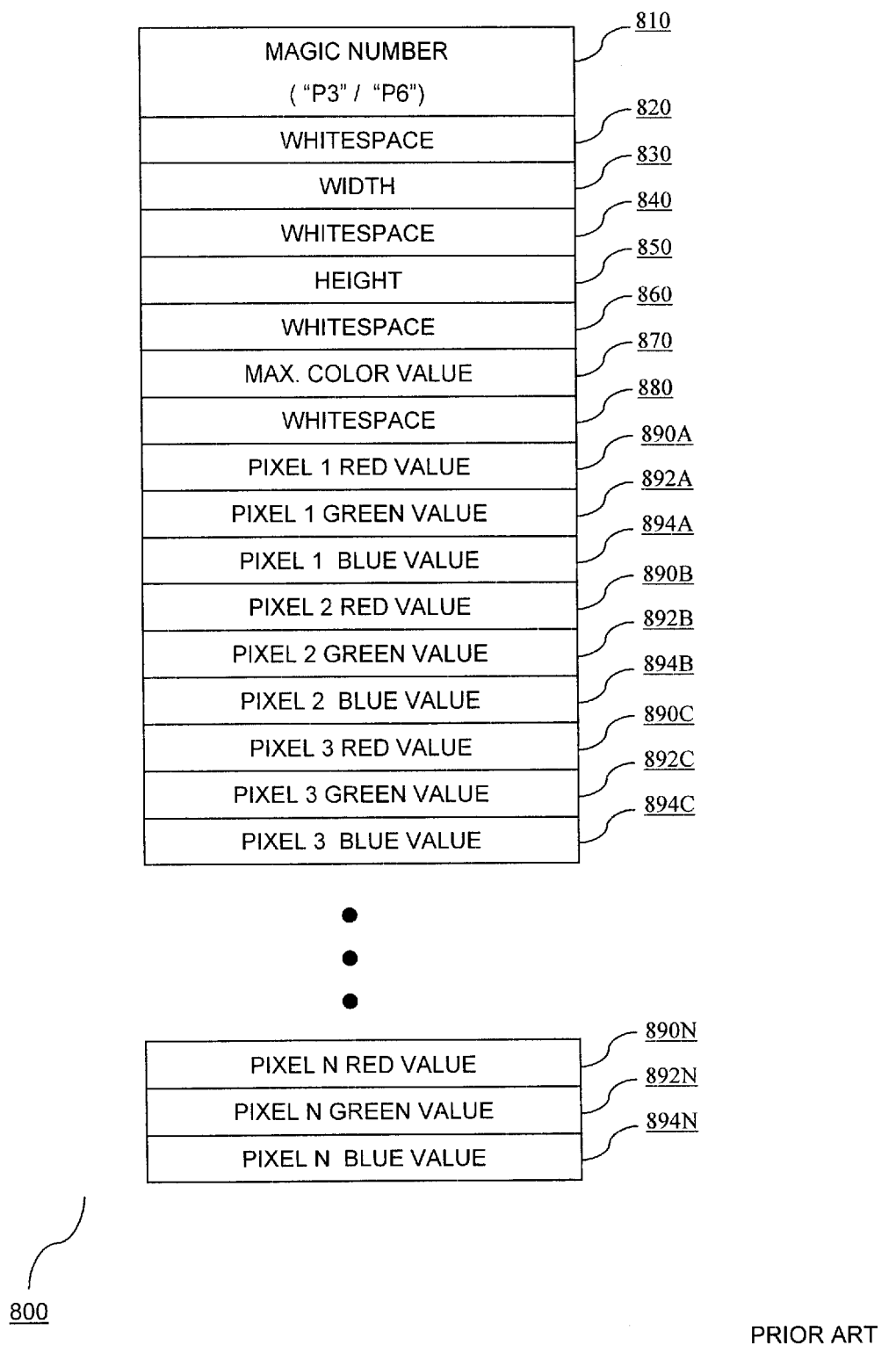
FIG. 8 is a block diagram illustrating the file format of an exemplary color input image file suitable for use with embodiments of the present invention.

FIG. 8 is a block diagram illustrating the file format of an exemplary color input image file 800 suitable for use with embodiments of the present invention. The exemplary color input image file format 800 shown in FIG. 8 is that of a Portable PixelMap ("PPM") file, which is well known to those of ordinary skill in the art. Nothing precludes the use of other color input image file formats as appropriate for each particular implementation. Moreover, this input image file type may also be used to represent grayscale images. As shown in FIG. 8, color input image file 800 starts with a "magic number" 810, which is typically equal to the ASCII values of either "P3" (ASCII) or "P6" (rawbits). The magic number 810 is followed by white space 720, followed by the width 830 of the image in pixels followed by more white space 840, followed by the height 850 of the image in pixels followed by more white space 860. This is followed by a maximum color value 870, which specifies the maximum value of each RGB color component of a color vector (e.g., 8, 100, 255, 65,535), followed by more white space 880. Next, each of the "N" color pixels in the color input image is represented by three fields: a red value field 890, a green value field 892, and a blue value field 894. As was the case with PBM files, depending on the particular type of PPM file involved, the RGB components of the pixel values are stored as either ASCII values or "raw bits." Because the PPM file format is also well known to those of ordinary skill in the art, additional details are not provided herein so as not to over complicate the present discussion.

Figure 9:
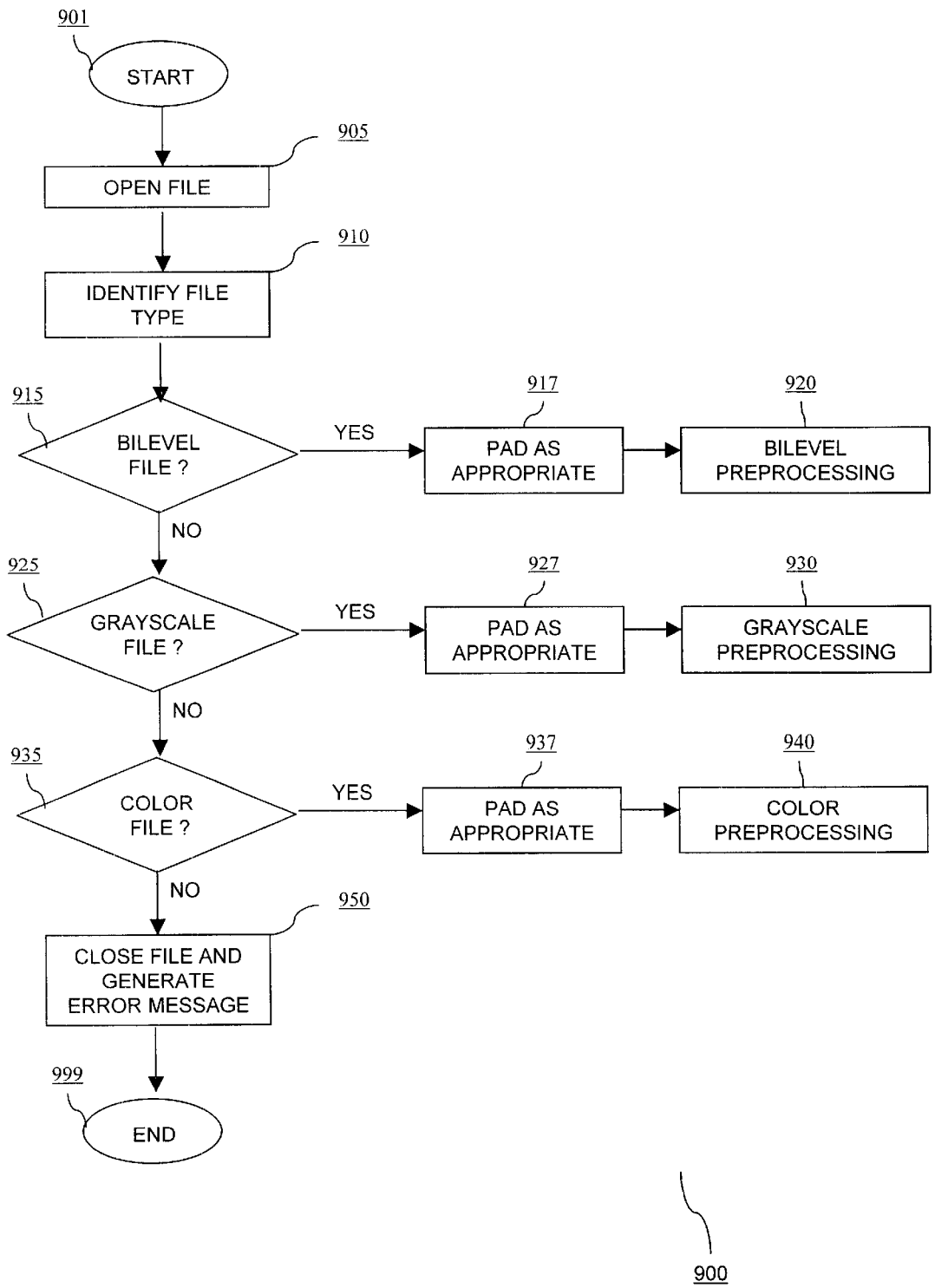
FIG. 9 is a flow chart depicting an exemplary image pre-processing method in accordance with aspects of the present invention.

FIG. 9 is a flow chart depicting an exemplary image pre-processing method 900 in accordance with aspects of the present invention. As shown in FIG. 9, exemplary image pre-processing method 900 starts at step 901, and at step 905 the input image file is opened for reading. At step 910, the file type is identified. At step 915, a decision is made depending on whether the input image file is a bilevel image file (e.g., a PBM file as described earlier with reference to FIG. 7). If so, then at step 917 the image size is padded as appropriate (e.g., in one embodiment, both the height and the width of the image in pixels should be divisible by 16). At step 920, bilevel pre-processing is performed. Typically, bilevel pre-processing is easy to implement, because the pixel values are already encoded in a format that may be processed directly by the next step in the image compression system (i.e., the forward transform). Thus, in the case where the bilevel input file is a PBM file as shown in FIG. 7, then the bilevel pre-processing step 920 shown in FIG. 9 simply comprises the process of first extracting the pixel values 770A through 770N based on the image geometry specified in the PBM file header, and then re-order and re-assign the pixel values 0, 1 by their frequency, as described in step 1060, step 1065 and step 1070 of FIG. 10.

Still referring to FIG. 9, if the input image file is not a bilevel image file, then that step 925, a decision is made depending on whether the input image file is a grayscale image file. If so, then at step 927 the image size is padded as appropriate, and then at step 930, grayscale image file pre-processing is performed. An exemplary method for implementing grayscale pre-processing step 930 will be described later with reference to FIG. 10.

Referring back to FIG. 9, if the input image file is not a bilevel image file or a grayscale image file, then at step 935, a decision is made depending on whether the input image file is a color image file. If so, then at step 937 the image size is padded as appropriate, and then at step 940, color image file pre-processing is performed. An exemplary method for implementing color pre-processing step 940 will be described later with reference to FIG. 11. At step 950, if the input image file cannot be identified as either a bilevel image file, a grayscale image file, or 8 color image file, then asked that 950, the file is closed and an error message is generated as appropriate. The process ends at step 999.

Figure 10:
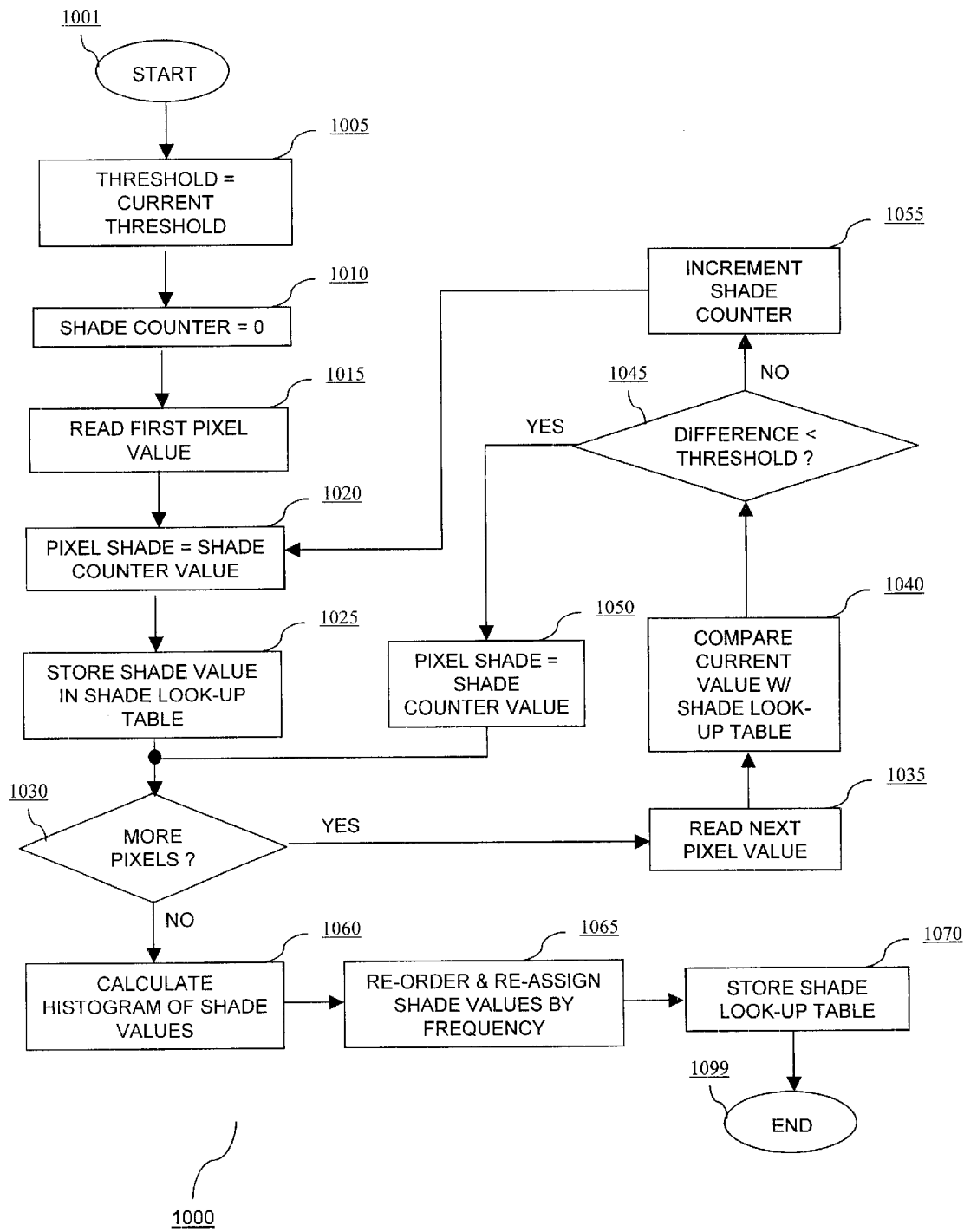
FIG. 10 is a flow chart depicting an exemplary intensity palette generation method in accordance with aspects of the present invention.

FIG. 10 is a flow chart depicting an exemplary intensity palette generation method 1000 for a grayscale image in accordance with aspects of the present invention. The method starts at step 1001, and at step 1005, the "threshold" variable is assigned to equal the current threshold specified by the user or by some default value. In one embodiment, the threshold variable is used to determine the degree of intensity quantization that will be performed. As the threshold value increases, the degree of intensity quantization increases, and thus the fewer levels of intensity that will be displayed in the reconstructed uncompressed image. In this way, the threshold value determines the degree of intensity "lossiness" in the image compression system. Preferably, the threshold variable can be adjusted by a user to determine the optimum threshold value for a given input image. Alternatively, the threshold variable may be automatically determined, or may be set to a default value.

Still referring to FIG. 10, at step 1010, a shade counter is initialized to 0. At step 1015, the first pixel value (or "shade") in the input grayscale image (e.g., the value of the upper-left pixel) is read. At step 1020, this pixel value is assigned to equal the current value of the shade counter (which was initialized to 0 at step 1010). At step 1025, this shade value is stored in a shade lookup table (i.e., at this point, the shade value of the upper-left pixel will be equated with the value "0" in the shade lookup table).

At step 1030, a decision is made depending on whether more pixels remain to be read in the grayscale input image. If so, then at step 1035, the next pixel value in the image is read. At step 1040, the intensity value of the current pixel is compared with intensity values of the shade look up table. At step 1045, a decision is made depending on whether the minimum intensity difference is less than the threshold variable value. It should be noted that since pixel intensity values in grayscale images are simply one-dimensional "vectors," the comparison of step 1045 may be performed in a straightforward manner. If the minimum is less than the threshold, then at step 1050, the pixel intensity of the current pixel is once again set to equal the closest intensity value of the shade look up table and the shade counter of the current pixel is set to equal the corresponding shade counter number of the closest intensity value in the shade look up table, thus resulting in a degree of intensity quantization. After step 1050, the process loops back to step 1030.

On the other hand, if at step 1045 it was determined that the minimum difference between the intensity value of the current pixel and the intensity values of the shade look up table is greater than or equal to the threshold, then at step 1055 the shade counter is incremented and at step 1020 the current pixel will be assigned the newly incremented value of the shade counter, and at step 1025 a new entry will be stored in the intensity lookup table. This process continues until it is determined in an iteration through step 1030 that no more pixels remain in the input grayscale image. At that point, the histogram of shade values in the image is calculated at step 1060. Then, at step 1065, the shade values are reordered and reassigned by frequency of occurrence, and the updated shade lookup table is stored at step 1070. In this way, pixels having the most frequently occurring shade will be assigned shade value "0," pixels having the next most frequently occurring shade will be assigned shade value "1," and so on. The shade lookup table (also called an "intensity palette") is used to keep track of the actual shades corresponding to each encoded pixel value. The process ends at step 1099. As those of ordinary skill in the art will recognize, various modifications to this process may be made within the scope of the present invention.

Figure 11A:
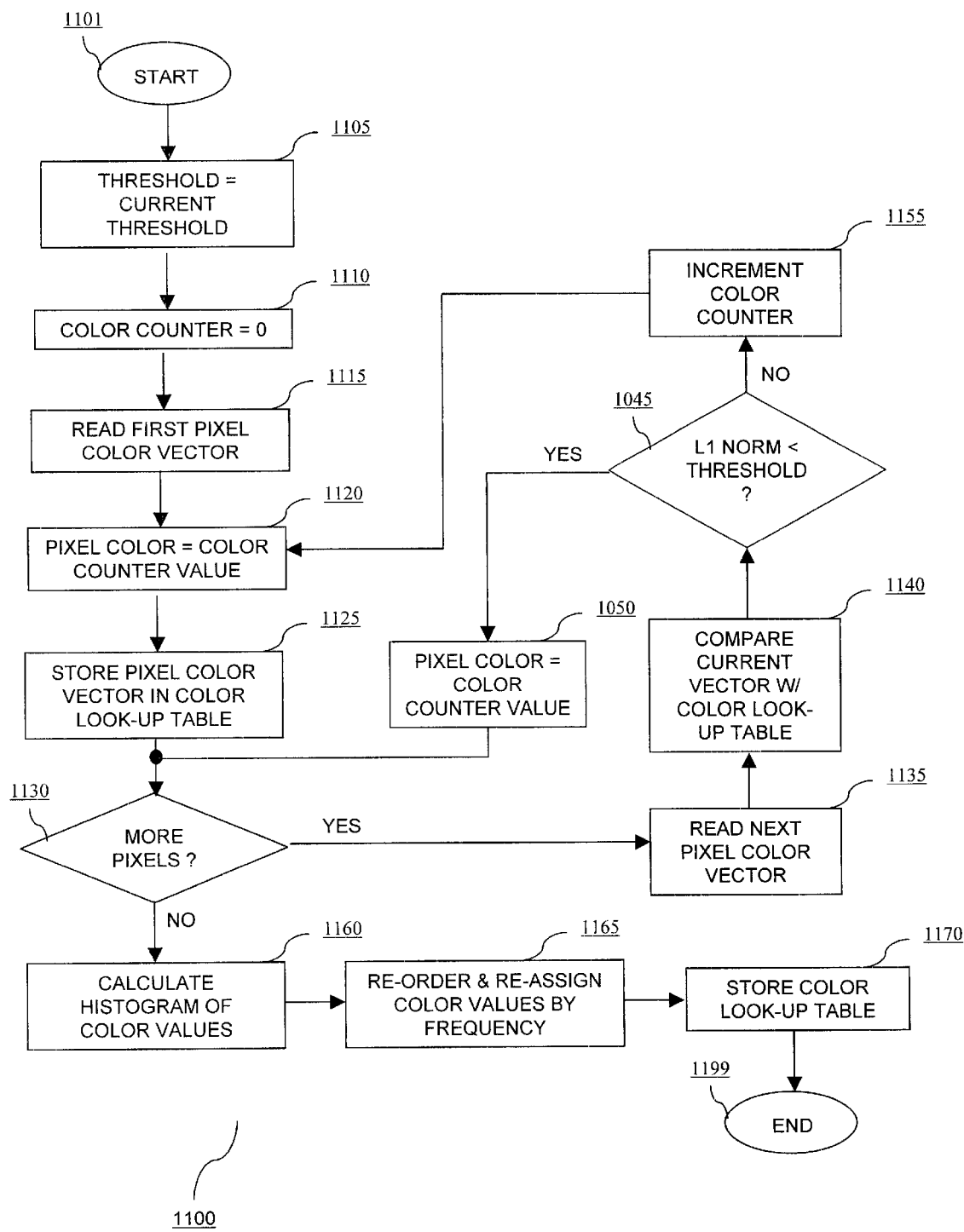
FIG. 11A is a flow chart depicting an exemplary color palette generation method in accordance with aspects of the present invention.

FIG. 11A is a flow chart depicting an exemplary color palette generation method 1100 in accordance with aspects of the present invention. The method starts at step 1101, and at step 1105, the threshold variable is assigned to equal the current threshold specified by the user or by some default value, in a manner similar to step 1005 shown in FIG. 10 and described earlier.

Still referring to FIG. 11A, at step 1110, a color counter is initialized to 0. At step 1115, the first pixel value (or "color vector") in the input color image (e.g., the set of RGB values corresponding to the upper-left pixel) is read. At step 1120, this pixel value is assigned to equal the current value of the color counter (which was initialized to 0 at step 1110). At step 1125, this color vector value is stored in a color lookup table (i.e., at this point, the color vector of the upper-left pixel will be equated with the value "0" in the color lookup table).

At step 1130, a decision is made depending on whether more pixels remain to be read in the color input image. If so, then at step 1135, the next pixel value in the image is read. At step 1140, the color vector of the current pixel is compared with the color palettes of the color look up table. At step 1145, a decision is made depending on whether the minimum color difference is less than the threshold variable value. Since pixel color values in RGB color images are three-dimensional vectors, the comparison of step 1145 may be performed by calculating the "L1 norm" of the two color vectors, which is defined as the summation of the absolute values of the differences between the red, green, and blue components of the color vector as follows:

$$L1\_norm = |R2-R1| + |G2-G1| + |B2-B1|,$$

where (R2, G2, B2) are the red, green, and blue components, respectively, of the color vector corresponding to the current pixel value, and where (R1, G1, B1) are the red, green, and blue components, respectively, of the color vector corresponding to the previous pixel value.

If the minimum difference is less than the threshold, then at step 1150, the pixel color of the current pixel is set to equal the closest color palettes in the color look up table. Thus, even though the color of the current pixel may be different from the closest color of the color look up table (but not different enough to cross the threshold) the two colors will be assigned to the same color value, thus resulting in a degree of color quantization. After step 1150, the process loops back to step 1130.

Figure 11B:
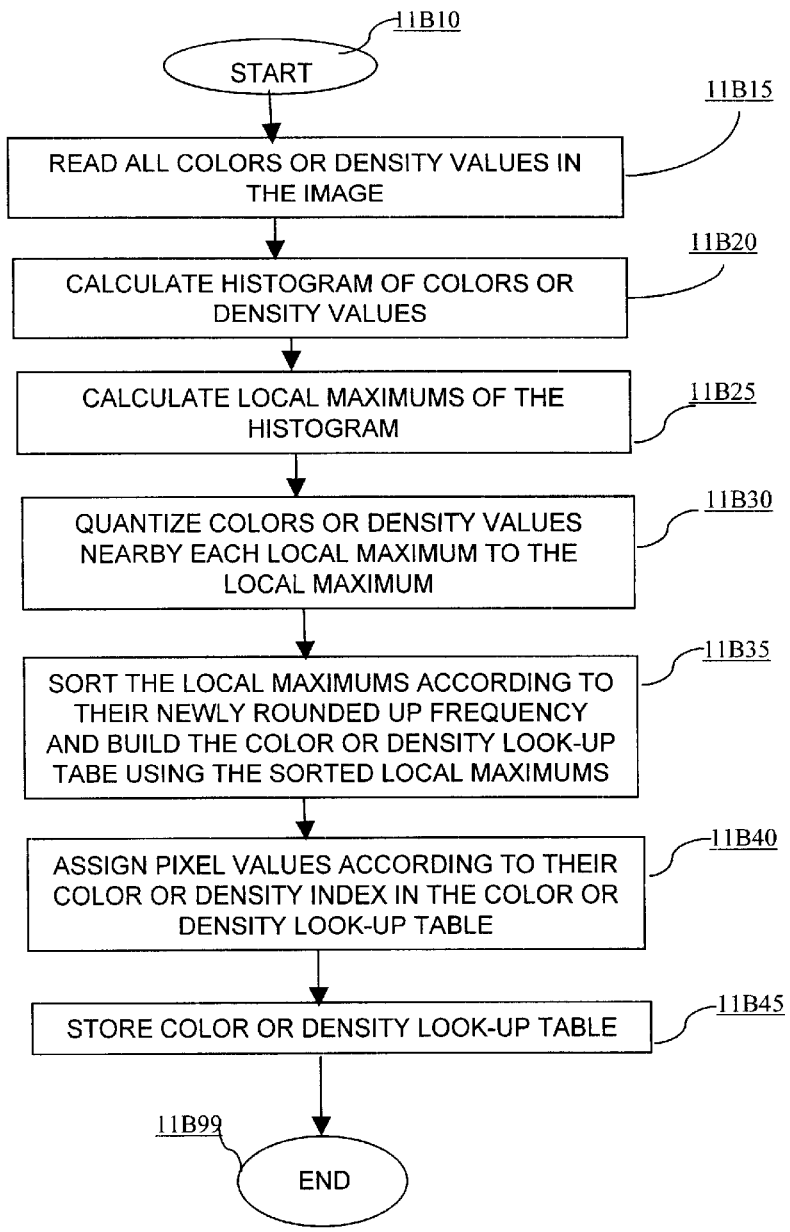
FIG. 11B is a flow chart depicting another exemplary color palette generation method in accordance with aspects of the present invention.

On the other hand, if at step 1145 it was determined that the minimum difference between the color vector value of the current pixel and the color vector value of the color look up table is greater than or equal to the threshold, then at step 1155 the color counter is incremented and at step 1120 the current pixel will be assigned the newly incremented value of the color counter, and at step 1125 a new entry will be stored in the color lookup table. This process continues until it is determined in an iteration through step 1130 that no more pixels remain in the input color image. At that point, the histogram of color values in the image is calculated at step 1160. Then, at step 1165, the color values are reordered and reassigned by frequency of occurrence, and the updated color lookup table is stored at step 1170. In this way, pixels having the most frequently occurring color will be assigned color value "0," pixels having the next most frequently occurring color will be assigned color value "1," and so on. The color lookup table (also called a "color palette") is used to keep track of the actual color vectors corresponding to each encoded pixel value. The process ends at step 1199. As those of ordinary skill in the art will recognize, various modifications to this process may be made within the scope of the present invention. In another embodiment of the present invention, the histogram of colors or intensity values in the image is calculated first prior to quantization. Then the colors or density values nearby each local maximum is quantized to the local maximum. The local maximums are sorted according to their newly rounded up frequency and the color or density look up table is build with the sorted local maximums. FIG. 11B is a flow chart depicting one such implementation.

Figure 12:
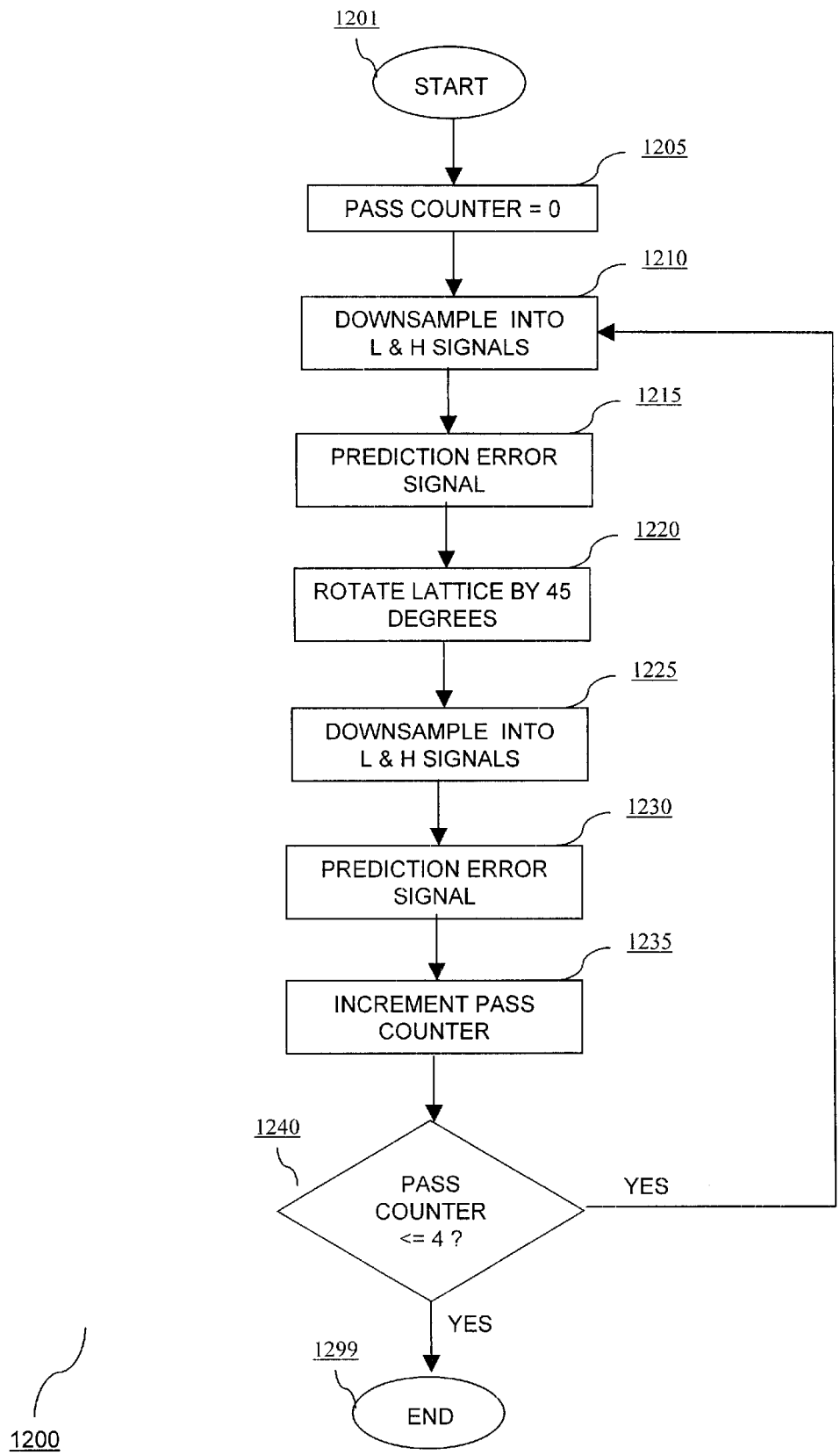
FIG. 12 is a flow chart depicting an exemplary forward transform method in accordance with aspects of the present invention.

FIG. 12 is a flow chart depicting an exemplary forward transform method 1200 in accordance with aspects of the present invention. The forward transform method 1200 depicted in FIG. 12 is one exemplary method that can be used to implement the general forward transform method 530 depicted in FIG. 5. As shown in FIG. 12, forward transform method 1200 starts at step 1201, and at step 1205, a pass counter is initialized to 0. At step 1210, a preprocessed image (or sub-image) is down sampled into "L" ("low-band") and "H" ("high-band") signals. In the context of the present invention, the original pre-processed image (or sub-image) is referred to as the "L0" signal. As those of ordinary skill of the art will recognize, step 1210 may be implemented by removing every even pixel on every odd-numbered row and every odd pixel on every even-numbered row of the L0 signal. The remaining pixels comprise the "L1" signal, while the removed pixels comprise the "H1" signal. This type of image decomposition is sometimes known to those of ordinary skill of the art as a binary quincunx image pyramid. Diagram 316-D shown in FIG. 13 graphically illustrates this process in an exemplary portion of an L0 signal. Diagram 1310 shown in FIG. 10 depicts the corresponding portion of the resulting L1 signal.

Still referring to FIG. 12, at step 1215, a prediction error signal (denominated as the "D1" signal) is generated by applying a set of prediction equations to the L1 signal and comparing with the H, signal. The prediction equations in one embodiment of the present invention will be described in more detail later with reference to FIGS. 15 to 17. At step 1220, the lattice (or "grid") is rotated by 45 degrees to realign the lattice on a rectangular grid due to peculiarities of binary quincunx image pyramids known to those of ordinary skill of the art (see diagrams 1310 and 1320 in FIG. 13). At step 1225, the current "L" signal is once again down sampled to generate the next set of "L" and "H" signals, and at step 1230, the next prediction error signal is generated. At step 1235, the pass counter is incremented (indicating that one "pass" through the iterative method has been completed), and at step 1240, a decision is made depending on whether the current value of the pass counter is less than or equal to 4. If so, the process loops back to step 1210. Otherwise, the process ends at step 1299. Nothing precludes alternative implementations with different numbers of passes. However, extensive experimentation has determined that four passes produce good results for typical images.

Figure 14A:
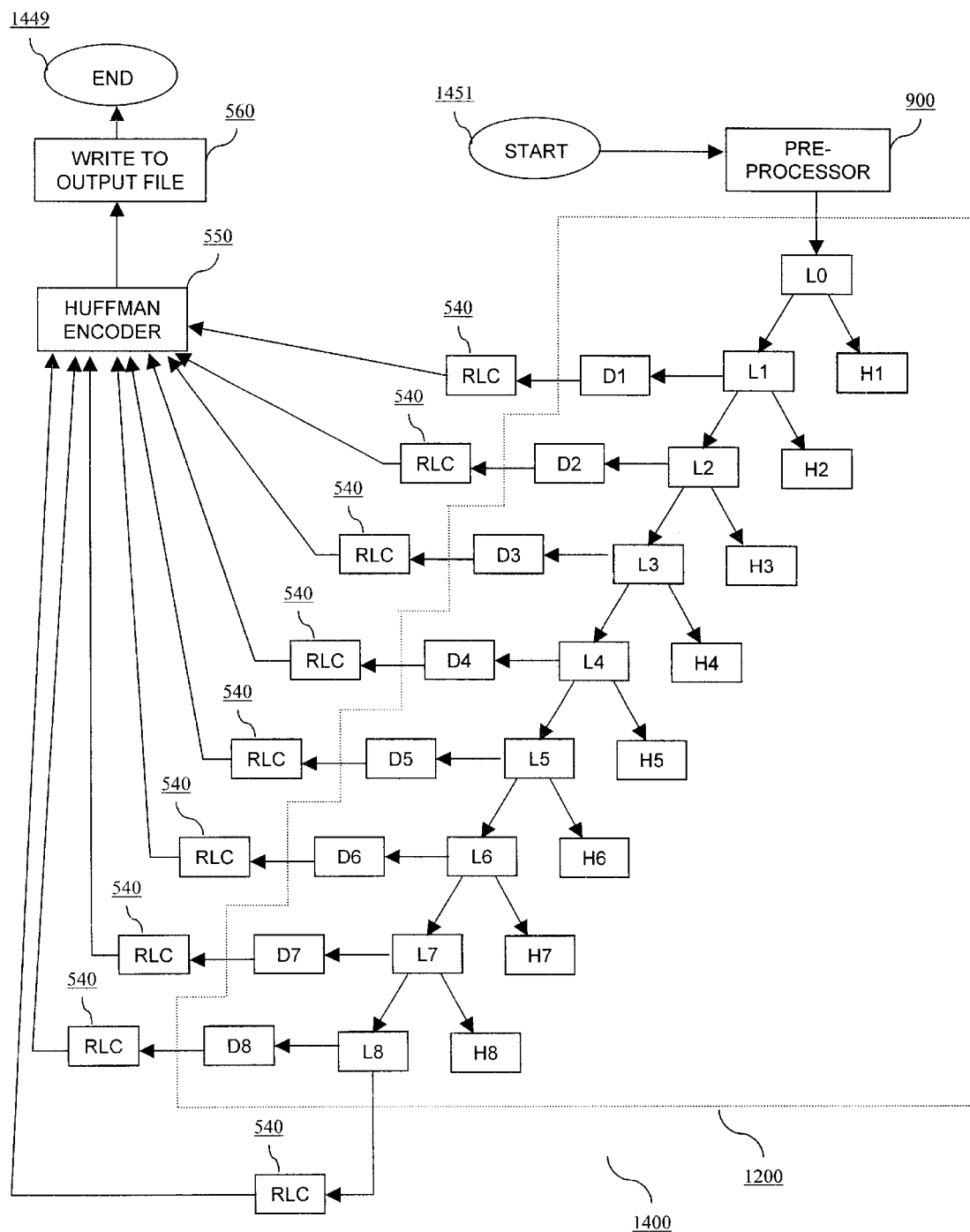
FIG. 14A is a block diagram depicting the signal flow in accordance with an exemplary forward transform method in one embodiment of the present invention.

FIG. 14A is a block diagram depicting the signal flow 1400 in accordance with the exemplary forward transform method 1200 shown in FIG. 12 in one embodiment of the present invention. As shown in FIG. 14A, signal flow 1400 starts at step 1401, and at step 900 the exemplary preprocessor algorithm described earlier with reference to FIG. 9 is executed, generating an L0 signal. As mentioned earlier, a single input image file may generate a plurality of L0 signals if the input image file is subdivided into a plurality of sub-images (see exemplary input image file 300 shown in FIG. 3). In this case, each such L0 signal may be processed as shown in FIG. 14A and described herein.

Referring to FIGS. 12 and 14A, the method 1200 depicted in the flow chart of FIG. 12 may also be represented by the signal flow 1200 shown in FIG. 14A. Each L signal is decomposed or down sampled into a next level of "L" and "H" signals, and a prediction error signal "D" is generated based on each resulting "L" and "H" signal. Thus, as shown in FIG. 14A, signals L1–L8, H1–H8, and prediction error signals D1–D8 are generated. As is well known to those of ordinary skill in the art, lossless compression may be achieved by transmitting only the D1–D8 and L8 signals (although the compression ratio of such a system by itself is 1-to-1). It should also be noted that lossy compression may be achieved by omitting (i.e., not transmitting) the D1 signal. This is equivalent to treating the D1 signal as a zero signal.

As will be described in more detail later in this document, in accordance with aspects of the present invention, each of the prediction error signals D1–D8, as well as the coarsest L signal (i.e., the L8 signal), are separately processed using a special run length coding algorithm 540. Then, the outputs of this run length coding process are combined into a single array, which is then processed with a Huffman coding algorithm 550. At step 560, the output of the Huffman encoder 550 is written to an output file in a format that will be described in more detail that later with reference to FIG. 20. Finally, the signal flow ends at step 1449. Those of ordinary skill in the art will recognize that various modifications may be made to the signal flow 1400 depicted in FIG. 14A within the scope of the present invention.

Figure 14B:
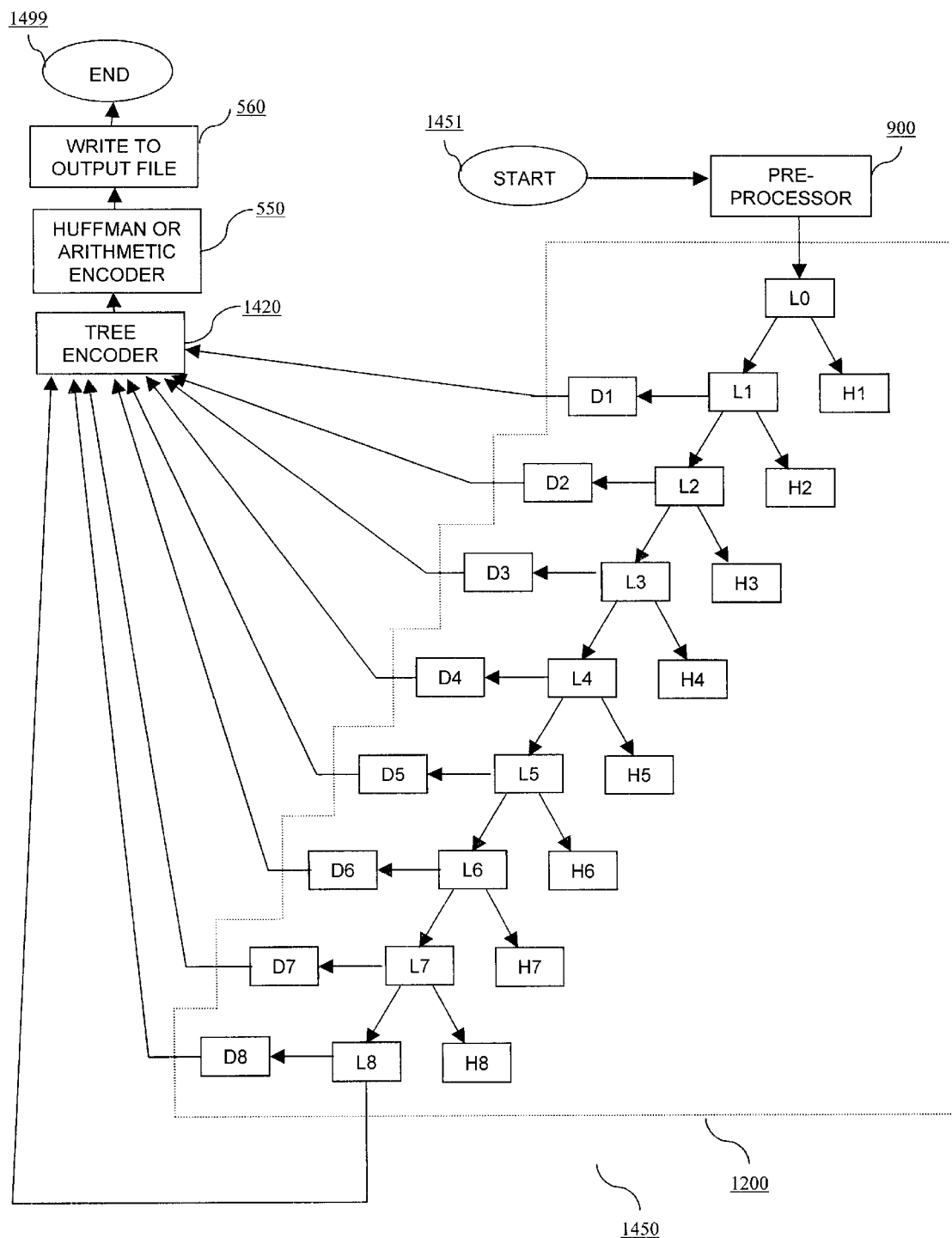
FIG. 14B is a block diagram depicting an alternative signal flow in accordance with an exemplary forward transform and tree coding method in one embodiment of the present invention.

FIG. 14B is a block diagram depicting an alternative signal flow 1450 in accordance with an exemplary forward transform and tree coding method in one embodiment of the present invention. As shown in FIG. 14B, signal flow 1450 starts at step 1451, and at step 900 the exemplary preprocessor algorithm described earlier with reference to FIG. 9 is executed, generating an L0 signal. As mentioned earlier, a single input image file may generate a plurality of L0 signals if the input image file is subdivided into a plurality of sub-images (see exemplary input image file 300 shown in FIG. 3). In this case, each such L0 signal may be processed as shown in FIG. 14B and described herein.

Referring to FIGS. 12 and 14B, the method 1200 depicted in the flow chart of FIG. 12 may also be represented by the signal flow 1200 shown in FIG. 14B. Each L signal is decomposed or down sampled into a next level of "L" and "H" signals, and a prediction error signal "D" is generated based on each resulting "L" and "H" signal. Thus, as shown in FIG. 14B, signals L1–L8, H1–H8 and D1–D8 are generated. As is well known to those of ordinary skill in the art, lossless compression may be achieved by transmitting only the D1–D8 and L8 signals (although the compression ratio of such a system by itself is 1-to-1). It should also be noted that lossy compression may be achieved by omitting (i.e., not transmitting) the D1 signal. This is equivalent to treating the D1 signal as a zero signal.

In the alternative signal flow 1450 shown in FIG. 14B the eight difference signals D1–D8 and the coarsest low-band signal L8 are processed by a tree encoder 1420. This will be described in more detail below. Then, the output of the tree encoder 1420 is processed by a Huffman or arithmetic coding algorithm 550. At step 560, the output of the Huffman arithmetic encoder 550 is written to an output file in the format that will be described in more detail that later with reference to FIG. 20. Finally, the signal flow ends at step 1499. Those of ordinary skill in the art will recognize that various other modifications may be made to the signal flow 1450 depicted in FIG. 14B within the scope of the present invention.

Figure 14C:
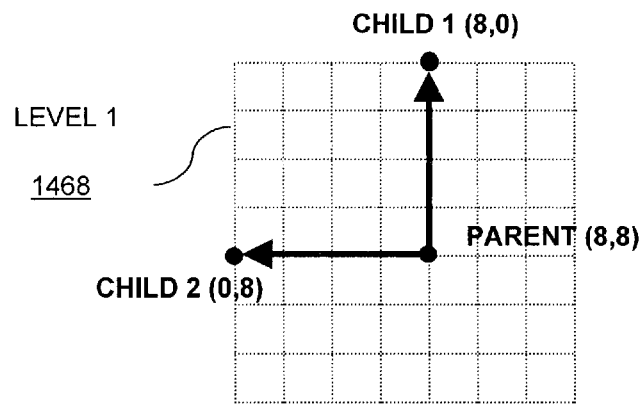
FIGS. 14C–14H are block diagrams each depicting three diagrammatic levels relating to tree coding in accordance with various embodiment of the present invention.
Figure 14C:
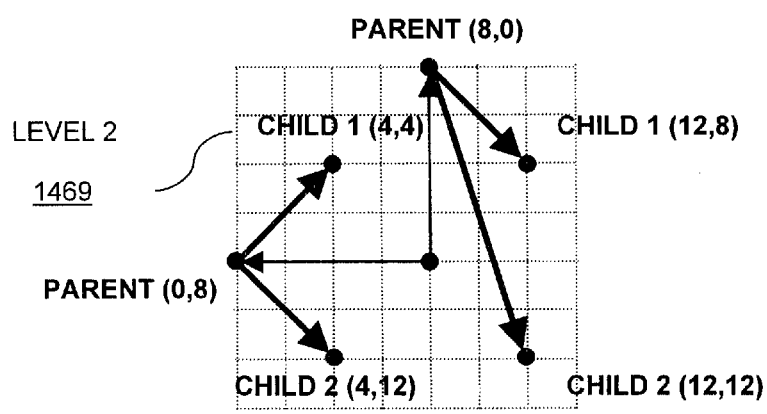
Figure 14C:
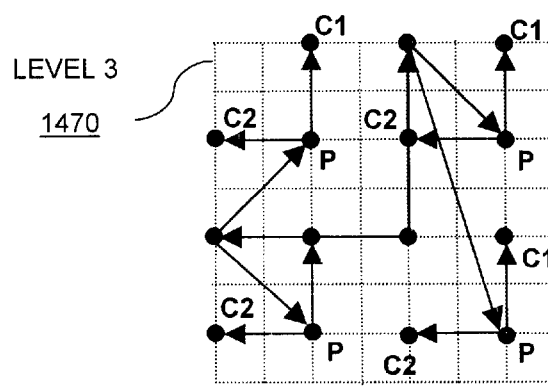
Figure 14D:
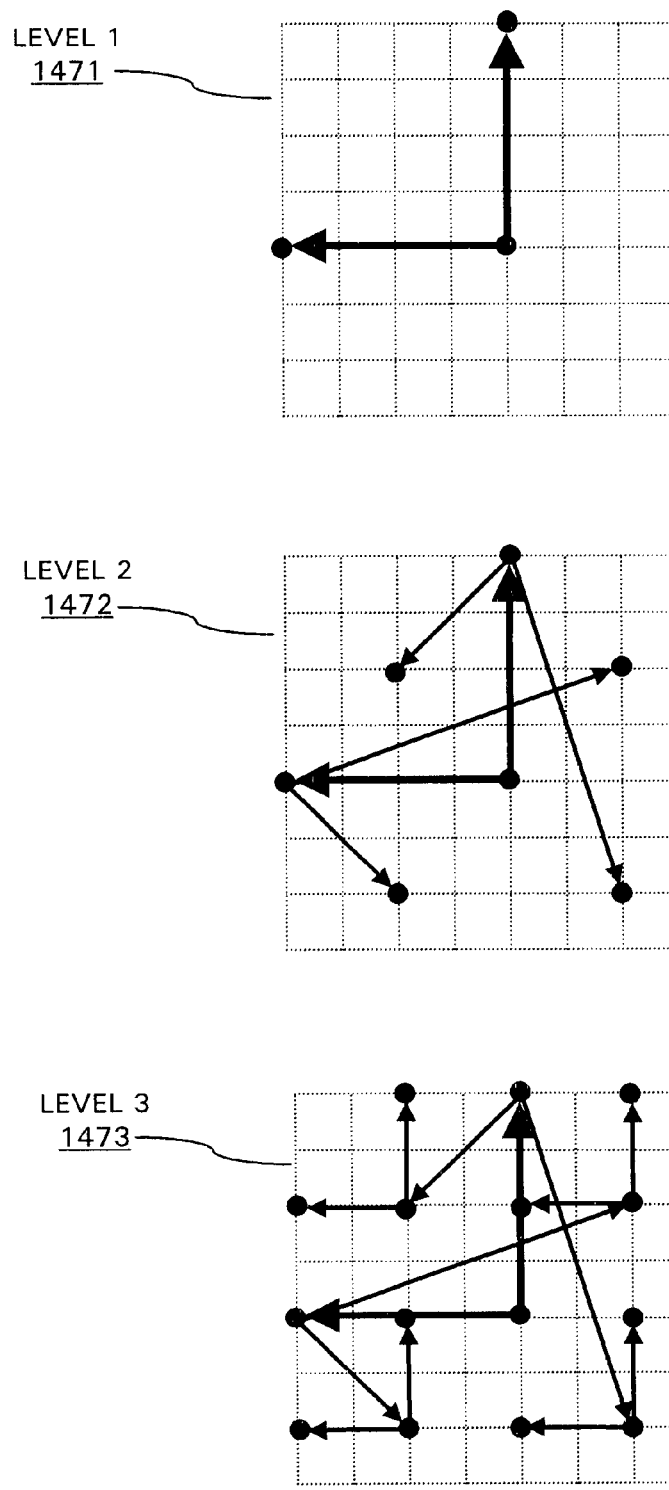
Figure 14E:
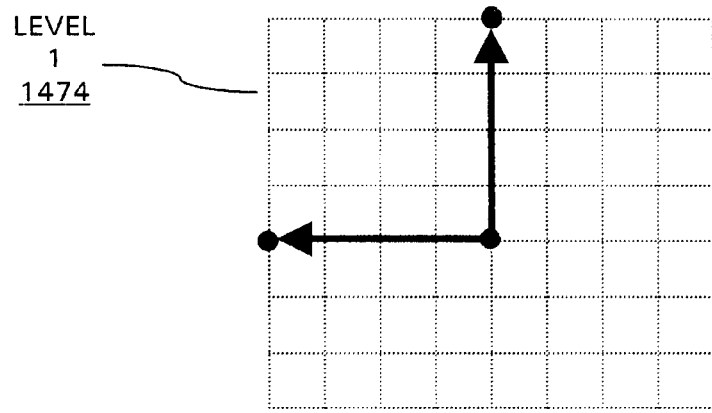
Figure 14E:
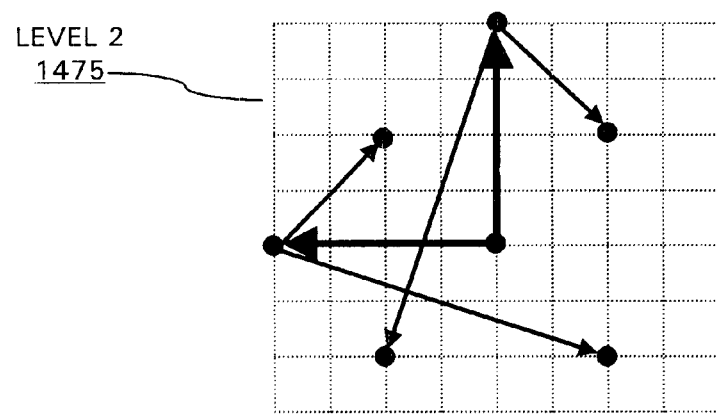
Figure 14E:
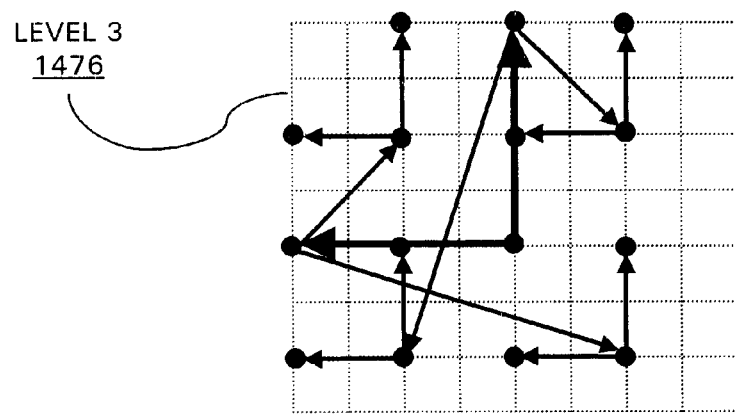
Figure 14F:
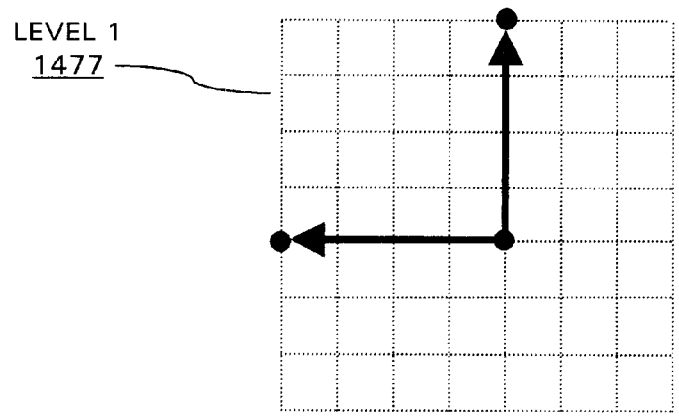
Figure 14F:
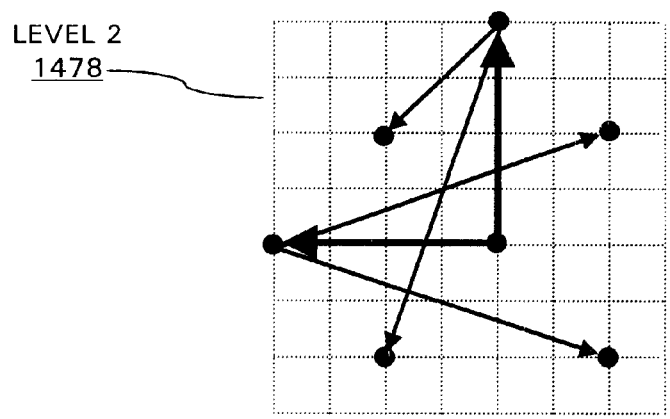
Figure 14F:
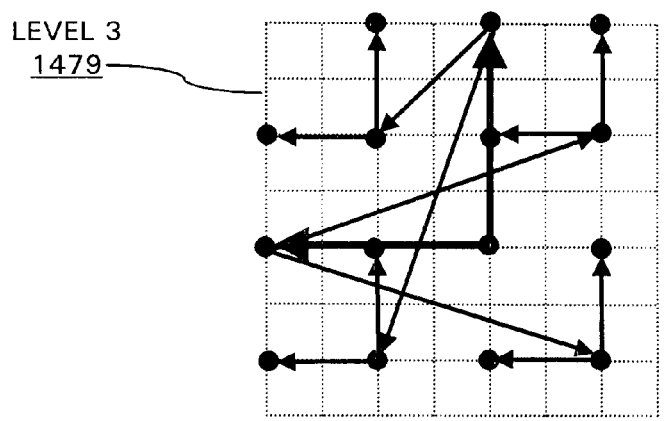
Figure 14G:
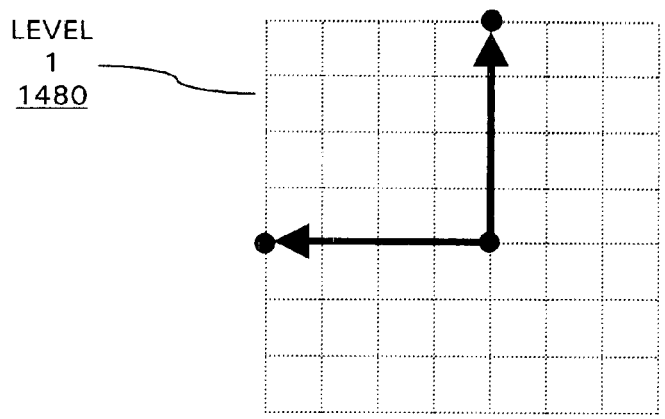
Figure 14G:
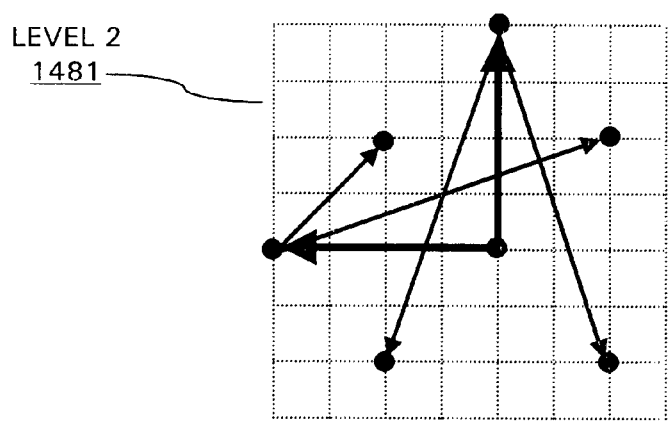
Figure 14G:
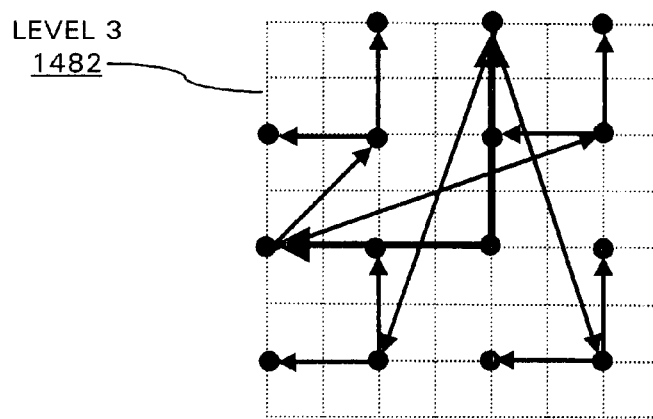
Figure 14H:
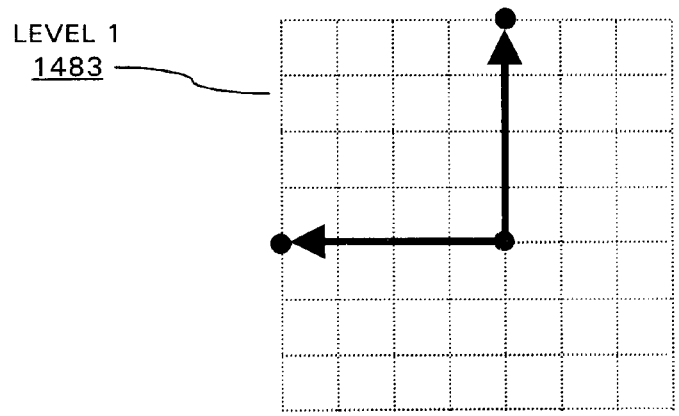
Figure 14H:
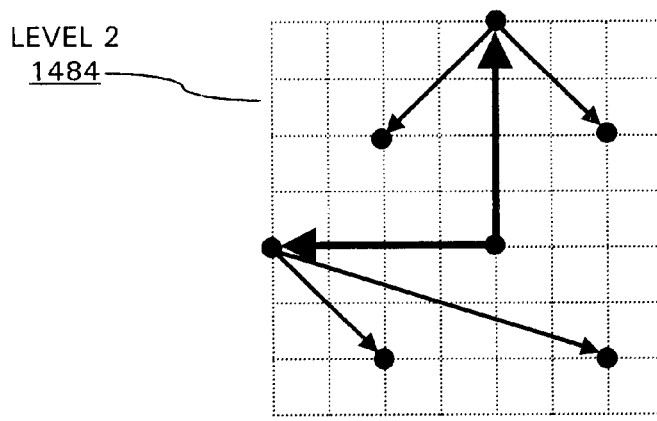
Figure 14H:
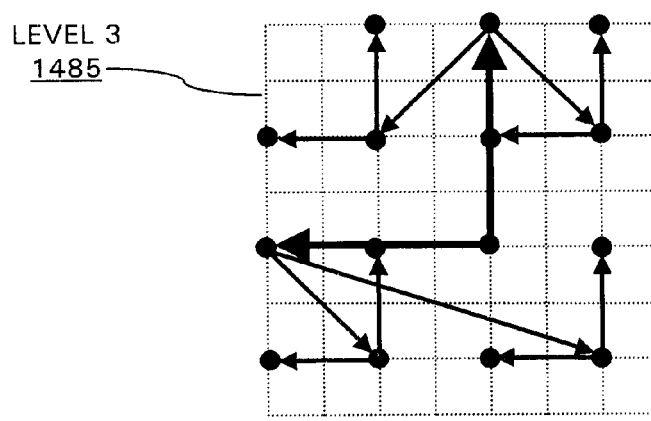

FIG. 14C is a block diagram depicting three diagrammatic levels relating to tree coding according to one embodiment of the present invention. Various forms of tree encoders (e.g., quad tree encoders, binary tree encoders) are well known to those of ordinary skill in the art, and will not be described in detail herein, so as not to over complicate the present discussion. Useful information may be found in the article by Jerome M. Shapiro entitled "Embedded image coding using zerotrees of wavelet coefficients" (IEEE Trans. Signal Processing, 41(12):3445–3462, December 1993).

Referring to FIG. 14C, three diagrammatic levels 1468, 1469 and 1470 relating to one binary tree structure according to one embodiment of the present invention are shown. Using the conventional terms used with tree encoders, Level 1 (diagram 1468 in FIG. 14C) corresponds to the coarsest prediction error signal (e.g., signal D8 shown in FIG. 14B). Each pixel in Level 1 is called a "parent," and it has two "children," which are located in the next coarsest prediction error signal (e.g., signal D7 shown in 14B). In level 2 (diagram 1469 in FIG. 14C), each of these children now becomes a parent, and has two of its own children, which are located in the next coarsest prediction error signal (e.g., signal D6 shown in FIG. 14B). In level 3 (diagram 1470 in FIG. 14C), each of these four children now becomes a parent, and has two of its own children, which are located in the next coarsest prediction error signal (e.g., signal D5 shown in FIG. 14B). The process of identifying parent-child relationships continues iteratively in the same manner until all pixels in the finest prediction signal (e.g., signal D1 shown in FIG. 14B) have been identified. FIGS. 14D, 14E, 14F, 14G and FIG. 14H are block diagrams each depicting three diagrammatic levels relating to alternative tree encoding structures that may be used as an alternative to that depicted in more detail in FIG. 14C. Those of ordinary skill in the art will now realize that many other tree structures may also be used as well. As those of ordinary skill will recognize, significant compression may be achieved by binary tree encoding the prediction error signals (e.g., signals D1–D8 in FIG. 14B). This process is conceptually similar to the run length encoding process described above with reference to FIG. 14A, and which will be described in more detail later, with reference to FIG. 18C. For example, if all "offspring" across all generations are equal to zero, then an entire branch may be represented as a single zero by the tree encoding method. Further details concerning tree encoders and decoders will be provided later (see method 1420 and 2120 in association with FIG. 18C and FIG. 23C).

Figure 15:
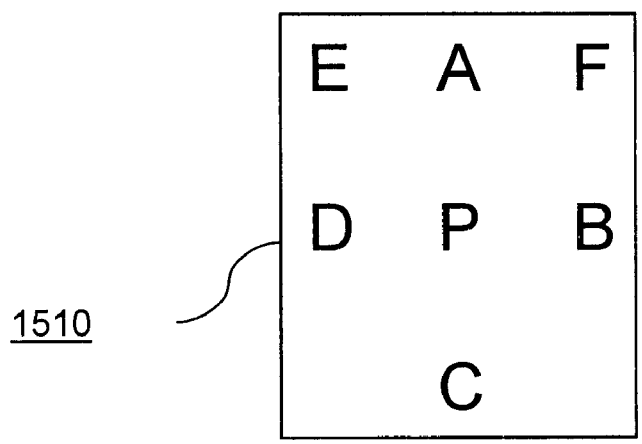
FIG. 15 is a block diagram depicting a portion of an image for the purposes of pixel value prediction in accordance with aspects of the present invention.

FIG. 15 is a block diagram depicting a portion 1510 of an image for the purposes of pixel value prediction in accordance with aspects of the present invention. Referring to diagram 1510 shown in FIG. 15, in the context of the present invention, each pixel "P" having a value which is to be predicted is surrounded by four neighbors (i.e., "A," "B," "C" and "D") in the present "L" level of the binary quincunx image pyramid, as well as two neighbors (i.e., "E" and "F") in the present prediction level of the binary quincunx image pyramid. The picture rotates by 45 degrees in the next level of the binary quincunx pyramid.

Figure 16A:
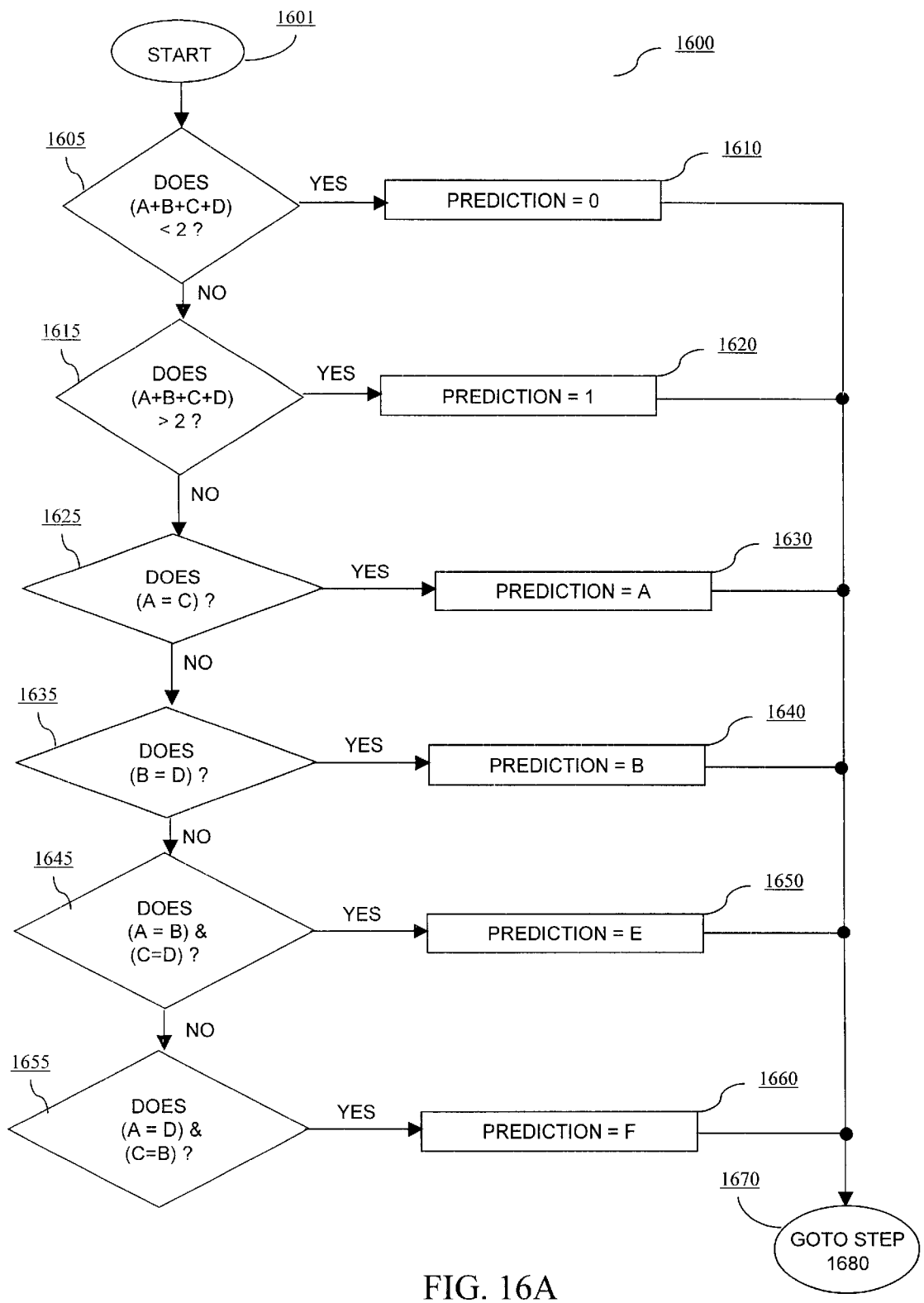
FIG. 16A is a flow chart depicting a portion of an exemplary bilevel pixel value prediction method in accordance with aspects of the present invention.
Figure 16B:
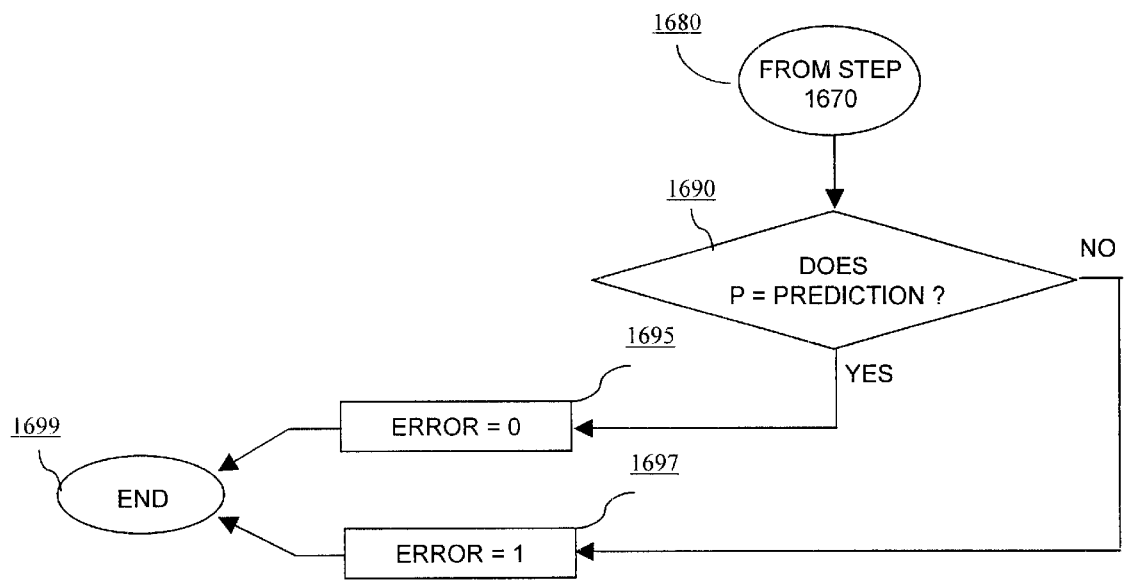
FIG. 16B is a flow chart depicting another portion of an exemplary bilevel pixel value prediction method in accordance with aspects of the present invention.

FIG. 16A is a flow chart depicting a portion of an exemplary bilevel pixel value prediction method 1600 in accordance with aspects of the present invention. The flow chart 1600 depicted in FIGS. 16A and 16B is premised on the assumption that the input image to be compressed is a bilevel image file. As shown in FIG. 16A, bilevel pixel value prediction method 1600 starts at step 1601, and at step 1605 a decision is made depending on whether the sum of the neighbor pixels A, B, C and D (see FIG. 15) is less than 2. If so, the predicted value is set to "0" at step 1610, and the process continues with step 1670. Otherwise, at step 1615, a decision is made depending on whether the sum of the neighbor pixels A, B, C, and D is greater than 2. If so, the predicted value is set to "1" at step 1620 and the process continues with step 1670. Otherwise, at step 1625, a decision is made depending on whether the value of neighbor pixel A is equal to the value of neighbor pixel C. If so, the predicted value is set to the value of neighbor pixel A at step 1630 and the process continues with step 1670. Otherwise, at step 1635, a decision is made depending on whether the value of neighbor pixel B is equal to the value of neighbor pixel D. If so, the predicted value is set to the value of neighbor pixel B at step 1640 and the process continues with step 1670. Otherwise, at step 1645, a decision is made depending on whether the value of neighbor pixel A is equal to the value of neighbor pixel B and the value of neighbor pixel C is equal to the value of neighbor pixel D. If so, the predicted value is set to the value of neighbor pixel E at step 1650 and the process continues with step 1670. At step 1655, having exhausted all other possible value combinations, the value of neighbor pixel A is equal to the value of neighbor pixel D and the value of neighbor pixel C is equal to the value of neighbor pixel B. Therefore, the predicted value is set to the value of neighbor pixel F at step 1660 and the process continues with step 1670. At step 1670, the process continues with step 1680 shown in FIG. 16B. Naturally, in a practical implementation, the process could proceed directly to step 1690 shown in FIG. 16B. It should be noted that although the neighbor pixels E and F belong to the same prediction signal currently being generated, their values have already been recovered by the time the value of pixel "P" must be predicted, because their position is earlier in the image. It should also be noted that "edge" conditions can easily be handled using various techniques known to those of ordinary skill in the art (e.g., padding, symmetric mirroring), depending on the requirements of each particular implementation.

FIG. 16B is a continuation of the method 1600 shown in FIG. 16A. The process continues from step 1670 of FIG. 16A with step 1680 of FIG. 16B, at which point the process proceeds to step 1690. At step 1690, at decision is made depending on whether the predicted value is equal to the actual value of the pixel whose value is being predicted. If the prediction is correct, then at step 1695 the error value "0" is generated and the process ends at step 1699. Otherwise, if the prediction is incorrect, then at step 1697 the error value "1" is generated and the process ends at step 1699.

Figure 17:
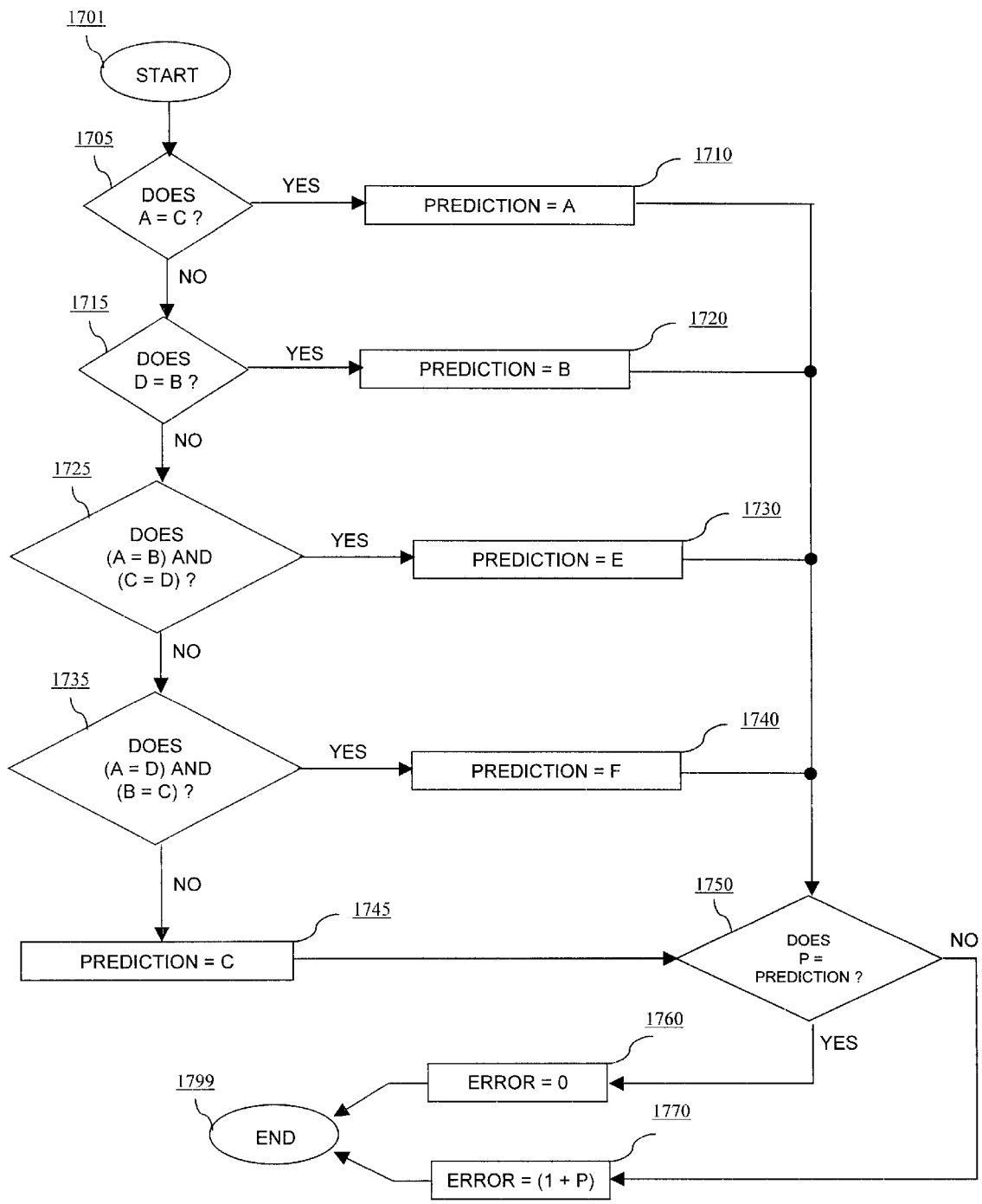
FIG. 17 is a flow chart depicting an exemplary multilevel pixel value prediction method in accordance with aspects of the present invention.

FIG. 17 is a flow chart depicting an exemplary multilevel pixel value prediction method 1700 in accordance with aspects of the present invention. The flow chart 1700 depicted in FIG. 17 is premised on the assumption that the input image to be compressed is either a grayscale image file pre-processed in accordance with method 900 shown in FIG. 9 and described earlier (or its equivalent) or a color image file pre-processed in accordance with method 1000 shown in FIG. 10 and described earlier (or its equivalent).

As shown in FIG. 17, multilevel pixel value prediction method 1700 starts at step 1701, and at step 1705 a decision is made depending on whether the value of neighbor pixel A is equal to the value of neighbor pixel C. If so, the predicted value is set to the value of neighbor pixel A at step 1710 and the process continues with step 1750. Otherwise, at step 1715, a decision is made depending on whether the value of neighbor pixel B is equal to the value of neighbor pixel D. If so, the predicted value is set to the value of neighbor pixel B at step 1720 and the process continues with step 1750. Otherwise, at step 1725, a decision is made depending on whether the value of neighbor pixel A is equal to the value of neighbor pixel B and the value of neighbor pixel C is equal to the value of neighbor pixel D. If so, the predicted value is set to the value of neighbor pixel E at step 1730 and the process continues with step 1750. Otherwise, at step 1735, a decision is made depending on whether the value of neighbor pixel A is equal to the value of neighbor pixel D and the value of neighbor pixel C is equal to the value of neighbor pixel B. If so, the predicted value is set to the value of neighbor pixel F at step 1740 and the process continues with step 1750. Otherwise, the predicted value is set to the value of neighbor pixel C at step 1745 and the process continues with step 1750.

As was the case with bilevel images, although the neighbor pixels E and F belong to the same prediction signal currently being generated, their values have already been recovered by the time the value of pixel "P" must be predicted, because their position is earlier in the image. Edge conditions can be handled in the same manner as was the case with bilevel images, in accordance with the requirements of each particular implementation. At step 1750, at decision is made depending on whether the predicted value is equal to the actual value of the pixel whose value is being predicted. If the prediction is correct, then at step 1760 the error value "0" is generated and the process ends at step 1799. Otherwise, if the prediction is incorrect, then at step 1770 the error value (1+P) (i.e., the actual pixel value plus one) is generated and the process ends at step 1799. As those of ordinary skill in the art will recognize, transmitting the value (1+P) instead of "P" avoids the ambiguity between pixels which were correctly predicted and pixels having the value "0" which were incorrectly predicted. The set of prediction equations depicted in FIGS. 16A, 16B and 17 and described above were developed as a result of extensive experimentation, and have been found to produce good compression ratios while requiring relatively low processing power to execute.

Figure 18A:
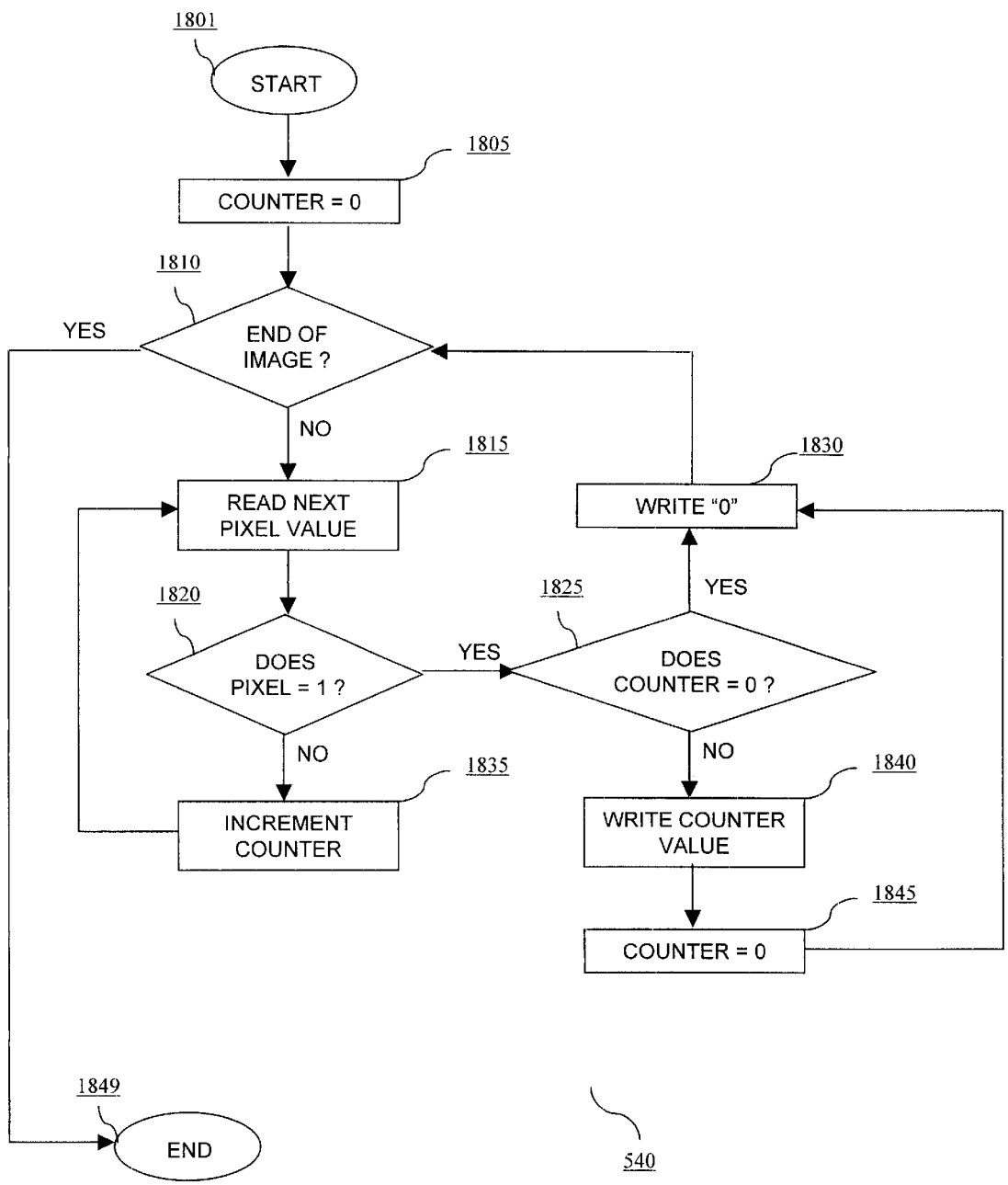
FIG. 18A is a flow chart depicting an exemplary run length coding method for bilevel images in accordance with aspects of the present invention.

FIG. 18A is a flow chart depicting an exemplary bilevel run length coding method 540 in accordance with aspects of the present invention. Method 540 shown in FIG. 18A is an exemplary algorithm for implementing the general run length encoder 540 shown in FIG. 5 and described earlier, for bilevel images. In general, the method 540 shown in FIG. 18A operates on all of the prediction error signals (e.g., D1–D8) and the coarsest low-band signal (e.g., L8) to generate a single "0" for each pixel that was incorrectly predicted, and a counter value representing the number of consecutive correctly predicted pixels. More specifically, referring to FIG. 18A, the process starts at step 1801, and at step 1805, a counter is initialized to zero.

At step 1810, a decision is made depending on whether the end of the current input file/image has been reached. So long as the end of the file/image has not been reached (i.e., if there are more pixels remaining to be read), the process continues to step 1815, at which point the next predicted pixel value is read. When the end of the file/image is reached during an iterations through step 1810 and no more predicted pixel values remain to be read, the process ends at step 1849.

At step 1820, a decision is made depending on whether the current predicted pixel value equals "1" or not. If so (i.e., if the pixel was incorrectly predicted), then at step 1825, a decision is made depending on whether the current value of the counter equals zero or not. If it is (indicating that the current incorrectly predicted encoded pixel value does not follow a run of correctly predicted encoded pixel values), then at step 1830 a single "0" is written to the output of the process, and the process loops back to step 1810.

It should be noted that a fixed storage size (e.g. 16 bits) should be used for the values written to the output of the run length coding process, to eliminate ambiguities in interpreting the output. Those of ordinary skill in the art to will recognize that this fixed storage size will not affect the overall compression ratio, because the subsequent Huffman coding steps implemented according to aspects of the present invention will compress the code words used to represent run length coding outputs in any event.

Referring back to step 1820, if the current pixel value does not equal "1" (indicating a correctly predicted pixel), then the value of the counter is incremented at step 1835, and the process then loops back to step 1815. So long as correctly predicted pixel values continue to be encountered, the counter continues to be incremented. Then, when the string of correctly predicted pixel values ends (i.e., when an iteration through step 1820 results in reading the value "1" after a string of "0" values), then when the process continues to step 1825, the counter value will not be "0," and the process will branch to step 1840, at which point the current counter value is written to the output. Then, at step 1845, the counter value is reset to zero, and the process loops back to 1830, when a single "0" is written to the output to account for the incorrectly predicted encoded pixel value that ended the string of correctly predicted encoded pixel values. Those of ordinary skill in the art will recognize that the process flow described above and depicted in FIG. 18A eliminates ambiguities in interpreting the output, because the strings of correctly predicted values (compressed into a single run-length value) will not be confused with the incorrectly predicted values, since the incorrectly predicted values will always have values equal to zero, while the strings of correctly predicted values will always be stored as numbers greater than zero.

Figure 18B:
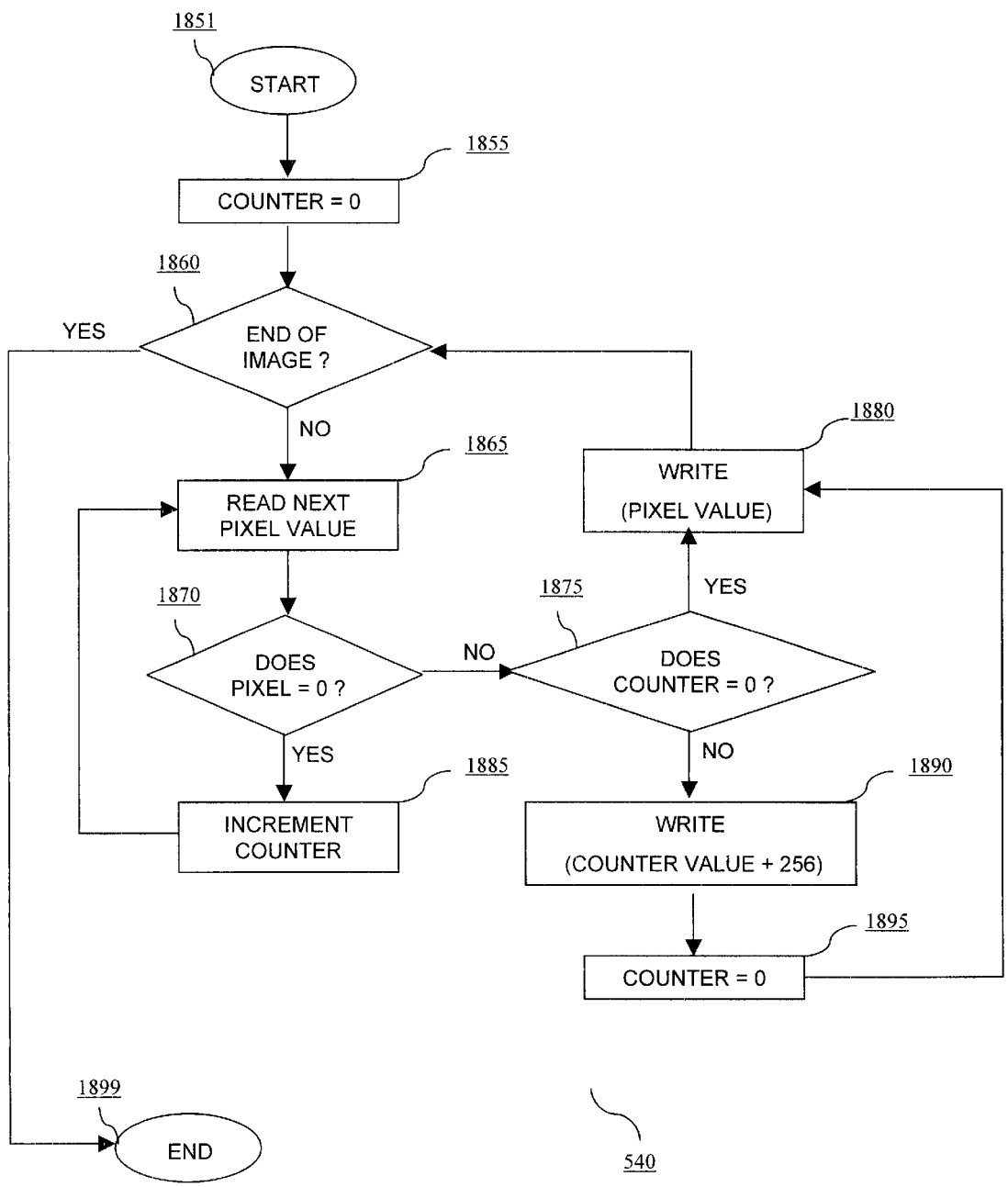
FIG. 18B is a flow chart depicting an exemplary run length coding method for multilevel images in accordance with aspects of the present invention.

FIG. 18B is a flow chart depicting an exemplary run length coding method for multilevel images in accordance with aspects of the present invention. Method 540 shown in FIG. 18A is an exemplary algorithm for implementing the general run length encoder 540 shown in FIG. 5 and described earlier, for multilevel images. In general, the method 540 shown in FIG. 18B operates on all of the prediction error signals (e.g., D1–D8) and the coarsest low-band signal (e.g., L8) to generate a single pixel value for each pixel that was incorrectly predicted, and a counter value representing the number of consecutive correctly predicted pixels. More specifically, referring to FIG. 18B, the process starts at step 1851, and at step 1855, a counter is initialized to zero.

At step 1860, a decision is made depending on whether the end of the current input file/image has been reached. So long as the end of the file/image has not been reached (i.e., if there are more pixels remaining to be read), the process continues to step 1865, at which point the next predicted pixel value is read. When the end of the file/image is reached during an iterations through step 1860 and no more predicted pixel values remain to be read, the process ends at step 1899.

At step 1870, a decision is made depending on whether the current predicted pixel value equals "0" or not. If not (i.e., if the pixel was incorrectly predicted), then at step 1875, a decision is made depending on whether the current value of the counter equals zero or not. If it is (indicating that the current incorrectly predicted encoded pixel value does not follow a run of correctly predicted encoded pixel values), then at step 1880 the same pixel value that was read is written to the output of the process, and the process loops back to step. 1860.

As was the case with FIG. 18A, it should be noted that a fixed storage size (e.g. 16 bits) should be used for the values written to the output of the run length coding process, to eliminate ambiguities in interpreting the output. Those of ordinary skill in the art to will recognize that this fixed storage size will not affect the overall compression ratio, because the subsequent Huffman coding steps implemented according to aspects of the present invention will compress the code words used to represent run length coding outputs in any event.

Referring back to step 1870, if the current predicted encoded pixel value equals "0" (indicating a correctly predicted pixel), then the value of the counter is incremented at step 1885, and the process then loops back to step 1865. So long as correctly predicted encoded pixel values continue to be encountered, the counter continues to be incremented. Then, when the string of correctly predicted encoded pixel values ends (i.e., when an iteration through step 1870 results in reading a non-zero value after a string of "0" values), then when the process continues to step 1875, the counter value will not be "0," and the process will branch to step 1890, at which point the current counter value plus the value "256" is written to the output. Then, at step 1895, the counter value is reset to zero, and the process loops back to 1880, when the non-zero value that was read at step 1865 is written to the output to account for the incorrectly predicted encoded pixel value that ended the string of correctly predicted encoded pixel values. Those of ordinary skill in the art will recognize that the process flow described above and depicted in FIG. 18B eliminates ambiguities in interpreting the output, because the strings of correctly predicted values (compressed into a single run-length value) will not be confused with the incorrectly predicted values, since the incorrectly predicted values will always have values ranging between 1 and 256, while the strings of correctly predicted values will always be stored as numbers greater than 256. Those of ordinary skill in the art will now realize that the same method works for other multilevel images whose number of levels is different from 256.

Figure 18C:
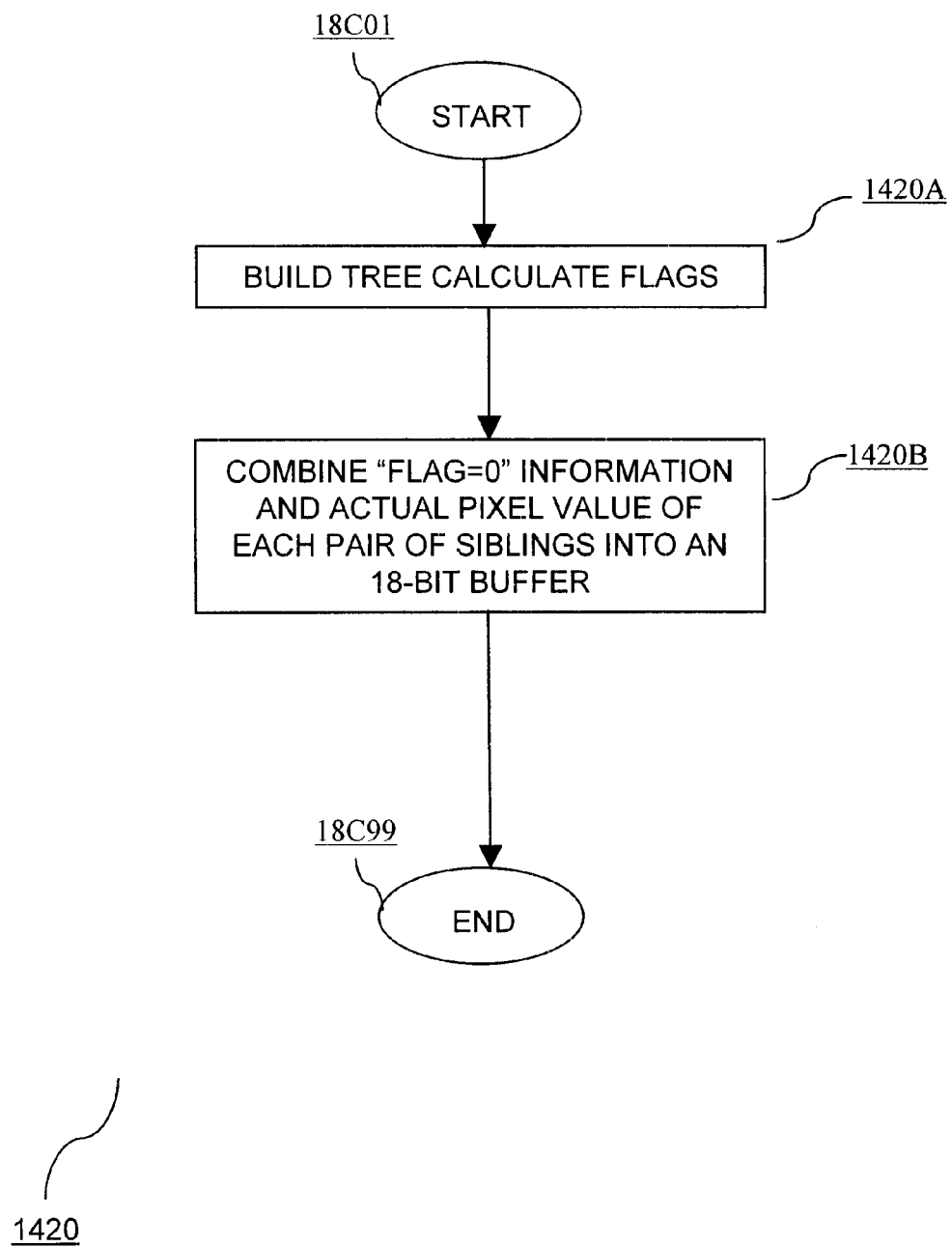
FIG. 18C is a flow chart depicting an exemplary tree coding method for multilevel and/or bilevel images in accordance with aspects of the present invention.

FIG. 18C is a flow chart depicting an exemplary tree coding method in accordance with aspects of the present invention. Method 1420 shown in FIG. 18C is an exemplary algorithm for implementing the general tree encoder 1420 shown in FIG. 14B and described earlier. At step 1420A a flag is assigned to each pixel in the H1, H2, . . . H8 band as follows. First, all pixels whose offspring are not all zero are assigned flag=1. Next, if all offspring of a pixel are equal to zero but the parent of the pixel is not already assigned flag=1, then the pixel is called a zero tree root and is assigned flag=0. All other pixels (i.e., offspring of zero tree roots) are assigned flag=2.

At step 1420B, the flag information and pixel value of each signal D1, D2, . . . , D8 are packed into 18-bit buffers (if the image is a bilevel image, then as those of ordinary skill in the art will know, two-bit buffers will be enough) as follows. Within each H band, if a pixel is flagged with "2" (i.e., it is the offspring of a zero tree root), then the tree encoder transmits nothing. If the pixel is flagged with "0" (i.e., it is a zero tree root), then one bit is packed in the 18-bit buffer to indicate this information, and one byte is also packed in the 18-bit buffer to store the actual prediction error of the pixel. Another bit and byte is used to store the similar information of the pixel's sibling. These 18-bit (or 2 bits if it is a bi-level image) buffers will then be processed by an entropy coder band by band.

Figure 19:
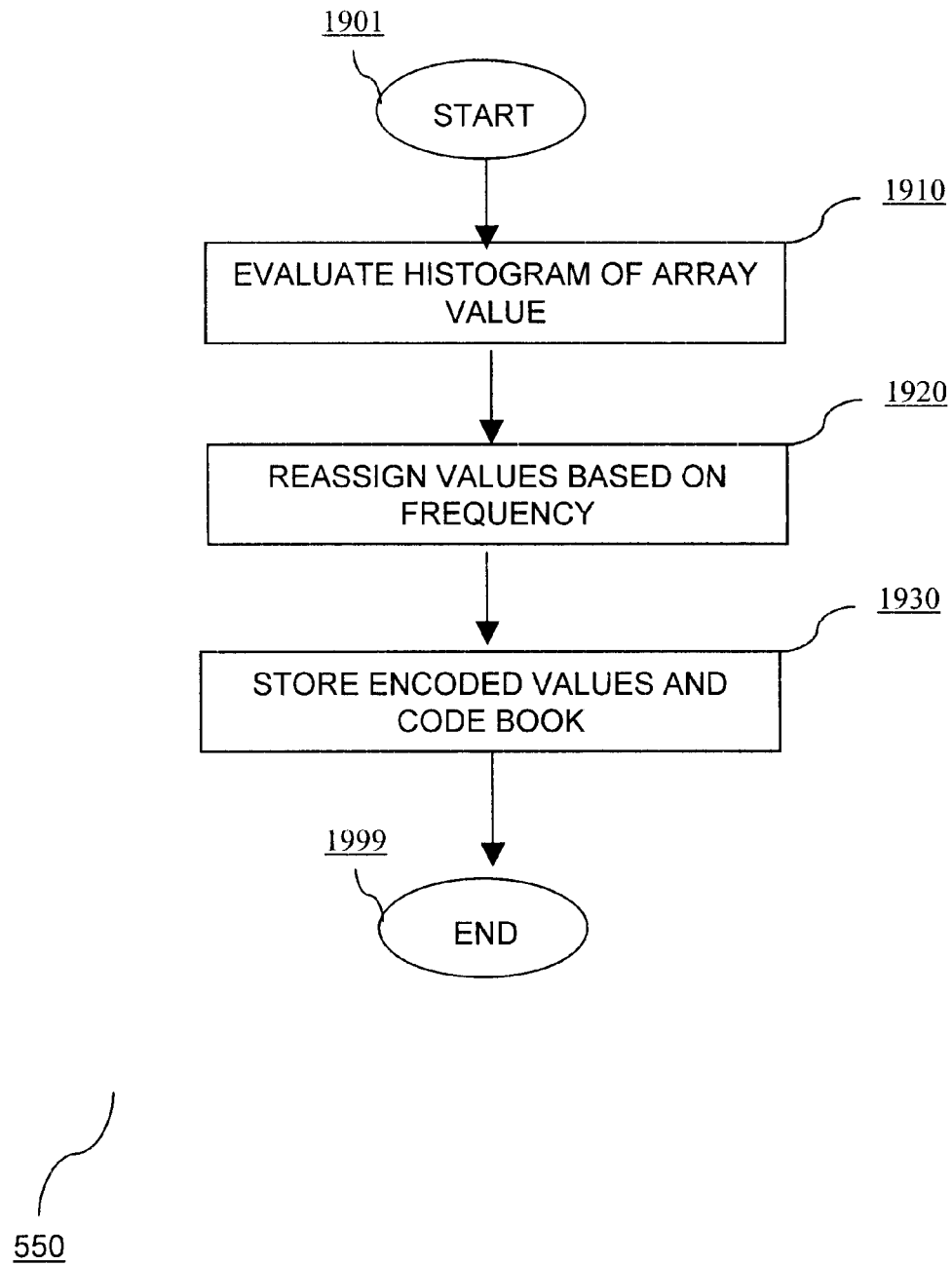
FIG. 19 is a flow chart depicting an exemplary Huffman coding method in accordance with aspects of the present invention.

FIG. 19 is a flow chart depicting an exemplary Huffman coding method 550 in accordance with aspects of the present invention. Method 550 shown in FIG. 19 is an exemplary algorithm for implementing the general Huffman encoder 550 shown in FIG. 5 and described earlier. Referring to FIG. 19, the process starts at step 1901, and at step 1910 the histogram of array values is evaluated, where the array in one embodiment comprises all of the run length encoded prediction error signals D1–D8 and the run length encoded coarsest low band signal L8 as shown in FIG. 14A. At step 1920, the array values are reassigned based on their frequency, with the most frequently occurring value being assigned the shortest code word and the least frequently occurring value being assigned the longest code word. At step 1930, the encoded values and the codebook correlated encoded values to the original values before the Huffman coding step are all stored. Finally, the process ends at step 1999. Those of ordinary skill in the art will recognize that the method 550 described above with reference to FIG. 19 is a conventional Huffman coding algorithm. Therefore, additional details regarding this algorithm need not be described herein so as not to over complicate the present discussion. Moreover, those of ordinary skill in the art will recognize that alternative coding methods (e.g., arithmetic coding) may be used within the scope of the present invention.

Figure 20A:
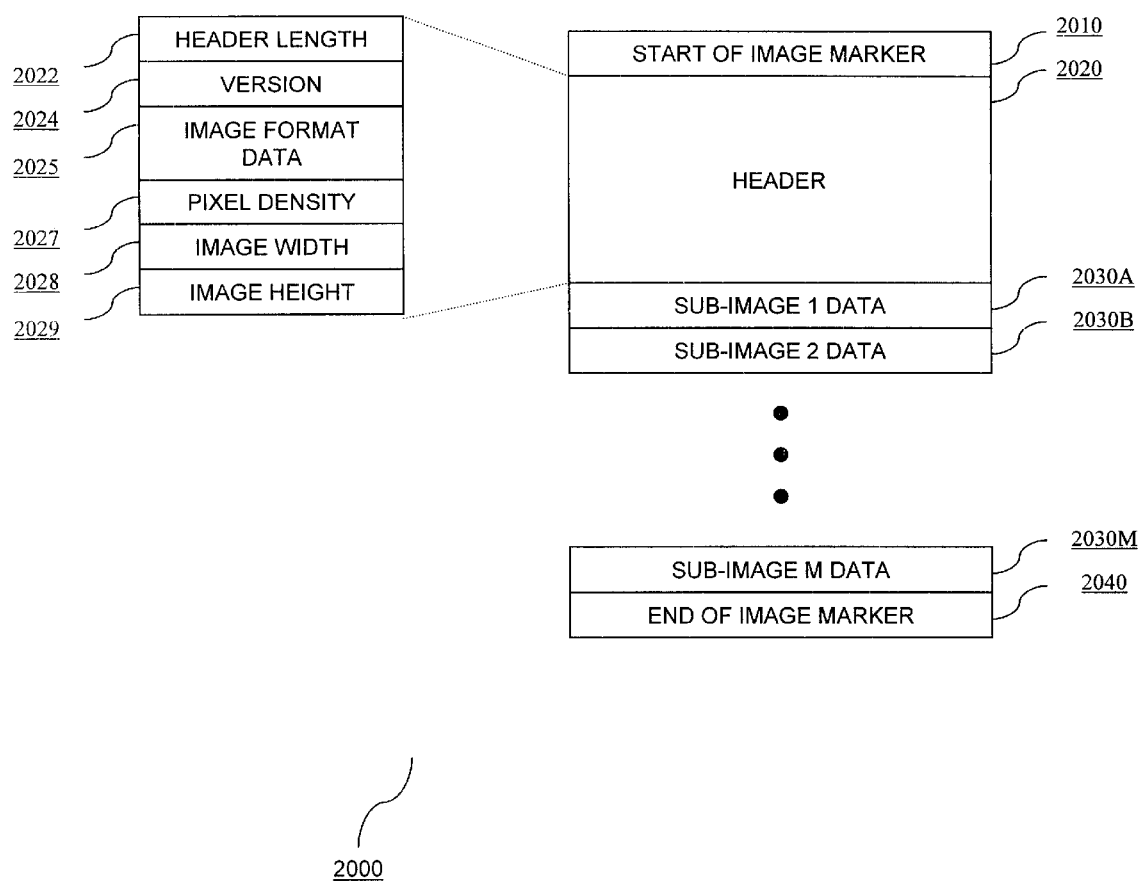
FIG. 20A is a block diagram depicting a portion of the output image file format in accordance with one embodiment of the present invention.
Figure 20B:
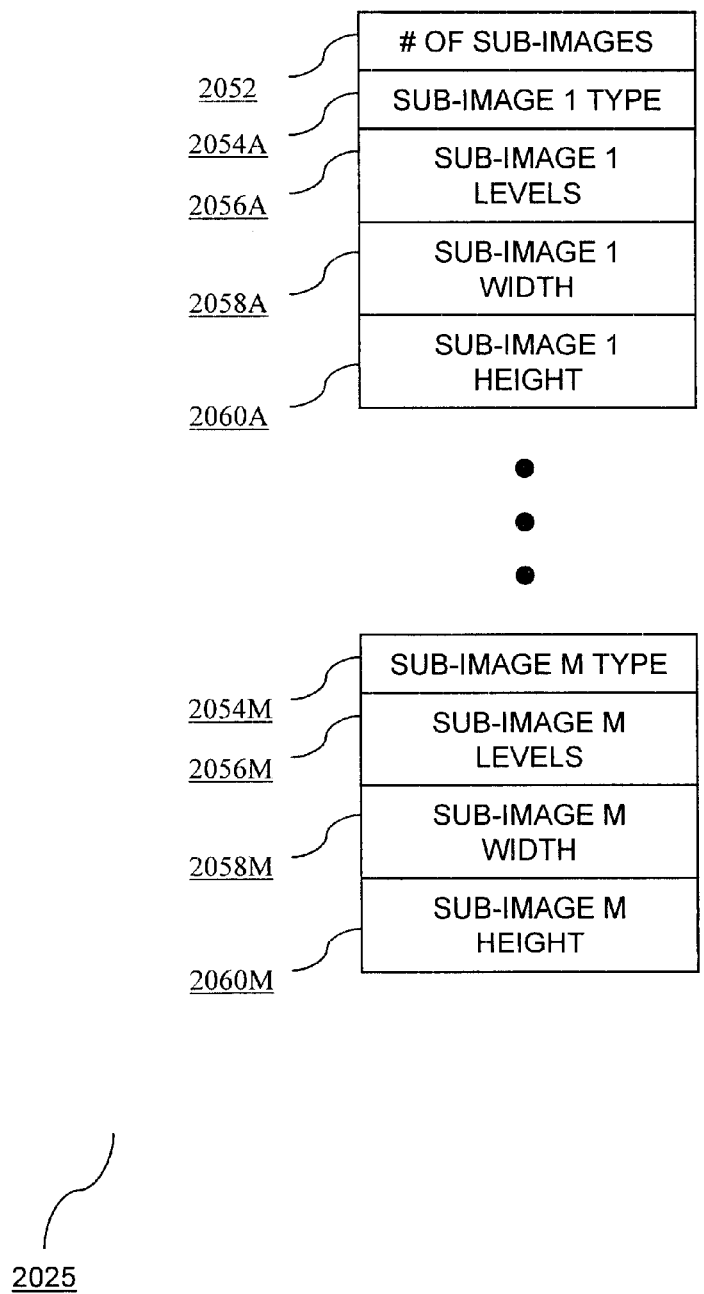
FIG. 20B is a block diagram depicting another portion of the output image file format in accordance with one embodiment of the present invention.

FIG. 20A is a block diagram depicting a portion of the output image file format 2000 in accordance with one embodiment of the present invention. Image file format 2000 shown in FIGS. 20A and 20B is an exemplary format suitable for being used as the compressed output file format used in step 560 shown in FIG. 5 and described earlier. As shown in FIG. 20A, output image file format 2000 comprises a start of image marker 2010 followed by a header 2020, which is then followed by M sets of compressed sub-image data 2030-A–2030-M (with one set of compressed sub-image data 2030 for each of the M sub-images in the image), and which then finishes with an end of image marker 2040. Start of image marker 2010 may comprise any suitable "magic number" or other identifier.

Still referring to FIG. 20A, in one embodiment, header 2020 comprises a header length field 2022 (which indicates the length of the header field 2020 in bytes), followed by a version field 2024 (which identifies the version number of the image compression system being used), followed by image format data field 2025 (which will be described in more detail below with reference to FIG. 20B), followed by a pixel density field 2027 (indicating the intended pixel density of the original image, such as 72 pixels per square inch), followed by a total image width field 2027 (indicating the width in pixels of the entire image), and ending with a total image height field 2029 (indicating the height in pixels of the entire image).

In one embodiment, each of the sets of sub-image data 2030 shown in FIG. 2000 comprises the Huffman encoded output of step 550 shown in FIGS. 5 and 14A, along with the Huffman encoding codebook, the pre-processing intensity and/or color palettes as appropriate, and any additional information which may be required to decompress a sub-image in a particular implementation. The precise compression and/or organization of the data within each set of sub-image data 2030 is not critical. End of image marker 2050 may comprise any suitable "magic number" or other identifier.

FIG. 20B is a block diagram depicting a detailed view of the image format data field 2025 in accordance with one embodiment of the present invention in the output image file format 2000 shown in FIG. 20A. As shown in FIG. 20B, image format data field 2025 starts with a sub-image number identifying field 2052 (indicating the number of sub-images in the image file, which may be one or more). Then, for each of the M sub-images in the image file, a sub-image type field 2054 is provided (indicating whether the sub-image is a bilevel, grayscale, or color image), followed by a sub-image level identifier field 2056 (indicating the number or levels in the sub-image, which will be equal to 2 for bilevel sub-images, which will be equal to the number of unique of shades/intensities for gray level sub-images, and which will be equal to the number of unique color vectors for color sub-images), followed by a sub-image width a field 2058 (indicating the width in pixels of the sub-image) and a sub-image height field 2060 (indicating the height in pixels of the sub-image). Those skilled in the art will recognize that additional fields (not shown) may be required in a particular implementation, such as fields to indicate the starting pixel location (e.g., the horizontal and vertical pixel coordinates) within the entire image of each sub-image.

Figure 21A:
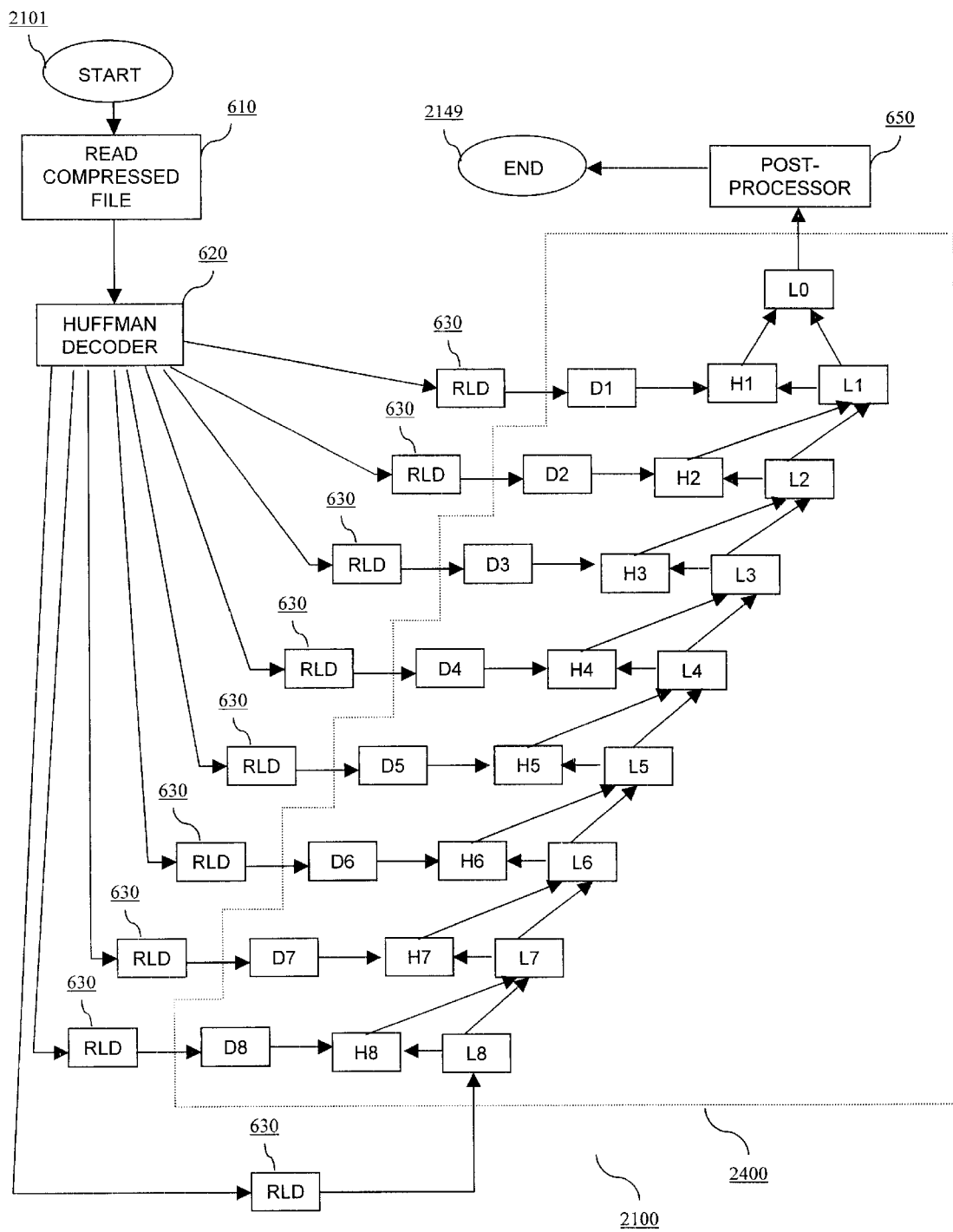
FIG. 21A is a block diagram depicting the signal flow in accordance with an exemplary inverse transform method in one embodiment of the present invention.

FIG. 21A is a block diagram depicting the signal flow 2100 in accordance with an exemplary inverse transform method in one embodiment of the present invention. Signal flow 2100 shown in FIG. 21A is an exemplary algorithm for implementing portions of the image decompression method 125 shown in FIG. 6 and described earlier. The signal flow 2100 shown in FIG. 21A reverses the signal flow 1400 shown in FIG. 14A and described earlier. As shown in FIG. 21A, the signal flow begins at step 2101, and at step 610, the compressed file is opened for reading. Then, at step 620, a Huffman decoder is executed as will be described in more detail below with reference to FIG. 22. The output of Huffman decoder 620 is separated into the eight original run length encoded prediction error signals D1–D8 and the original run length encoded coarsest low-band signal L8. Each of these signals is separately processed with the same run length decoding algorithm 630, as shown in FIG. 21A. An exemplary implementation of run length decoding algorithm 630 will be described later with reference to FIG. 23A.

Still referring to FIG. 21A, once the eight prediction error signals D1–D8 and the coarsest low-band signal L8 have been re-generated, the process shown graphically within image reconstruction signal flow 2400 of FIG. 21A may be performed to re-generate the original L0 signal. In the example shown in FIG. 21A, starting with level "8" (i.e., the coarsest level), the prediction error signal and the low-band signal are combined (based on a knowledge of the prediction equations shown in FIG. 16A, FIG. 16B and FIG. 17) in the manner known to those of ordinary skill in the art to produce the corresponding high-band signal. Then, the high-band signal and the low-band signal at each level of the reconstruction tree are combined to produce the next higher low-band signal. This process is repeated until the original L0 signal has been re-generated. As was mentioned earlier, in one embodiment, lossy compression may be achieved by not transmitting the D1 signal. In this case, the original image may be reconstructed only up to the L1 level and the L0 signal could be predicted from the L1 signal using the prediction equations shown in FIG. 16A, FIG. 16B and FIG. 17. As those of ordinary skill in the art will recognize, even lossier compression may be achieved by not transmitting additional prediction error signals, at the cost of reduced detail and/or quality in the reconstructed image.

Once the L0 signal has been re-generated, this signal is routed to post processor 650, and the process then ends at step 2149. An exemplary post processing method will be described later with reference to FIG. 25.

Figure 21B:
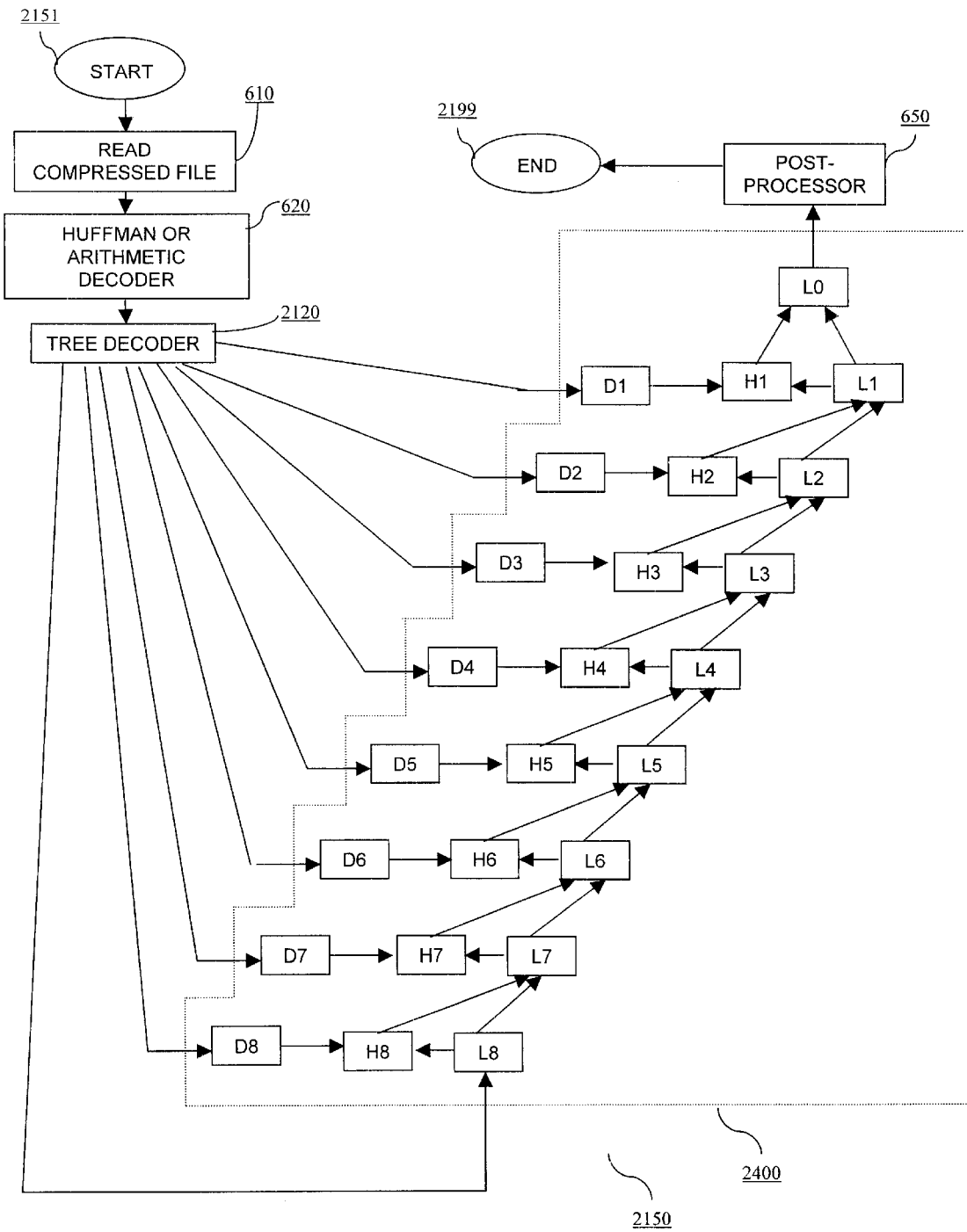
FIG. 21B is a block diagram depicting the signal flow in accordance with an exemplary alternative tree decoding and inverse transform method in one embodiment of the present invention.

FIG. 21B is a block diagram depicting the signal flow 2150 in accordance with an exemplary alternative tree decoding and inverse transform method in one embodiment of the present invention. The signal flow 2150 shown in FIG. 21B reverses the signal flow 1450 shown in FIG. 14B and described earlier. As shown in FIG. 21B, the signal flow begins at step 2151, and at step 610, the compressed file is opened for reading. Then, at step 620, a Huffman or arithmetic decoder is executed as will be described in more detail below with reference to FIG. 22. The output of Huffman or arithmetic decoder 620 processed by tree decoder 2120 to re-generate the eight prediction error signals D1–D8 and the coarsest low-band signal L8.

After tree decoding step 2120, the process shown graphically within image reconstruction signal flow 2400 of FIG. 21B may be performed to re-generate the original L0 signal. In the example shown in FIG. 21B, starting with level "8" (i.e., the coarsest level), the prediction signal and the low-band signal are combined (based on a knowledge of the prediction equations shown in FIG. 16A, FIG. 16B, and FIG. 17) in the manner known to those of ordinary skill in the art to produce the corresponding high-band signal. Then, the high-band signal and the low-band signal at each level of the reconstruction tree are combined to produce the next higher low-band signal. This process is repeated until the original L0 signal has been re-generated. As was mentioned earlier, in one embodiment, lossy compression may be achieved by not transmitting the D1 signal. In this case, the original image may be reconstructed only up to the L1 level and the L0 signal will be predicted from the L1 signal using the prediction equations shown in FIG. 16A, FIG. 16B and FIG. 17. As those of ordinary skill in the art will recognize, even lossier compression may be achieved by not transmitting additional prediction error signals, at the cost of reduced detail and/or quality in the reconstructed image.

Once the L0 signal has been re-generated, this signal is routed to post processor 650, and the process then ends at step 2199. An exemplary post processing method will be described later with reference to FIG. 25.

Figure 22:
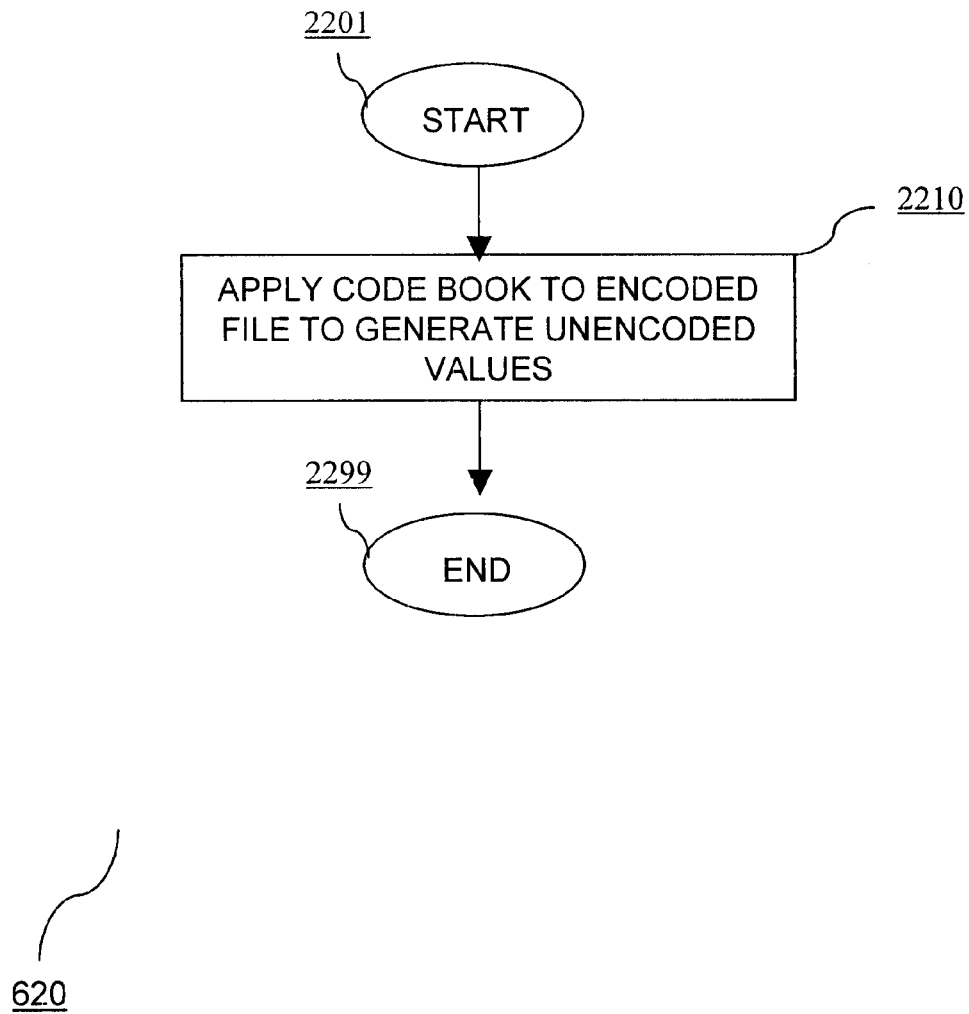
FIG. 22 is a flow chart depicting an exemplary Huffman decoding method in accordance with aspects of the present invention.

FIG. 22 is a flow chart depicting an exemplary Huffman decoding method 620 in accordance with aspects of the present invention. Method 620 shown in FIG. 22 is an exemplary algorithm for implementing the general Huffman decoder 620 shown in FIG. 6 and described earlier. Referring to FIG. 22, the method starts at step 2201, and at step 2210, the recovered codebook is simply applied to the encoded array/file to generate the unencoded values. Because Huffman decoding is well known to those of ordinary skill in the art, additional details are not provided herein so as not to over complicate the present discussion. Moreover, if an alternative coding method (e.g. arithmetic coding) was used to implement step 550 of the image compressor (see FIG. 5), then those skilled in the art will recognize that the inverse process 620 shown in FIGS. 6 and 22 must also be modified accordingly.

Figure 23A:
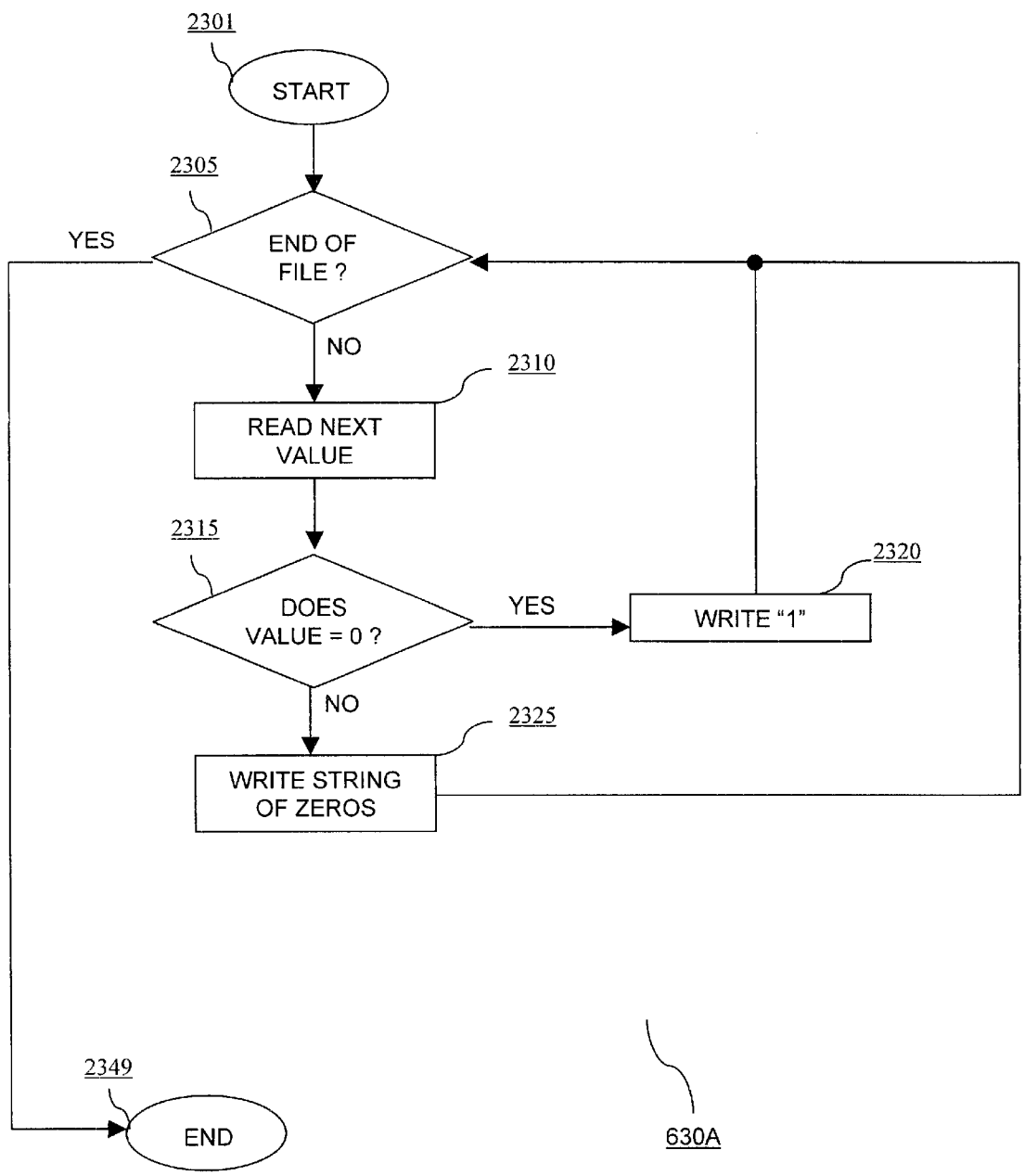
FIG. 23A is a flow chart depicting an exemplary run length decoding method for bilevel images in accordance with aspects of the present invention.

FIG. 23A is a flow chart depicting an exemplary bilevel run length decoding method 630 in accordance with aspects of the present invention. Method 630 shown in FIG. 23A is an exemplary algorithm for implementing the general run length decoder 630 shown in FIGS. 6 and 21A and described earlier. As shown in FIG. 23A, the process starts at step 2301, and that at step 2305 a decision is made depending on whether the end of the input array/file has been reached. When the end of the input array/file has been reached, the process ends at step 2349. If the end of the input array/file has not been reached, then the next encoded value is read at step 2310. Then, as step 2315, a decision is made depending on whether the current value equals zero or not. If it does (indicating that an incorrectly predicted pixel has been encountered), then at step 2320 a single "1" is written to the output (using the appropriate number of bits and encoding to represent the "1" value), and the process loops back to step 2305. Otherwise if the current value is not zero (indicating that a string of correctly predicted pixel values has been encountered), a string of "0" values is written to the output, where the number of "0" values written to the output is equal to the non-zero value read at step 2310, and the process then loops back to step 2305.

Figure 23B:
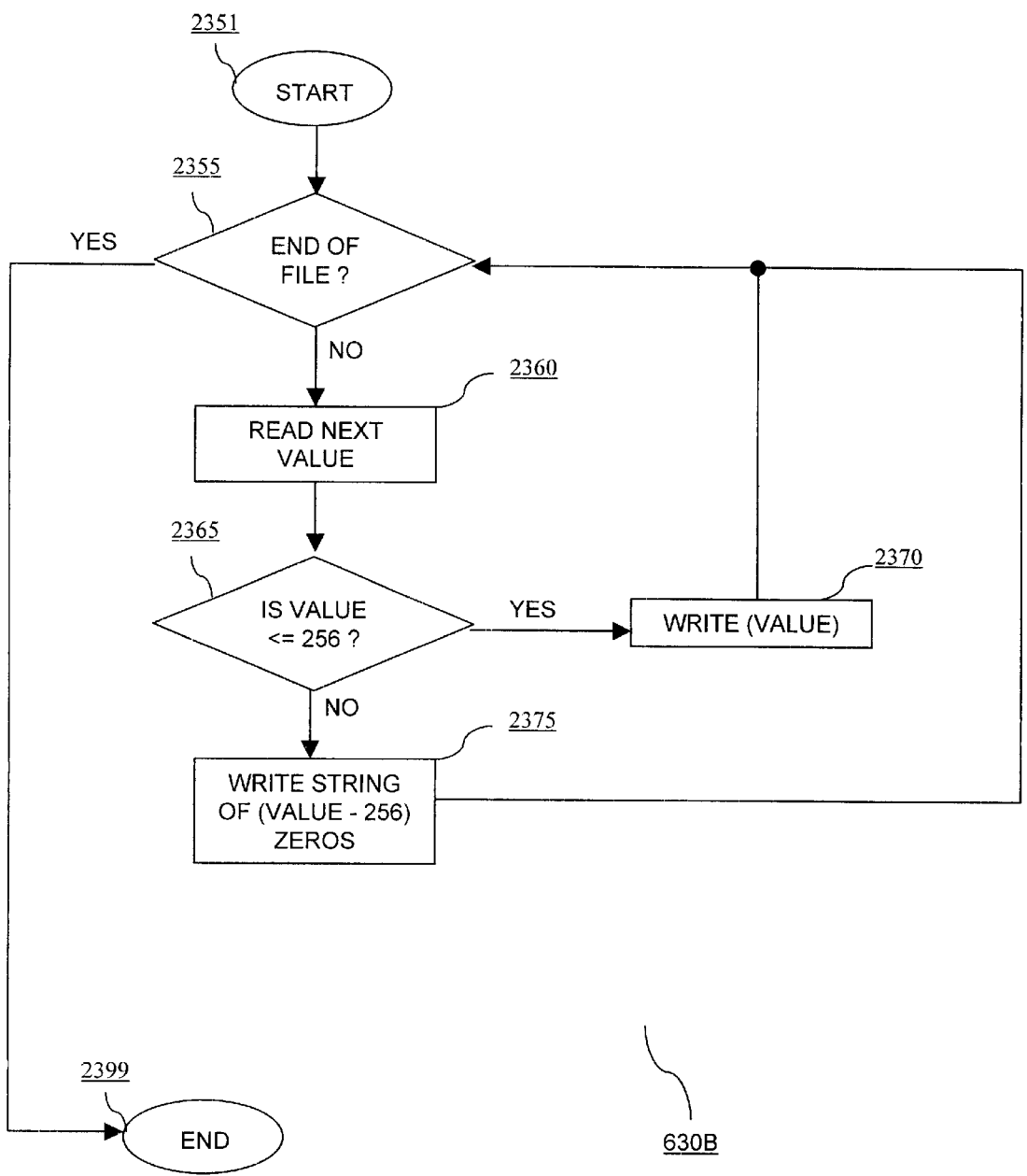
FIG. 23B is a flow chart depicting an exemplary run length decoding method for multilevel images in accordance with aspects of the present invention.

FIG. 23B is a flow chart depicting an exemplary run length decoding method for multilevel images in accordance with aspects of the present invention. Method 630 shown in FIG. 23B is another exemplary algorithm for implementing the general run length decoder 630 shown in FIGS. 6 and 21A and described earlier. As shown in FIG. 23B, the process starts at step 2351, and at step 2355 a decision is made depending on whether the end of the input array/file has been reached. When the end of the input array/file has been reached, the process ends at step 2399. If the end of the input array/file has not been reached, then the next encoded value is read at step 2360. Then, as step 2365, a decision is made depending on whether the current value is less than or equal to "256" or not. If it is (indicating that an incorrectly predicted pixel has been encountered), then at step 2370 the same value that was read is written to the output (using the appropriate number of bits and encoding to represent the value), and the process loops back to step 2355. Otherwise if the current value is not less than or equal to "256" (indicating that a string of correctly predicted pixel values has been encountered), a string of "0" values is written to the output, where the number of "0" values written to the output is equal to the non-zero value read at step 2360 minus "256," and the process then loops back to step 2355.

Figure 23C:
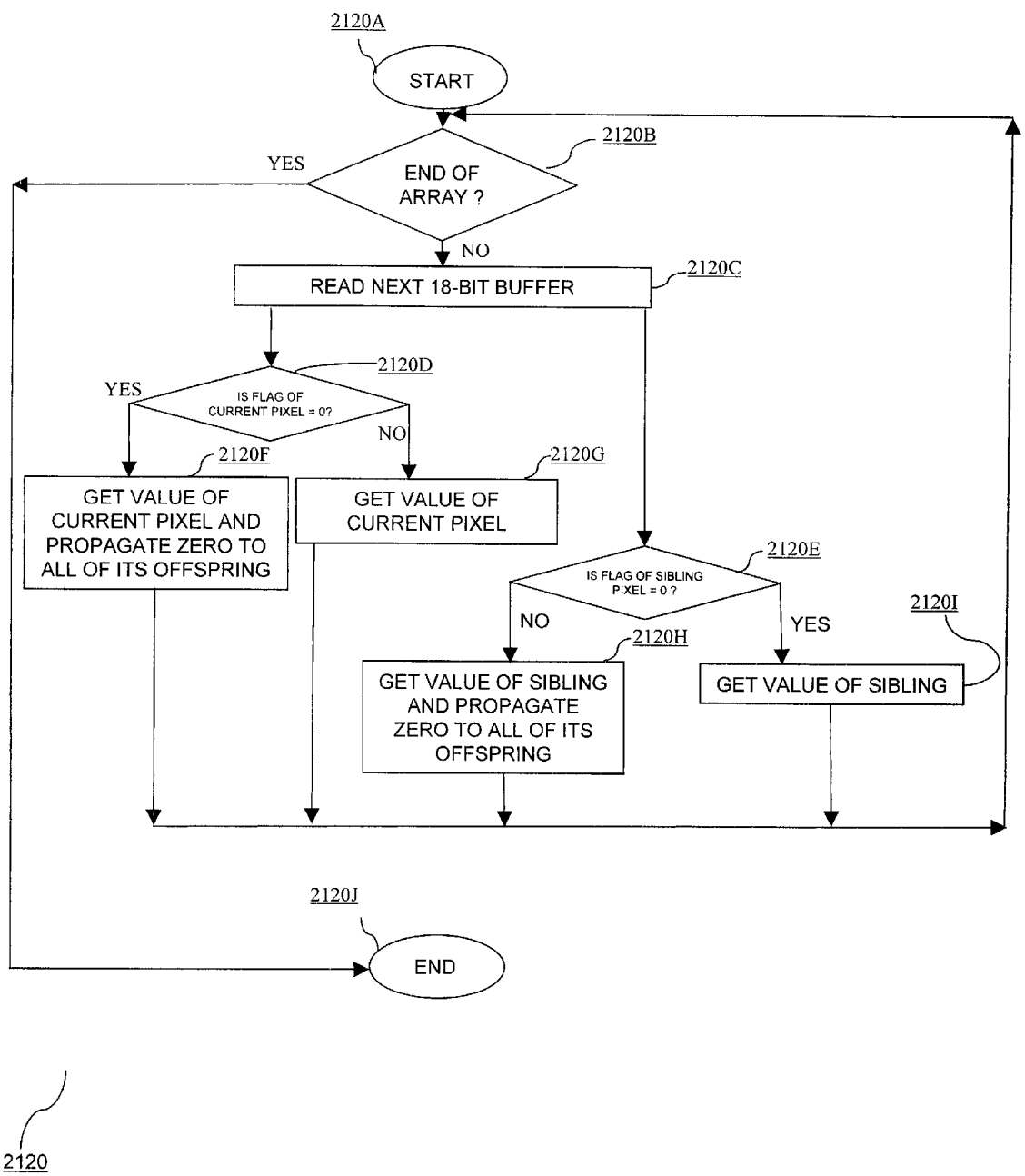
FIG. 23C is a flow chart depicting an exemplary tree decoding method for multilevel or bilevel images in accordance with aspects of the present invention.

FIG. 23C is a flow chart depicting an exemplary tree decoding method in accordance with aspects of the present invention. Method 2120 shown in FIG. 23C is an exemplary algorithm for implementing the general tree decoder 2120 shown in FIG. 21B and described earlier. As shown in FIG. 23C, the process starts at step 2120A, and at step 2120B a decision is made depending on whether the end of the input array has been reached. When the end of the input array has not been reached, then the next encoded 18-bit buffer is read at step 2120C. Then at step 2120D and/or 2120E, a decision is made from information contained in the 18-bit buffer depending on whether the flag of the current pixel and/or its sibling is "0" or not. If it is (indicating a zero tree root is reached), then the value of the current and/or sibling pixel is read from the 18-bit buffer and the zero value is propagated to all offspring of the current pixel and/or sibling. Otherwise, if the flag of the current and/or sibling pixel is not zero, then only their pixel values are read from the 18-bit buffer, and the process then loops back to step 2120B.

Figure 24:
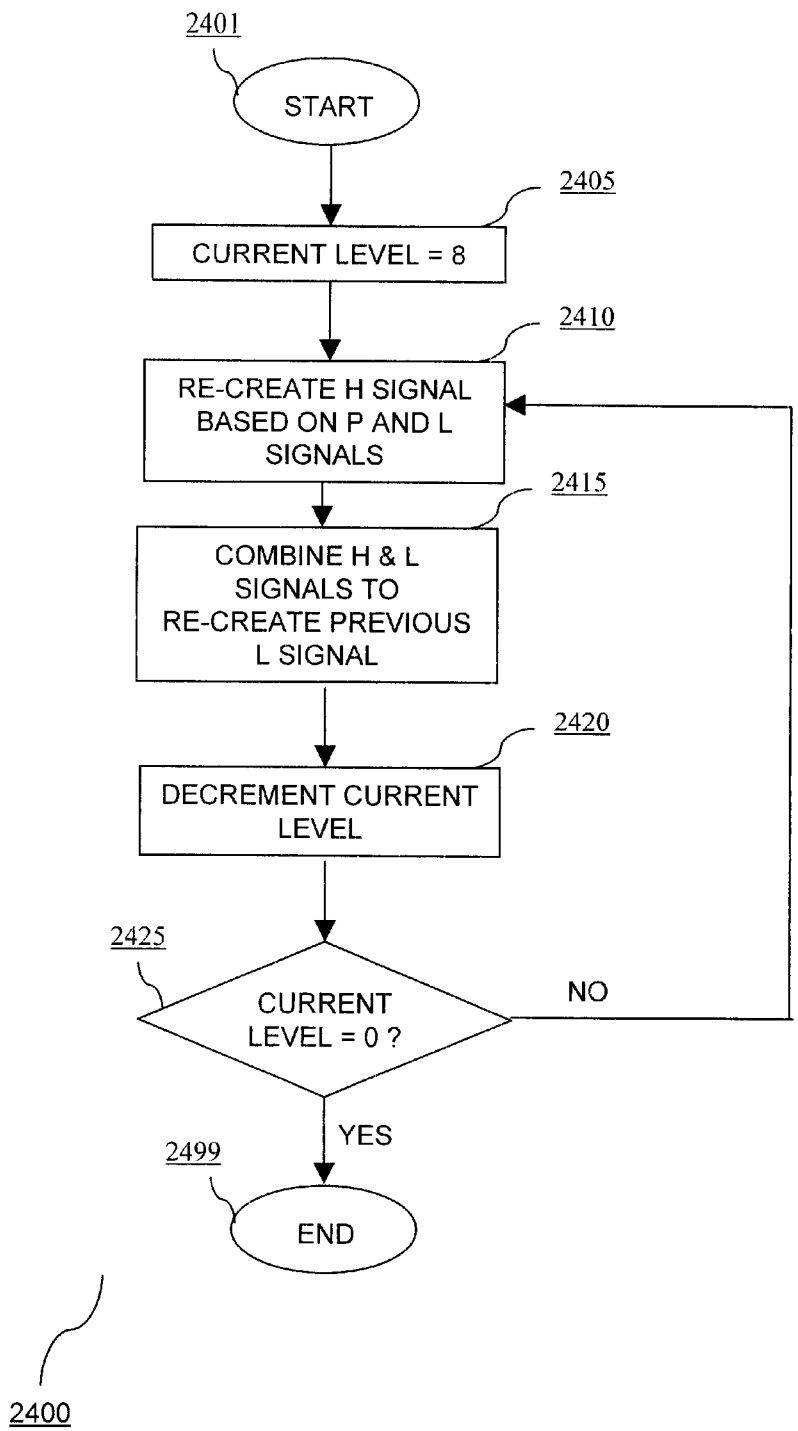
FIG. 24 is a flow chart depicting an exemplary inverse transform method in accordance with aspects of the present invention.

FIG. 24 is a flow chart depicting an exemplary inverse transform method 2400 in accordance with aspects of the present invention. Method 2400 shown in FIG. 24 is an exemplary algorithm for implementing the general inverse transform 640 shown in FIGS. 6 and 21A and described earlier. Method 2400 shown in FIGS. 21A and 24 assumes all of the prediction error signals D1–D8 and the coarsest low-band signal L8 have been re-generated. In the example shown in FIG. 24, the process starts at step 2401, and at step 2405, a current level counter is set to "8." At step 2410, the corresponding high-band signal (which will be a H8 during the first pass) is re-generated from the current prediction error signal (which will be D8 during the first pass) and the current low-band signal (which will be L8 during the first pass). At step 2415 this re-generated high-band signal (e.g., H8 during the first pass) is combined with the corresponding low-band signal (e.g., L8 during the first pass) to produce the next finest low-band signal (e.g., L7 during the first pass). Then, at step 2420 the current level counter is decremented. At step 2425, a decision is made depending on whether the value of the current level counter equals one or not. If it does not, then the process loops back to step 2410. Otherwise, the process ends at step 2499. Thus, after eight iterations through the process shown in FIG. 24 (assuming lossless compression in this example) the original low-band L0 signal is re-generated. In the case of Lossy compression, the signal L0 is predicted directly from L1 (treating the D1 signal as a zero signal). Nothing precludes implementing various modifications to the process shown in FIG. 24 within the scope of the present invention, so long as the process reverses the forward transform process used to implement step 530 of FIG. 5.

Figure 25:
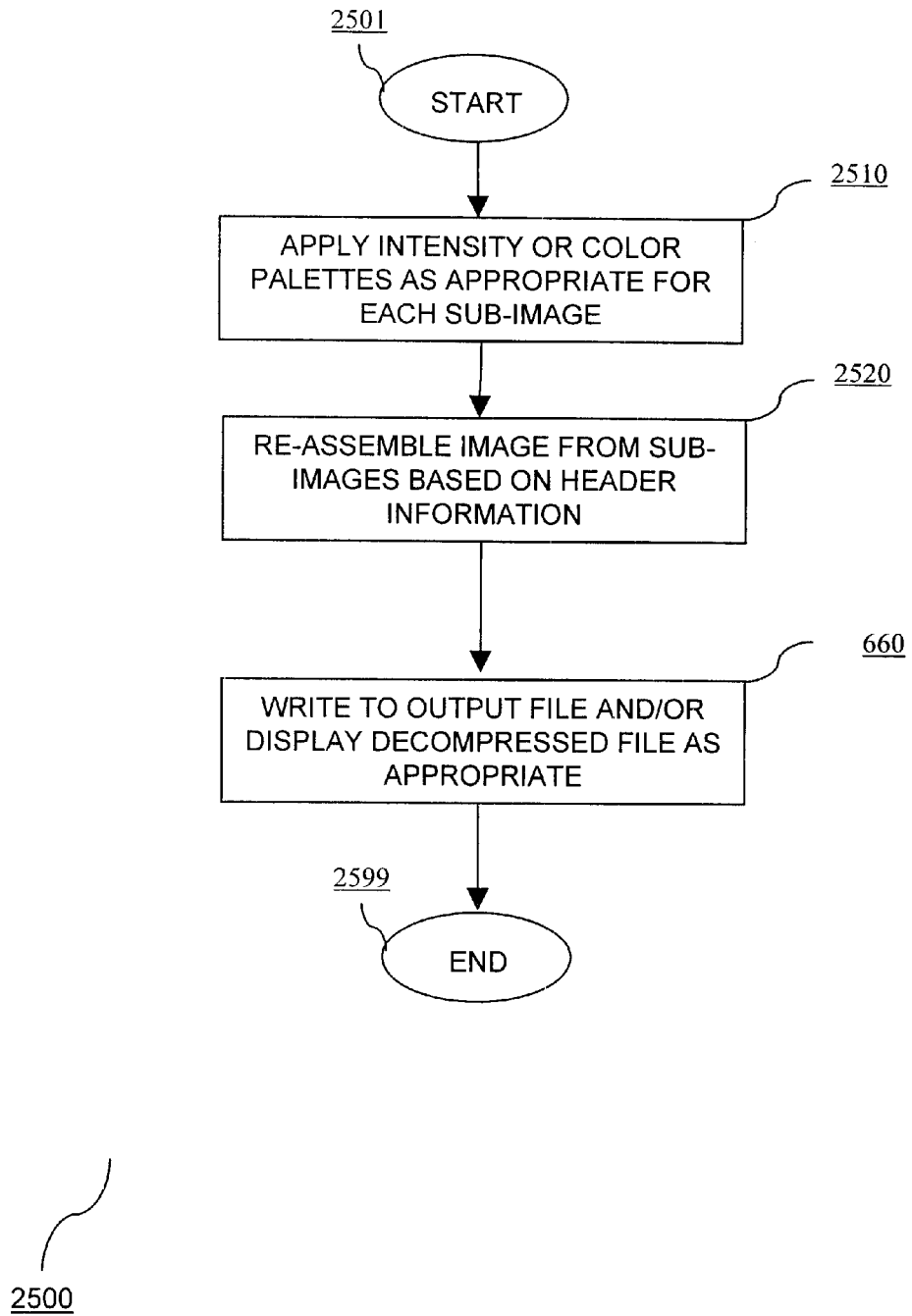
FIG. 25 is a flow chart depicting an exemplary post-processing method in accordance with aspects of the present invention.

FIG. 25 is a flow chart depicting an exemplary post-processing method 2500 in accordance with aspects of the present invention. Method 2500 shown in FIG. 25 is an exemplary algorithm for implementing the post-processing step 650 and the output decompressed file storage/display step 660 shown in FIG. 6 and described earlier. As shown in FIG. 25, the process starts at step 2101, and at step 2510, the intensity and/or color palettes are applied as appropriate to each sub-image to assign each pixel value in the reconstructed image to its quantized intensity level and/or RGB color vector. At step 2520, the original image is reassembled from its constituent sub-images in accordance with the image geometry information contained in the compressed image header (see FIG. 20 and the associated discussion). Step 2520 is followed by step 660, at which point the output decompressed file is displayed and/or stored as appropriate for each particular implementation. The process finally ends at step 2599.

Thus, according to aspects of the present invention, an image compression/decompression apparatus and method which exhibits a high compression ratio while conserving transmission bandwidth, as well as processing power and memory at the image decompressor, and which exhibits good performance across a broad spectrum of general image file classes, has been described. In terms of compression ratio for lossless bilevel images, experiments performed using embodiments of the present invention have exhibited a compression ratio that is between 200% to 300% better than GIF and JPEG systems, depending on the particular input image tested. In terms of compression ratio for lossless multilevel images, experiments performed using embodiments of the present invention have exhibited a compression ratio that is between 50% to 400% better than GIF and JPEG systems, depending on the particular input image tested.

The block diagrams and flow charts described herein are illustrative of merely the broad architectures and logical flow of steps to achieve a method of the present invention and that steps may be added to, or taken away from, a flow chart without departing from the scope of the invention. Further, the order of execution of steps in the flow charts may be changed without departing from the scope of the invention. Additional considerations in implementing the method described by a flow chart may dictate changes in the selection and order of steps.

In general, the flow charts in this specification include one or more steps performed by software routines executing in a computer system. The routines may be implemented by any means known in the art. For example, as mentioned earlier, any number of computer programming languages, such as the Java™ language, C, C++, Perl, Pascal, Smalltalk, FORTRAN, assembly language, etc., may be used. Further, various programming approaches such as procedural, object oriented or artificial intelligence techniques may be employed.

As known to those of ordinary skill in the art, the program code corresponding to implement aspects of the present invention may all be stored on a computer-readable medium. Depending on each particular implementation, computer-readable media suitable for this purpose may include, without limitation, floppy diskettes, hard drives, network drives, RAM, ROM, EEPROM, nonvolatile RAM, and/or flash memory.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A method for compressing an input image file, comprising:

subdividing said input image file into one or more sub-image files;

preprocessing each said sub-image file using a threshold parameter to quantize the colors or intensity levels in each of said sub-image files into a compressed palette of colors or intensity levels;

performing a forward transform on each said pre-processed sub-image, wherein each said forward transform is based on a binary quincunx image pyramid and a set of pixel value prediction equations, and wherein the output of each said forward transform comprises a set of prediction error signals and a coarse low-band signal;

performing a run length coding algorithm on each of said prediction error signals and said coarse low-band signal for each said forward transformed sub-image;

combining the outputs of all said run length coding algorithms into a single coded array;

performing a Huffman coding algorithm on said single coded array; and writing the output of said Huffman coding algorithm to an output compressed file along with a header.

2. A method for compressing an input image file, comprising:

subdividing said input image file into one or more sub-image files;

preprocessing each said sub-image file using a threshold parameter to quantize the colors or intensity levels in each of said sub-image files into a compressed palette of colors or intensity levels;

performing a forward transform each said pre-processed sub-image, wherein each said forward transform is based on a binary quincunx image pyramid and a set of pixel value prediction equations, and wherein the output of each said forward transform comprises a set of prediction error signals and a coarse low-band signal;

performing a tree coding algorithm on each of said prediction error signals and said coarse low-band signal for each said forward transformed sub-image;

combining the outputs of said tree coding algorithms into a single coded array;

performing a Huffman or arithmetic coding algorithm on said single coded array; and writing the output of said Huffman or arithmetic coding algorithm to an output compressed file along with a header.

3. The method of claim 1, further comprising transmitting said output compressed file to an image decompressor via a data communication network.

4. The method of claim 3, wherein said data communication network is the Internet.

5. The method of claim 3, wherein said data communication network is the Internet and said image decompressor is a personal digital assistant.

6. The method of claim 3, wherein said data communication network is the Internet and said image decompressor is a personal computer.

7. The method of claim 2, further comprising transmitting said output compressed file to an image decompressor via a data communication network.

8. The method of claim 7, wherein said data communication network is the Internet.

9. The method of claim 7, wherein said data communication network is the Internet and said image decompressor is a personal digital assistant.

10. The method of claim 7, wherein said data communication network is the Internet and said image decompressor is a personal computer.

11. An apparatus for compressing an input image file, comprising:

means for subdividing said input image file into one or more sub-image files;

means for preprocessing each said sub-image file using a threshold parameter to quantize the colors or intensity levels in each of said sub-image files into a compressed palette of colors or intensity levels;

means for performing a forward transform each said pre-processed sub-image, wherein each said forward transform is based on a binary quincunx image pyramid and a set of pixel value prediction equations, and wherein the output of each said forward transform comprises a set of prediction error signals and a coarse low-band signal;

means for performing a run length coding algorithm on each of said prediction error signals and said coarse low-band signal for each said forward transformed sub-image;

means for combining the outputs of all said run length coding algorithms into a single coded array;

means for performing a Huffman or arithmetic coding algorithm on said single coded array; and means for writing the output of said Huffman or arithmetic coding algorithm to an output compressed file along with a header.

12. An apparatus for compressing an input image file, comprising:

means for subdividing said input image file into one or more sub-image files;

means for preprocessing each said sub-image file using a threshold parameter to quantize the colors or intensity levels in each of said sub-image files into a compressed palette of colors or intensity levels;

means for performing a forward transform each said pre-processed sub-image, wherein each said forward transform is based on a binary quincunx image pyramid and a set of pixel value prediction equations, and wherein the output of each said forward transform comprises a set of prediction error signals and a coarse low-band signal;

means for performing a tree coding algorithm on each of said prediction error signals and said coarse low-band signal for each said forward transformed sub-image;

means for combining the outputs of said tree coding algorithms into a single coded array;

means for performing a Huffman or arithmetic coding algorithm on said single coded array; and means for writing the output of said Huffman or arithmetic coding algorithm to an output compressed file along with a header.

13. The apparatus of claim 11, further comprising means for transmitting said output compressed file to an image decompressor via a data communication network.

14. The apparatus of claim 13, wherein said data communication network is the Internet.

15. The apparatus of claim 13, wherein said data communication network is the Internet and said image decompressor is a personal digital assistant.

16. The apparatus of claim 13, wherein said data communication network is the Internet and said image decompressor is a personal computer.

17. The apparatus of claim 12, further comprising means for transmitting said output compressed file to an image decompressor via a data communication network.

18. The apparatus of claim 17, wherein said data communication network is the Internet.

19. The apparatus of claim 17, wherein said data communication network is the Internet and said image decompressor is a personal digital assistant.

20. The apparatus of claim 17, wherein said data communication network is the Internet and said image decompressor is a personal computer.

21. A method for decompressing a compressed input image file, comprising:

reading said compressed input image file containing a header and performing a Huffman or arithmetic decoding algorithm on said compressed input image file;

subdividing the output of said Huffman or arithmetic decoding algorithm into a set of run length encoded arrays;

performing a run length decoding algorithm on each run length encoded arrays to produce a corresponding set of prediction error signals and a coarse low-band signal;

performing an inverse transform on the said prediction error signals and on said coarse low-band signal, wherein each said inverse transform is based on a binary quincunx image pyramid and a set of pixel value prediction equations, and wherein the output of inverse transform comprises a preprocessed image file; and performing a postprocessing algorithm on said preprocessed image file by applying a palette of colors or intensity levels to said preprocessed image file, wherein said palette of colors or intensity levels comprises a portion of said compressed input image file.

22. A method for decompressing a compressed input image file, comprising:

reading said compressed input image file containing a header and performing a Huffman or arithmetic decoding algorithm on said compressed input image file;

subdividing the output of said Huffman decoding algorithm into a set of tree encoded arrays;

performing a tree decoding algorithm on each tree encoded arrays to produce a corresponding set of prediction error signals and a coarse low-band signal;

performing an inverse transform on the said prediction error signals and on said coarse low-band signal, wherein each said inverse transform is based on a binary quincunx image pyramid and a set of pixel value prediction equations, and wherein the output of inverse transform comprises a preprocessed image file; and performing a postprocessing algorithm on said preprocessed image file by applying a palette of colors or intensity levels to said preprocessed image file, wherein said palette of colors or intensity levels comprises a portion of said compressed input image file.

23. The method of claim 21, further comprising receiving said compressed input image file at an image decompressor via a data communication network.

24. The method of claim 23, wherein said data communication network is the Internet.

25. The method of claim 23, wherein said data communication network is the Internet and said image decompressor is a personal digital assistant.

26. The method of claim 23, wherein said data communication network is the Internet and said image decompressor is a personal computer.

27. The method of claim 22, further comprising receiving said compressed input image file at an image decompressor via a data communication network.

28. The method of claim 27, wherein said data communication network is the Internet.

29. The method of claim 27, wherein said data communication network is the Internet and said image decompressor is a personal digital assistant.

30. The method of claim 27, wherein said data communication network is the Internet and said image decompressor is a personal computer.

31. An apparatus for decompressing a compressed input image file, comprising:
  means for reading said compressed input image file containing a header and performing a Huffman or arithmetic decoding algorithm on said compressed input image file;
  means for subdividing the output of said Huffman or arithmetic decoding algorithm into a set of run length encoded arrays;
  means for performing a run length decoding algorithm on each run length encoded arrays to produce a corresponding set of prediction error signals and a coarse low-band signal;
  means for performing an inverse transform on the said prediction error signals and on said coarse low-band signal, wherein each said inverse transform is based on a binary quincunx image pyramid and a set of pixel value prediction equations, and wherein the output of inverse transform comprises a preprocessed image file; and
  means for performing a postprocessing algorithm on said preprocessed image file by applying a palette of colors or intensity levels to said preprocessed image file, wherein said palette of colors or intensity levels comprises a portion of said compressed input image file.

32. An apparatus for decompressing a compressed input image file, comprising:
  means for reading said compressed input image file containing a header and performing a Huffman or arithmetic decoding algorithm on said compressed input image file;
  means for subdividing the output of said Huffman or arithmetic decoding algorithm into a set of tree encoded arrays;
  means for performing a tree decoding algorithm on each tree encoded arrays to produce a corresponding set of prediction error signals and a coarse low-band signal;
  means for performing an inverse transform on the said prediction error signals and on said coarse low-band signal, wherein each said inverse transform is based on a binary quincunx image pyramid and a set of pixel value prediction equations, and wherein the output of inverse transform comprises a preprocessed image file; and
  means for performing a postprocessing algorithm on said preprocessed image file by applying a palette of colors or intensity levels to said preprocessed image file, wherein said palette of colors of intensity levels comprises a portion of said compressed input image file.

33. The apparatus of claim 31, further comprising means for transmitting said output compressed file to an image decompressor via a data communication network.

34. The apparatus of claim 33, wherein said data communication network is the Internet.

35. The apparatus of claim 33, wherein said data communication network is the Internet and said image decompressor is a personal digital assistant.

36. The apparatus of claim 33, wherein said data communication network is the Internet and said image decompressor is a personal computer.

37. The apparatus of claim 32, further comprising means for transmitting said output compressed file to an image decompressor via a data communication network.

38. The apparatus of claim 37, wherein said data communication network is the Internet.

39. The apparatus of claim 37, wherein said data communication network is the Internet and said image decompressor is a personal digital assistant.

40. The apparatus of claim 37, wherein said data communication network is the Internet and said image decompressor is a personal computer.

41. An apparatus for compressing an input image file, comprising:
  an input image file subdivider for subdividing said compressed input image file or one or more sub-image files;
  a sub-image file preprocessor using a threshold parameter to quantize the colors or intensity levels in each of said sub-image files into a compressed palette of colors or intensity levels;
  a forward transform operating on each of said preprocessed sub-images, wherein each said forward transform is based on a binary quincunx image pyramid and a set of pixel value prediction equations, and wherein the output of each said forward transform comprises a set of prediction error signals and a coarse low-band signal;
  a run length encoder operating on each of said prediction error signals and said coarse low-band signal for each said forward transformed sub-image;
  a Huffman or arithmetic encoder operating on the outputs of all said run length encoders; and
  means for writing the output of said Huffman or arithmetic encoder to an output compressed file along with a header.

42. An apparatus for compressing an input image file, comprising:
  an input image file subdivider for subdividing said compressed input image file or one or more sub-image files;
  a sub-image file preprocessor using a threshold parameter to quantize the colors or intensity levels in each of said sub-image files into a compressed palette of colors or intensity levels;
  a forward transform operating on each of said preprocessed sub-images, wherein each said forward transform is based on a binary quincunx image pyramid and a set of pixel value prediction equations, and wherein the output of each said forward transform comprises a set of prediction error signals and a coarse low-band signal;
  a tree encoder operating on said prediction error signals and said coarse low-band signal for each said forward transformed sub-image;
  a Huffman or arithmetic encoder operating on the output of said tree encoder; and
  means for writing the output of said Huffman or arithmetic encoder to an output compressed file along with a header.

43. The apparatus of claim 41, further comprising a transmitter for sending said output compressed file to an image decompressor via a data communication network.

44. The apparatus of claim 43, wherein said data communication network is the Internet.

45. The apparatus of claim 43, wherein said data communication network is the Internet and said image decompressor is a personal digital assistant.

46. The apparatus of claim 43, wherein said data communication network is the Internet and said image decompressor is a personal computer.

47. The apparatus of claim 42, further comprising a transmitter for sending said output compressed file to an image decompressor via a data communication network.

48. The apparatus of claim 47, wherein said data communication network is the Internet.

49. The apparatus of claim 47, wherein said data communication network is the Internet and said image decompressor is a personal digital assistant.

50. The apparatus of claim 47, wherein said data communication network is the Internet and said image decompressor is a personal computer.

51. An apparatus for decompressing compressed input image files, comprising:
   a compressed input image file reader for opening a compressed input image file containing a header;
   a Huffman or arithmetic decoder operating on the output of said compressed input image file reader;
   a run length decoder operating on the output of said Huffman or arithmetic decoder to produce a set of prediction error signals and a coarse low-band signal;
   an inverse transform operating on the said prediction error signals and on said coarse low-band signal, wherein each said inverse transform is based on a binary quincunx image pyramid and a set of pixel value prediction equations, and wherein the output of inverse transform comprises a preprocessed image file; and
   a postprocessor operating on said preprocessed image file, wherein said postprocessor applies a palette of colors or intensity levels to said preprocessed image file, wherein said palette of colors or intensity levels comprises a portion of said compressed input image file.

52. An apparatus for decompressing compressed input image files, comprising:
   a compressed input image file reader for opening a compressed input image file containing a header;
   a Huffman or arithmetic decoder operating on the output of said compressed input image file reader;
   a tree decoder operating on the output of said Huffman or arithmetic decoder to produce a set of prediction error signals and a coarse low-band signal;
   an inverse transform operating on the said prediction error signals and on said coarse low-band signal, wherein each said inverse transform is based on a binary quincunx image pyramid and a set of pixel value prediction equations, and wherein the output of inverse transform comprises a preprocessed image file; and
   a postprocessor operating on said preprocessed image file, wherein said postprocessor applies a palette of colors or intensity levels to said preprocessed image file, wherein said palette of colors or intensity levels comprises a portion of said compressed input image file.

53. The apparatus of claim 51, further comprising a receiver for acquiring said compressed input image file at an image decompressor via a data communication network.

54. The apparatus of claim 53, wherein said data communication network is the Internet.

55. The apparatus of claim 53, wherein said data communication network is the Internet and said image decompressor is a personal digital assistant.

56. The apparatus of claim 53, wherein said data communication network is the Internet and said image decompressor is a personal computer.

57. The apparatus of claim 52, further comprising a receiver for acquiring said compressed input image file at an image decompressor via a data communication network.

58. The apparatus of claim 57, wherein said data communication network is the Internet.

59. The apparatus of claim 57, wherein said data communication network is the Internet and said image decompressor is a personal digital assistant.

60. The apparatus of claim 57, wherein said data communication network is the Internet and said image decompressor is a personal computer.

61. A program storage device readable by a machine, tangibly embodying a program of instructions executable by the machine to perform a method for compressing an input image file, the method comprising:
   subdividing said input image file into one or more sub-image files;
   preprocessing each said sub-image file using a threshold parameter to quantize the colors or intensity levels in each of said sub-image files into a compressed palette of colors or intensity levels;
   performing a forward transform each said pre-processed sub-image, wherein each said forward transform is based on a binary quincunx image pyramid and a set of pixel value prediction equations, and wherein the output of each said forward transform comprises a set of prediction error signals and a coarse low-band signal;
   performing a run length coding algorithm on each of said prediction error signals and said coarse low-band signal for each said forward transformed sub-image;
   combining the outputs of all said run length coding algorithms into a single coded array; performing a Huffman or arithmetic coding algorithm on said single coded array; and
   writing the output of said Huffman or arithmetic coding algorithm to an output compressed file along with a header.

62. A program storage device readable by a machine, tangibly embodying a program of instructions executable by the machine to perform a method for compressing an input image file, the method comprising:
   subdividing said input image file into one or more sub-image files;
   preprocessing each said sub-image file using a threshold parameter to quantize the colors or intensity levels in each of said sub-image files into a compressed palette of colors or intensity levels;
   performing a forward transform each said pre-processed sub-image, wherein each said forward transform is based on a binary quincunx image pyramid and a set of pixel value prediction equations, and wherein the output of each said forward transform comprises a set of prediction error signals and a coarse low-band signal;
   performing a tree coding algorithm on each of said prediction error signals and said coarse low-band signal for each said forward transformed sub-image;
   combining the outputs of said tree coding algorithms into a single coded array; performing a Huffman arithmetic coding algorithm on said single coded array; and
   writing the output of said Huffman or arithmetic coding algorithm to an output compressed file along with a header.

63. A program storage device readable by a machine, tangibly embodying a program of instructions executable by the machine to perform a method for decompressing an input image file, the method comprising:
   reading said compressed input image file containing a header and performing a Huffman or arithmetic decoding algorithm on said compressed input image file;

subdividing the output of said Huffman or arithmetic decoding algorithm into a set of run length encoded arrays;

performing a run length decoding algorithm on each run length encoded arrays to produce a corresponding set of prediction error signals and a coarse low-band signal;

performing an inverse transform on the said prediction error signals and on said coarse low-band signal, wherein each said inverse transform is based on a binary quincunx image pyramid and a set of pixel value prediction equations, and wherein the output of inverse transform comprises a preprocessed image file; and performing a postprocessing algorithm on said preprocessed image file by applying a palette of colors or intensity levels to said preprocessed image file, wherein said palette of colors or intensity levels comprises a portion of said compressed input image file.

64. A program storage device readable by a machine, tangibly embodying a program of instructions executable by the machine to perform a method for decompressing an input image file, the method comprising:

reading said compressed input image file containing a header and performing a Huffman or arithmetic decoding algorithm on said compressed input image file;

subdividing the output of said Huffman or arithmetic decoding algorithm into a set of tree encoded arrays;

performing a tree decoding algorithm on each tree encoded arrays to produce a corresponding set of prediction error signals and a coarse low-band signal;

performing an inverse transform on the said prediction error signals and on said coarse low-band signal, wherein each said inverse transform is based on a binary quincunx image pyramid and a set of pixel value prediction equations, and wherein the output of inverse transform comprises a preprocessed image file; and performing a post-processing algorithm on said preprocessed image file by applying a palette of colors or intensity levels to said preprocessed image file, wherein said palette of colors or intensity levels comprises a portion of said compressed input image file.

65. A method for compressing an input image file, comprising:

performing a forward transform on each said pre-processed sub-image, wherein each said forward transform is based on a binary quincunx image pyramid and a set of pixel value prediction equations, and wherein the output of each said forward transform comprises a set of prediction error signals and a coarse low-band signal;

executing a first compression algorithm on the said prediction error signals and said coarse low-band signal;

combining the outputs of all said compression algorithms into a single and/or several compressed arrays; and performing a second compression algorithm on said single compressed array.

66. The method of claim 65, wherein said first compression algorithm is a lossless algorithm.

67. The method of claim 65, wherein said first compression algorithm is a run length encoding algorithm.

68. The method of claim 65, wherein said first compression algorithm is a tree encoding algorithm.

69. The method of claim 65, wherein said second compression algorithm is an entropy encoding algorithm.

70. The method of claim 65, wherein said second compression algorithm is a Huffman encoding algorithm.

71. The method of claim 65, wherein said second compression algorithm is an arithmetic encoding algorithm.

72. A method for decompressing a compressed input image file, comprising:

performing a first decoding algorithm on said compressed input image file to generate one or more encoded arrays;

performing a second decoding algorithm on said encoded arrays to produce a corresponding set of prediction error signals and a coarse low-band signal; and performing an inverse transform on the said prediction error signals and on said coarse low-band signal, wherein each said inverse transform is based on a binary quincunx image pyramid and a set of pixel value prediction equations, and wherein the output of inverse transform comprises a preprocessed image file.

73. The method of claim 72 wherein said first compression algorithm is a lossless algorithm.

74. The method of claim 72, wherein said first compression algorithm is a run length encoding algorithm.

75. The method of claim 72, wherein said first compression algorithm is a tree encoding algorithm.

76. The method of claim 72, wherein said second compression algorithm is an entropy encoding algorithm.

77. The method of claim 72, wherein said second compression algorithm is a Huffman encoding algorithm.

78. The method of claim 72, wherein said second compression algorithm is an arithmetic encoding algorithm.

79. A method for compressing an input image file, comprising:

performing a forward transform on each of a plurality of pre-processed sub-images, wherein each said forward transform is based on a binary quincunx image pyramid and a set of pixel value prediction equations, and wherein the output of each said forward transform comprises a set of prediction error signals and a coarse low-band signal; and executing a context based arithmetic coding algorithm on said prediction error signals and said coarse low-band signal.

80. A method for decompressing a compressed input image file, comprising:

performing a context based arithmetic decoding algorithm on the compressed input image file to produce a corresponding set of prediction error signals and a coarse low-band signal; and performing an inverse transform on the said prediction error signals and on said coarse low-band signal, wherein each said inverse transform is based on a binary quincunx image pyramid and a set of pixel value prediction equations, and wherein the output of each said inverse transform comprises a preprocessed image file.

* * * * *

UNITED STATES PATENT AND TRADEMARK OFFICE
CERTIFICATE OF CORRECTION

PATENT NO.   : 6,748,116 B1
DATED        : June 8, 2004
INVENTOR(S)  : Yue

It is certified that error appears in the above-identified patent and that said Letters Patent is hereby corrected as shown below:

Column 8,
Line 34, between "the" and "pixels" delete ","

Column 9,
Line 4, replace "pr-eprocessing" with -- pre-processing --

Column 10,
Line 46, between "pixels" and "followed" insert -- , --

Signed and Sealed this

Twenty-sixth Day of July, 2005

JON W. DUDAS
*Director of the United States Patent and Trademark Office*